(12) United States Patent
Moloney et al.

(10) Patent No.: US 12,085,392 B2
(45) Date of Patent: Sep. 10, 2024

(54) DYNAMIC CULLING OF MATRIX OPERATIONS

(71) Applicant: Movidius Ltd., Schiphol-Rijk (NL)

(72) Inventors: David Macdara Moloney, Dublin (IE); Xiaofan Xu, Dublin (IE)

(73) Assignee: Movidius Ltd., Schiphol-Rijk (NL)

( * ) Notice: Subject to any disclaimer, the term of this patent is extended or adjusted under 35 U.S.C. 154(b) by 0 days.

(21) Appl. No.: 18/102,613

(22) Filed: Jan. 27, 2023

(65) Prior Publication Data

US 2024/0011777 A1 Jan. 11, 2024

Related U.S. Application Data

(63) Continuation of application No. 17/114,363, filed on Dec. 7, 2020, now Pat. No. 11,593,987, which is a
(Continued)

(51) Int. Cl.
*G06T 15/08* (2011.01)
*G01C 21/20* (2006.01)
(Continued)

(52) U.S. Cl.
CPC ............ *G01C 21/20* (2013.01); *G01C 21/30* (2013.01); *G05D 1/0214* (2013.01); *G05D 1/0274* (2013.01); *G05D 1/246* (2024.01); *G05D 1/617* (2024.01); *G06F 9/30029* (2013.01); *G06F 17/16* (2013.01); *G06N 3/04* (2013.01);
(Continued)

(58) Field of Classification Search
CPC ............ G06N 3/049; G06N 3/02; G06N 3/08; G06N 20/00; G06N 3/088; G06N 5/022; G06T 15/08; G06T 17/00; G06T 19/00; G06T 15/005; G06T 15/40; G06F 17/16
See application file for complete search history.

(56) References Cited

U.S. PATENT DOCUMENTS 7,301,538 B2  11/2007  Buyanovskiy
7,471,291 B2  12/2008  Kaufman et al.
(Continued)

FOREIGN PATENT DOCUMENTS

CN  102918495 A  2/2013
CN  104050710 A  9/2014
(Continued)

OTHER PUBLICATIONS

Kleiner et al., "Auralization—An Overview," Journal of the Audio Engineering Society, vol. 41, No. 11, New York, dated Nov. 1993, 14 pages. (Abstract Only).
(Continued)

*Primary Examiner* — Tize Ma
(74) *Attorney, Agent, or Firm* — Hanley, Flight & Zimmerman, LLC

(57) ABSTRACT

An output of a first one of a plurality of layers within a neural network is identified. A bitmap is determined from the output, the bitmap including a binary matrix. A particular subset of operations for a second one of the plurality of layers is determined to be skipped based on the bitmap. Operations are performed for the second layer other than the particular subset of operations, while the particular subset of operations are skipped.

20 Claims, 30 Drawing Sheets

Related U.S. Application Data continuation of application No. 16/326,683, filed as application No. PCT/US2017/047695 on Aug. 19, 2017, now Pat. No. 10,861,217.

(60) Provisional application No. 62/377,471, filed on Aug. 19, 2016.

(51) Int. Cl.

| | | |
|---|---|---|
| G01C 21/30 | (2006.01) | |
| G05D 1/00 | (2006.01) | |
| G05D 1/246 | (2024.01) | |
| G05D 1/617 | (2024.01) | |
| G06F 9/30 | (2018.01) | |
| G06F 17/16 | (2006.01) | |
| G06N 3/04 | (2023.01) | |
| G06N 3/045 | (2023.01) | |
| G06T 1/20 | (2006.01) | |
| G06T 15/06 | (2011.01) | |
| G06T 17/00 | (2006.01) | |
| G06T 17/05 | (2011.01) | |
| G06T 19/00 | (2011.01) | |
| G06V 20/13 | (2022.01) | |
| G06V 20/17 | (2022.01) | |
| G06V 20/64 | (2022.01) | |
| G06N 3/048 | (2023.01) | |

(52) U.S. Cl.
CPC .............. *G06N 3/045* (2023.01); *G06T 1/20* (2013.01); *G06T 15/06* (2013.01); *G06T 15/08* (2013.01); *G06T 17/005* (2013.01); *G06T 17/05* (2013.01); *G06T 19/00* (2013.01); *G06T 19/006* (2013.01); *G06V 20/13* (2022.01); *G06V 20/17* (2022.01); *G06V 20/64* (2022.01); *G06N 3/048* (2023.01); *G06T 2200/04* (2013.01); *G06T 2200/28* (2013.01); *G06T 2210/08* (2013.01); *G06T 2210/36* (2013.01); *G06T 2219/004* (2013.01)

(56) References Cited

U.S. PATENT DOCUMENTS

| | | | |
|---|---|---|---|
| 8,713,080 B2 | 4/2014 | Moloney | |
| 9,104,633 B2 | 8/2015 | Moloney | |
| 9,405,972 B2 | 8/2016 | Moeglein et al. | |
| 9,754,405 B1 | 9/2017 | Young et al. | |
| 9,760,690 B1 | 9/2017 | Petkov et al. | |
| 9,984,498 B2 | 5/2018 | Loop | |
| 10,078,333 B1 | 9/2018 | Bajracharya | |
| 10,748,326 B2 | 8/2020 | Caulfield et al. | |
| 10,861,217 B2* | 12/2020 | Moloney ................ | G06V 20/17 |
| 11,037,361 B2 | 6/2021 | Moloney et al. | |
| 11,222,459 B2 | 1/2022 | Caulfield | |
| 11,367,246 B2 | 6/2022 | Moloney et al. | |
| 11,593,987 B2 | 2/2023 | Moloney et al. | |
| 11,680,803 B2 | 6/2023 | Caulfield et al. | |
| 2005/0285858 A1 | 12/2005 | Yang et al. | |
| 2007/0165026 A1 | 7/2007 | Engel | |
| 2008/0024494 A1 | 1/2008 | Poopathy et al. | |
| 2008/0024515 A1 | 1/2008 | Yang et al. | |
| 2010/0010786 A1 | 1/2010 | Maxwell | |
| 2010/0104199 A1 | 4/2010 | Zhang et al. | |
| 2011/0228055 A1 | 9/2011 | Sharp | |
| 2012/0299920 A1 | 11/2012 | Coombe | |
| 2013/0103303 A1 | 4/2013 | Lynch | |
| 2014/0368504 A1 | 12/2014 | Chen et al. | |
| 2015/0092048 A1 | 4/2015 | Brunner et al. | |
| 2015/0109298 A1 | 4/2015 | Panteleev et al. | |
| 2015/0268058 A1 | 9/2015 | Samarasekera et al. | |
| 2015/0269438 A1 | 9/2015 | Samarasekera et al. | |
| 2015/0294500 A1 | 10/2015 | Tucker et al. | |
| 2016/0196672 A1 | 7/2016 | Chertok | |
| 2016/0236683 A1 | 8/2016 | Eggert et al. | |
| 2016/0239706 A1 | 8/2016 | Dijkman | |
| 2017/0039706 A1 | 2/2017 | Mikhno et al. | |
| 2017/0200308 A1 | 7/2017 | Nguyen | |
| 2019/0180409 A1 | 6/2019 | Moloney et al. | |
| 2019/0180499 A1 | 6/2019 | Caulfield et al. | |
| 2019/0188899 A1* | 6/2019 | Moloney ................ | G06N 3/04 |
| 2019/0206134 A1 | 7/2019 | Devam | |
| 2021/0065429 A1 | 3/2021 | Caulfield | |
| 2021/0118217 A1* | 4/2021 | Moloney ................ | G06T 15/06 |
| 2022/0228055 A1 | 7/2022 | Yu et al. | |
| 2022/0237855 A1 | 7/2022 | Caulfield | |

FOREIGN PATENT DOCUMENTS

| | | |
|---|---|---|
| CN | 105378796 A | 3/2016 |
| CN | 105453139 A | 3/2016 |
| GB | 2513699 A | 11/2014 |
| KR | 20160063367 A | 6/2016 |
| WO | 2013057077 A2 | 4/2013 |
| WO | 2014200914 A1 | 12/2014 |
| WO | 2016130203 A1 | 8/2016 |
| WO | 2018035505 A1 | 2/2018 |
| WO | 2018035506 A1 | 2/2018 |
| WO | 2018035507 A1 | 2/2018 |
| WO | 2018035508 A1 | 2/2018 |

OTHER PUBLICATIONS

Laine et al., "Efficient Sparse Voxel Octrees-Analysis, Extensions, and Implementation," NVIDIA Technical Report NVR-2010-001, NVIDIA Research, dated Feb. 2010, 30 pages.

Einhorn et al., "Finding the Adequate Resolution for Grid Mapping—Cell Sizes Locally Adapting On-the-Fly," 2011 IEee International Conference on Robotics and Automation, May 9, 2011, 6 pages.

Cozzi et al., "OpenGL Insights," XP55675474, Available online al https://www.seas.upenn.edu/-pcozzi/OpenGLInsights/OpenGLInsights-SparseVoxelization.pdf, Jul. 23, 2012, 14 pages.

Li et al., "Building Variable Resolution Occupancy Grid Map From Stereoscopic System—a Quadtree Based Approach," IEEE Intelligent Vehicles Symposium, Jun. 23, 2013, 6 pages.

Maturana et al., "VoxNet: A 3D Convolutional Neural Network for Real-Time Object Recognition," 2015 IEEE/RSJ International Conference on Intelligent Robots and Systems; Hamburg, Sep. 28, 2015, 7 pages.

He et al., "Pathfinding in 3D Space—A", Theta*, Lazy Theta* In Octree Structure, "Third Year Student Project," Ecole Polythechnique, Universite Paris-Saclay, Mar. 8, 2016, 15 pages.

Xu et al., "3D Object Recognition Based on Volumetric Representation Using Convolutional Neural Networks," International Conference on Finalcial Cryptography and Data Security, Lecture Notes in Computer Science, vol. 9756, Jul. 2, 2016, 10 pages.

Moloney, "Movidius Vola—HW Acceleration for Volumetric Applications," Movidius, retrieved at [https://old.hotchips.org/wp-content/uploads/hc_archives/hc28/HC28.21-Tutorial-Epub/HC28.21.2-3D-Depth-Sensors-Epub/HC28.21.221-volumetric-data-Moloney-movidius-18Aug2016.pdf], Aug. 18, 2016, 19 pages.

International Searching Authority, "International Search Report and Written Opinion," issued in connection with International Patent Application No. PC/TUS2017/047696, mailed on Nov. 29, 2017, 18 pages.

International Searching Authority, "International Search Report and Written Opinion," issued in connection with International Patent Application No. PCT/US2017/047697, mailed on Nov. 29, 2017, 19 pages.

International Searching Authority, "International Search Report and Written Opinion," issued in connection with International Patent Application No. PCT/US2017/047695, mailed on Dec. 1, 2017, 15 pages.

International Searching Authority, "International Search Report and Written Opinion," issued in connection with International Patent Application No. PCT/US2017/047694, mailed on Jan. 18, 2019, 16 pages.

(56) References Cited

OTHER PUBLICATIONS

International Searching Authority, "International Preliminary Report on Patentability," issued in connection with International Patent Application No. PCT/US2017/047697, issued on Feb. 19, 2019, 15 pages.
International Searching Authority, "International Preliminary Report on Patentability," issued in connection with International Patent Application No. PCT/US2017/047695, issued on Feb. 19, 2019, 13 pages.
International Searching Authority, "International Preliminary Report on Patentability," issued in connection with International Patent Application No. PCT/US2017/047694, issued on Feb. 19, 2019, 15 pages.
International Searching Authority, "International Preliminary Report on Patentability," issued in connection with International Patent Application No. PCT/US2017/047696, issued on Feb. 19, 2019, 16 pages.
European Patent Office, "Extended European Search Report," issued in connection with European Patent Application No. 17842250.7, dated Jan. 14, 2020, 10 pages.
European Patent Office, "Extended European Search Report," issued in connection with European patent Application No. 17842251.5, dated Jan. 16, 2020, 12 pages.
European Patent Office, "Extended European Search Report," issued in connection with European Patent Application No. 17842249.9, dated Mar. 19, 2020, 11 pages.
United States Patent and Trademark Office, "Notice of Allowance and Fee(s) Due," issued in connection with U.S. Appl. No. 16/326,689, mailed on Apr. 1, 2020, 8 pages.
United States Patent and Trademark Office, "Non-Final Office Action," issued in connection with U.S. Appl. No. 16/326,694, mailed on May 21, 2020, 18 pages.
United States Patent and Trademark Office, "Notice of Allowance and Fee(s) Due," issued in connection with U.S. Appl. No. 16/326,683, mailed on Jul. 29, 2020, 9 pages.
European Patent Office, "Extended European Search Report," issued in connection with European Patent Application No. 17842252.3, dated Aug. 7, 2020, 11 pages.
United States Patent and Trademark Office, "Final Office Action," issued in connection with U.S. Appl. No. 16/326,694, mailed on Sep. 18, 2020, 18 pages.
United States Patent and Trademark Office, "Non-Final Office Action," issued in connection with U.S. Appl. No. 16/326,674, mailed on Oct. 27, 2020, 11 pages.
European Patent Office, "Communication pursuant to Article 94(3) EPC," issued in connection with European Patent Application No. 17842250.7, dated Dec. 15, 2020, 6 pages.
United States Patent and Trademark Office, "Non-Final Office Action," issued in connection with U.S. Appl. No. 16/326,694, mailed on Feb. 4, 2021, 21 pages.
United States Patent and Trademark Office, "Notice of Allowance and Fee(s) Due," issued in connection with U.S. Appl. No. 16/326,674, mailed on Feb. 9, 2021, 5 pages.
European Patent Office, "Communication pursuant to Article 94(3) EPC," issued in connection with European Patent Application No. 17842251.5, dated Apr. 19, 2021, 6 pages.
United States Patent and Trademark Office, "Non-Final Action," issued in connection with U.S. Appl. No. 16/994,511, mailed on May 12, 2021, 12 pages.
European Patent Office, "Communication Pursuant to Article 94(3) EPC," issued in connection with European Patent Application No. 17842249.9, issued on May 28, 2021, 4 pages.
United States Patent and Trademark Office, "Final Office Action," issued in connection with U.S. Appl. No. 16/326,694, mailed on Jun. 4, 2021, 21 pages.
United States Patent and Trademark Office, "Notice of Allowance and Fee(s) Due," issued in connection with U.S. Appl. No. 16/994,511, mailed on Sep. 2, 2021, 8 pages.

United States Patent and Trademark Office, "Non-Final Office Action," issued in connection with U.S. Appl. No. 16/326,694, mailed on Oct. 14, 2021, 21 pages.
United States Patent and Trademark Office, "Notice of Allowance and Fee(s) Due," issued in connection with U.S. Appl. No. 16/326,694, mailed on Feb. 9, 2022, 11 pages.
China National Intellectual Property Administration, "First Search," issued in connection with Chinese Patent Application No. 201780063370, dated Aug. 15, 2022, 1 page.
China National Intellectual Property Administration, "The First Office Action," issued in connection with Chinese Patent Application No. 201780063370, dated Aug. 19, 2022, 12 pages.
Korean Intellectual Property Office, "Notice of Preliminary Rejection," issued in connection with Korean Patent Application No. 10-2019-7007940, dated Sep. 8, 2022, 10 pages.
United States Patent and Trademark Office, "Notice of Allowance and Fee(s) Due," issued in connection with U.S. Appl. No. 17/114,363, mailed on Oct. 24, 2022, 8 pages.
China National Intellectual Property Administration, "First Search Report," issued in connection with Chinese Patent Application No. 201780064229.3, dated Oct. 26, 2022, 1 page.
China National Intellectual Property Administration, "The First Office Action," issued in connection with Chinese Patent Application No. 201780064229.3, dated Nov. 2, 2022, 8 pages.
China National Intellectual Property Administration, "The First Office Action," issued in connection with Chinese Patent Application No. 201780064277.2, dated Nov. 3, 2022, 12 pages.
China National Intellectual Property Administration, "First Search," issued in connection with Chinese Patent Application No. 201780063371.6, dated Nov. 14, 2022, 1 page.
China National Intellectual Property Administration, "The First Office Action," issued in connection with Chinese Patent Application No. 201780063371.6, dated Nov. 18, 2022, 12 pages.
United States Patent and Trademark Office, "Notice of Allowance and Fee(s) Due," issued in connection with U.S. Appl. No. 17/571,044, mailed on Feb. 15, 2023, 8 pages.
United States Patent and Trademark Office, "Non-Final Office Action," issued in connection with U.S. Appl. No. 17/347,511, mailed on Mar. 21, 2023, 6 pages.
Korean Intellectual Property Office, "Written Decision on Registration," issued in connection with Korean Patent Application No. 10-2019-7007940, dated Mar. 22, 2023, 6 pages.
United States Patent and Trademark Office, "Non-Final Office Action," issued in connection with U.S. Appl. No. 17/843,974, mailed on Apr. 11, 2023, 9 Pages.
European Patent Office, "Communication Under Rule 71(3) EPC," issued in connection with European Patent Application No. 17842251.5, dated May 25, 2023, 10 pages.
United States Patent and Trademark Office, "Final Office Action," issued in connection with U.S. Appl. No. 17/347,511, mailed on Jul. 13, 2023, 7 pages.
China National Intellectual Property Administration, "Second Office Action," issued in connection with Chinese Patent Application No. 201780063371.6, dated Jul. 27, 2023, 7 pages. (Machine Translation Included).
United States Patent and Trademark Office, "Notice of Allowance and Fee(s) Due," issued in connection with U.S. Appl. No. 17/843,974, dated Jul. 28, 2023, 9 Pages.
United States Patent and Trademark Office, "Advisory Action," issued in connection with U.S. Appl. No. 17/347,511, mailed on Sep. 25, 2023, 3 pages.
United States Patent and Trademark Office, "Supplemental Notice of Allowability," issued in connection With U.S. Appl. No. 16/326,683, mailed on Nov. 9, 2020, 5 pages.
The State Intellectual Property Office of People's Republic of China, "Third Office Action," mailed in connection with Chinese Patent Application No. 201780064277.2, dated Mar. 25, 2024, 7 pages (English Translation Included).
The State Intellectual Property of People's Republic of China, "Rejection Decision," issued in connection with Chinese Patent Application No. 201780064277.2, dated Nov. 13, 2023, 8 pages. [Machine English Translation Included].

(56) References Cited

OTHER PUBLICATIONS

United States Patent and Trademark Office, "Notice of Allowance and Fee(s) Due," issued in connection with U.S. Appl. No. 17/347,511, mailed on Oct. 30, 2023, 7 pages.

United States Patent and Trademark Office, "Notice of Allowance and Fee(s) Due," issued in connection with U.S. Appl. No. 17/843,974, mailed on Oct. 30, 2023, 9 pages.

European Patent Office, "Communication pursuant to Article 94(3) EPC," issued in connection with European Patent Application No. 17 842 252.3-1009, dated May 3, 2024, 6 pages.

European Patent Office, "Communication under Rule 71(3) EPC—Intention to Grant," issued in connection with European Patent Application No. 17 842 249.9-1001, dated Jul. 8, 2024, 139 pages.

\* cited by examiner

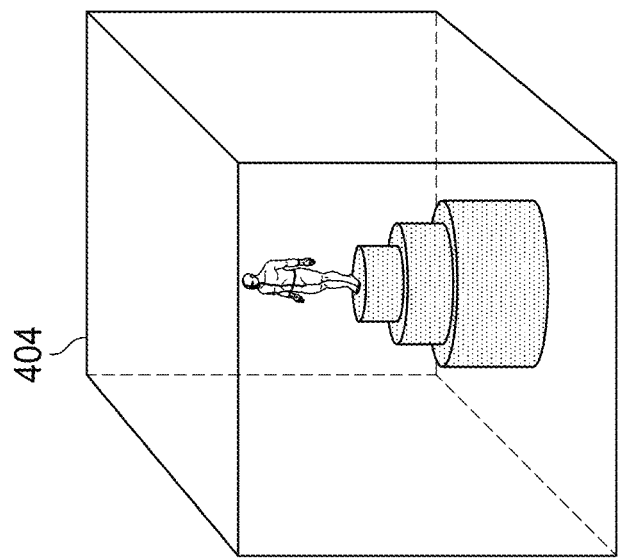
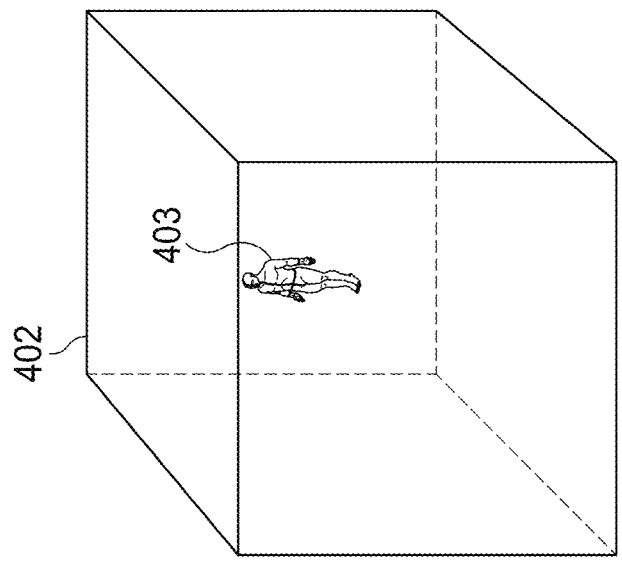
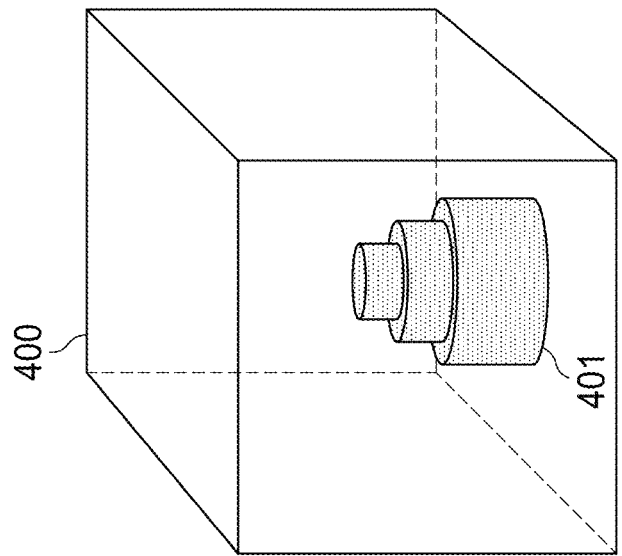
FIG. 4

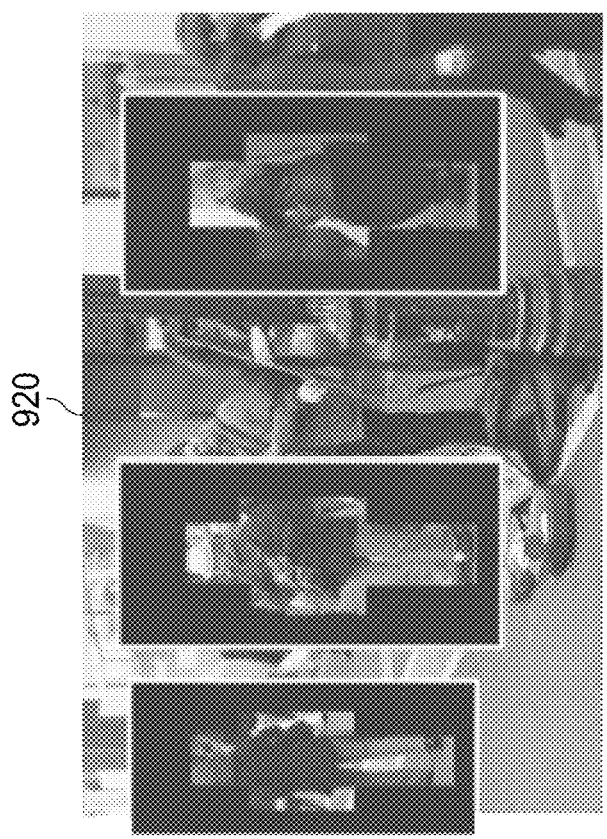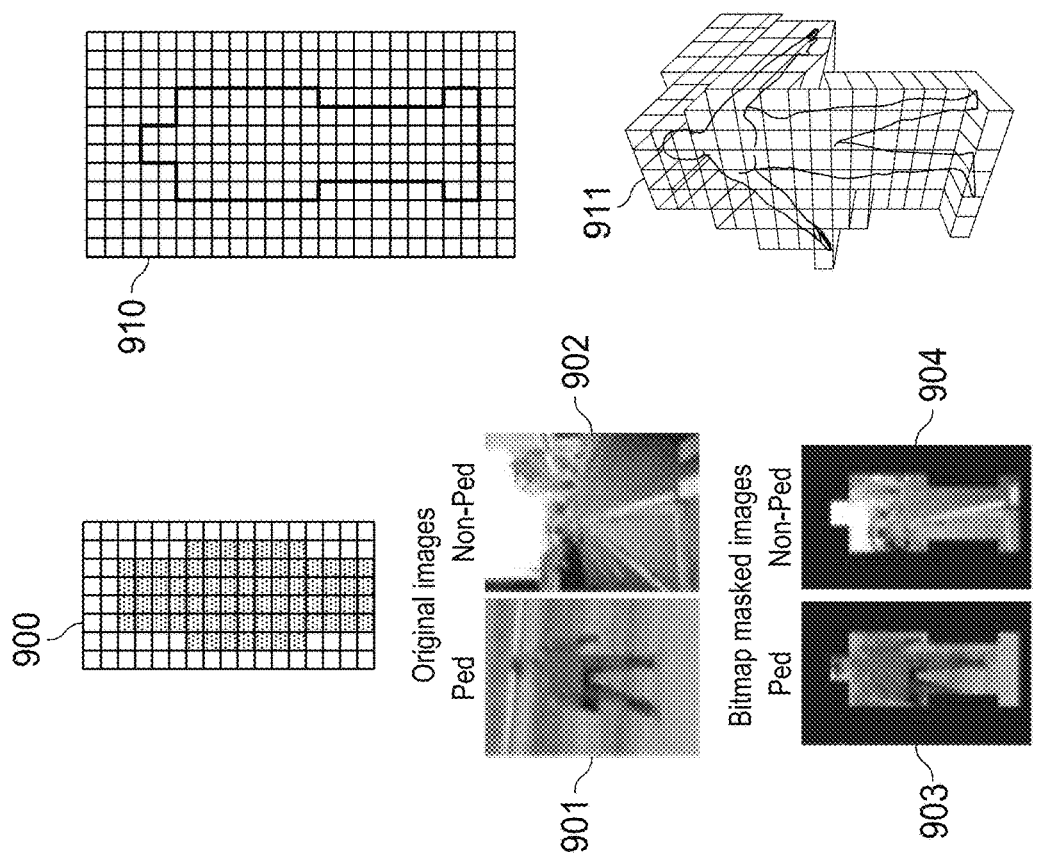
FIG. 9

1000

| AlexNet | # weights | # zeros (avg) | # zeros (min) | # zeros (max) | % zeros |
|---|---|---|---|---|---|
| Relu1 | 8192 | 1859.3 | 912 | 4425 | 23% |
| Relu2 | 8192 | 4459.2 | 3700 | 4873 | 54% |
| Relu3 | 4096 | 3465.6 | 3079 | 3722 | 85% |

Note: results obtained using 10,000 CIFAR-10 test-images

FIG. 10

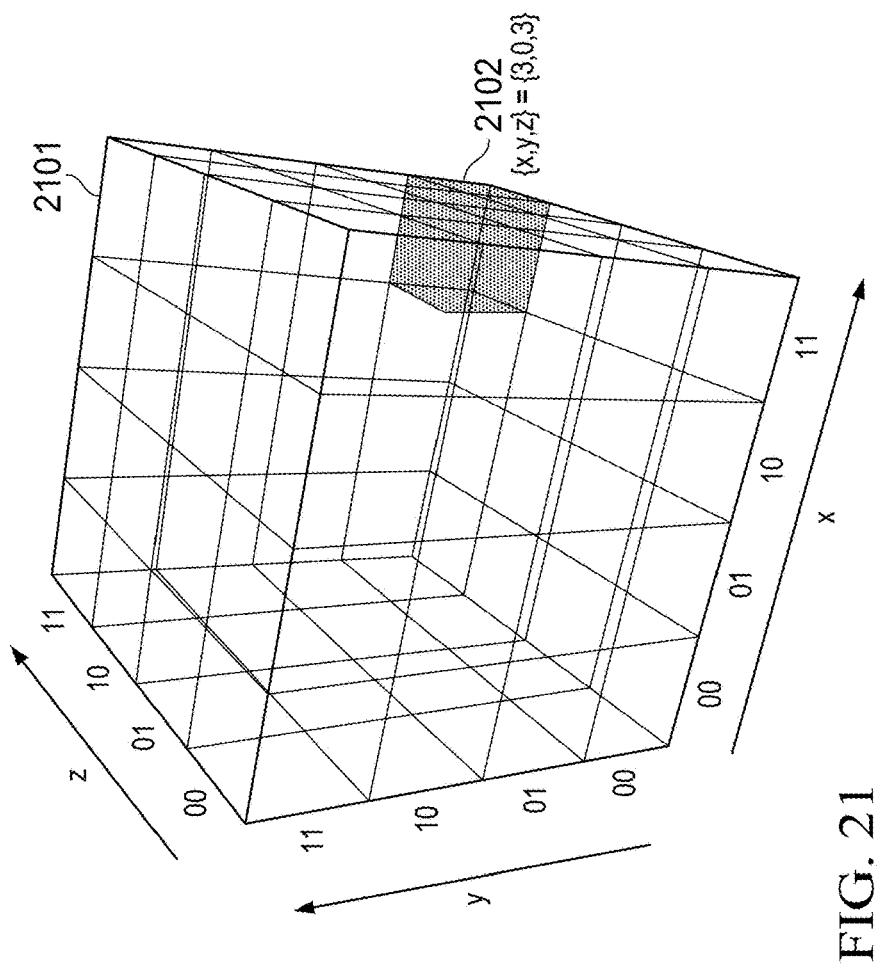
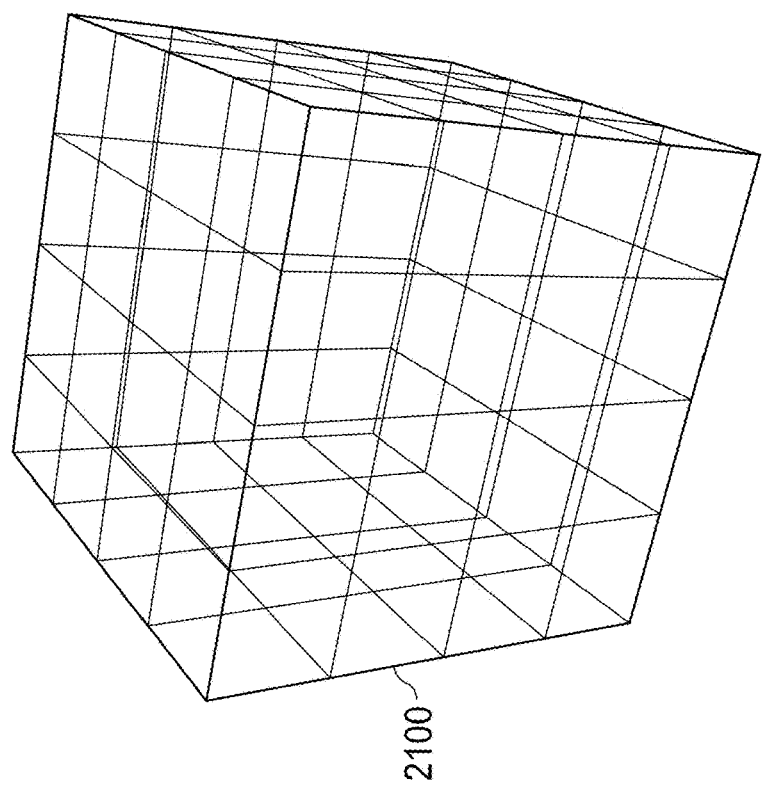
FIG. 21

DYNAMIC CULLING OF MATRIX OPERATIONS

RELATED APPLICATIONS

This application is a continuation of and claims priority to U.S. patent application Ser. No. 17/114,363 mailed on Dec. 7, 2020, and entitled DYNAMIC CULLING OF MATRIX OPERATIONS, which application is a continuation of U.S. patent application Ser. No. 16/326,683 filed on Feb. 19, 2019, issued as U.S. Pat. No. 10,861,217 on Dec. 8, 2020, which application is a national stage application under 35 U.S.C. § 371 of PCT International Application Serial No. PCT/US2017/047695, filed on Aug. 19, 2017, which application claims benefit to U.S. Provisional Patent Application Ser. No. 62/377,471, filed Aug. 19, 2016. The disclosures of the prior applications are considered part of and are incorporated by reference in the disclosure of this application.

TECHNICAL FIELD

This disclosure relates in general to the field of computer systems and, more particularly, to computer vision and augmented or mixed reality systems.

BACKGROUND

The worlds of computer vision and graphics are rapidly converging with the emergence of Augmented Reality (AR), Virtual Reality (VR) and Mixed-Reality (MR) products such as those from MagicLeap™, Microsoft™ HoloLens™, Oculus™ Rift™, and other VR systems such as those from Valve™ and HTC™. The incumbent approach in such systems is to use a separate graphics processing unit (GPU) and computer vision subsystem, which run in parallel. These parallel systems can be assembled from a pre-existing GPU in parallel with a computer vision pipeline implemented in software running on an array of processors and/or programmable hardware accelerators.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labelled in every figure. Nor is every component of each embodiment of the disclosed subject matter shown where illustration is not necessary to allow those of ordinary skill in the art to understand the disclosed subject matter.

FIG. 4 illustrates a composite view of a scene in accordance with some embodiments;

FIG. 9 illustrates operation elimination by 2D convolutional neural networks in accordance with some embodiments;

FIG. 10 illustrates the experimental results from analysis of example test images in accordance with some embodiments;

FIG. 21 illustrates the organization of a voxel cube in accordance with some embodiments;

DETAILED DESCRIPTION OF EXAMPLE EMBODIMENTS

Figure 1:
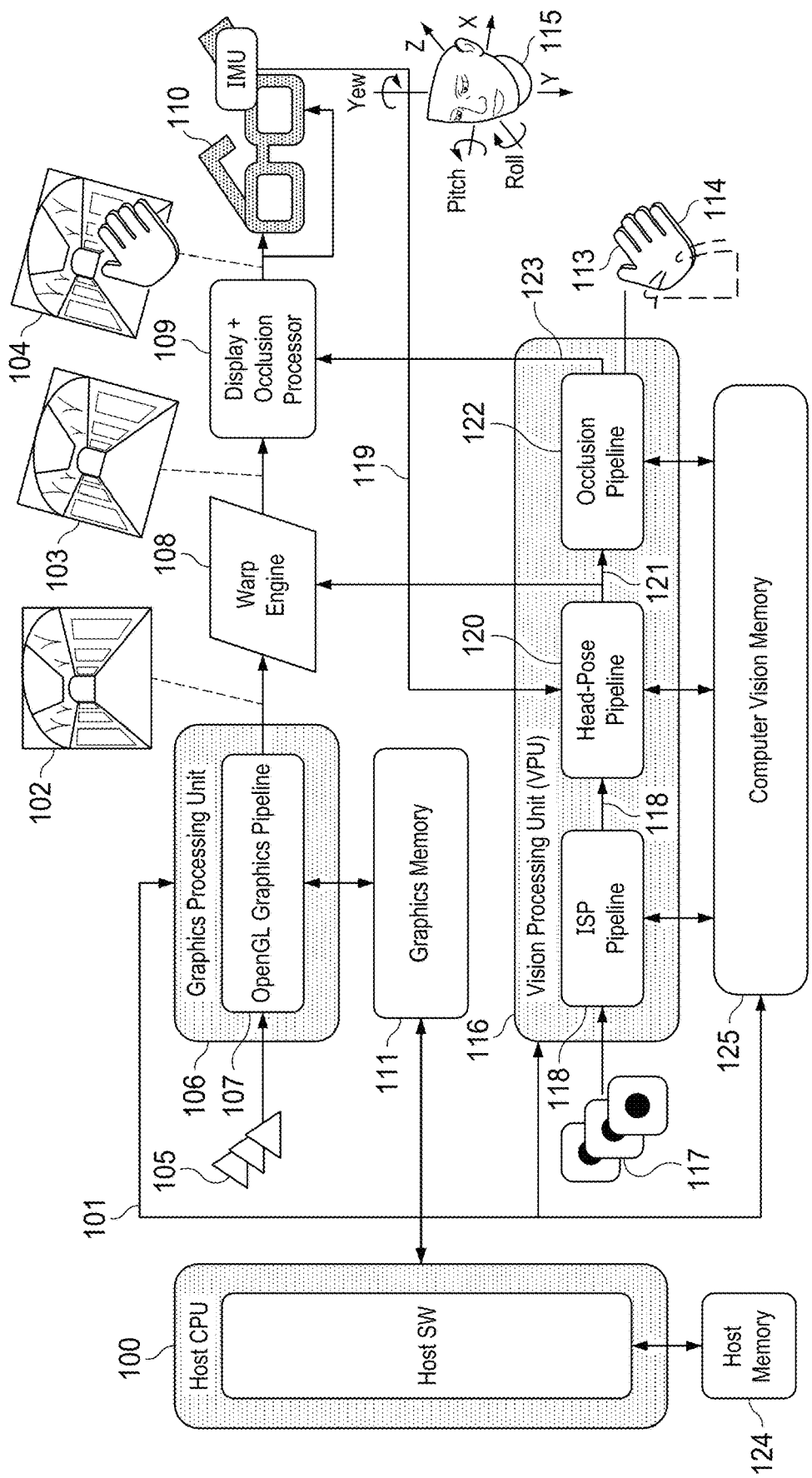
FIG. 1 illustrates a conventional augmented or mixed reality rendering system.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments provided below are exemplary, and that it is contemplated that there are other systems and methods that are within the scope of the disclosed subject matter.

A variety of technologies are emerging based on and incorporating augmented reality, virtual reality, mixed reality, autonomous devices, and robots, which may make use of data models representing volumes of three-dimensional space and geometry. The description of various real and virtual environments using such 3D or volumetric data has traditionally involved large data sets, which some computing systems have struggled to process in a desirable manner. Further, as devices, such as drones, wearable devices, virtual reality systems, etc., grow smaller, the memory and processing resources of such devices may also be constrained. As an example, AR/VR/MR applications may demand high-frame rates for the graphical presentations generated using supporting hardware. However, in some applications, the GPU and computer vision subsystem of such hardware may need to process data (e.g., 3D data) at high rates, such as up to 130 fps (7 msecs), in order to produce desirable results (e.g., to generate a believable graphical scene with frame rates that produce a believable result, prevent motion sickness of the user due to excessive latency, among other example goals. Additional application may be similarly challenged to satisfactorily process data describing large volumes, while meeting constraints in processing, memory, power, application requirements of the corresponding system, among other example issues.

In some implementations, computing systems may be provided with logic to generate and/or use sparse volumetric data, defined according to a format. For instance, a defined volumetric data-structure may be provided to unify computer vision and 3D rendering in various systems and applications. A volumetric representation of an object may be captured using an optical sensor, such as a stereoscopic camera or depth camera, for example. The volumetric representation of the object may include multiple voxels. An improved volumetric data structure may be defined that enables the corresponding volumetric representation to be subdivided recursively to obtain a target resolution of the object. During the subdivision, empty space in the volumetric representation, which may be included in one or more of the voxels, can be culled from the volumetric representation (and supporting operations). The empty space may be an area of the volumetric representation that does not include a geometric property of the object.

Accordingly, in an improved volumetric data structure, individual voxels within a corresponding volume may be tagged as "occupied" (by virtue of some geometry being present within the corresponding volumetric space) or as "empty" (representing that the corresponding volume consists of empty space). Such tags may additionally be interpreted as designating that one or more of its corresponding subvolumes is also occupied (e.g., if the parent or higher level voxel is tagged as occupied) or that all of its subvolumes are empty space (i.e., in the case of the parent, or higher level voxel being tagged empty). In some implementations, tagging a voxel as empty may allow the voxel and/or its corresponding subvolume voxels to be effectively removed from the operations used to generate a corresponding volumetric representation. The volumetric data structure may be according to a sparse tree structure, such as according to a sparse sexaquaternary tree (SST) format. Further, such an approach to a sparse volumetric data structure may utilize comparatively less storage space than is traditionally used to store volumetric representations of objects. Additionally, compression of volumetric data may increase the viability of transmission of such representations and enable faster processing of such representations, among other example benefits.

The volumetric data-structure can be hardware accelerated to rapidly allow updates to a 3D renderer, eliminating delay that may occur in separate computer vision and graphics systems. Such delay can incur latency, which may induce motion sickness in users among other additional disadvantages when used in AR, VR, MR, and other applications. The capability to rapidly test voxels for occupancy of a geometric property in an accelerated data-structure allows for construction of a low-latency AR, VR, MR, or other system, which can be updated in real time.

In some embodiments, the capabilities of the volumetric data-structure may also provide intra-frame warnings. For example, in AR, VR, MR, and other applications, when a user is likely to collide with a real or synthetic object in an imaged scene, or in computer vision applications for drones or robots, when such devices are likely to collide with a real or synthetic object in an imaged scene, the speed of processing provided by the volumetric data structure allows for warning of the impending collision.

Embodiments of the present disclosure may relate to the storage and processing of volumetric data in applications such as robotics, head-mounted displays for augmented and mixed reality headsets as well as phones and tablets. Embodiments of the present disclosure represent each volumetric element (e.g., voxel) within a group of voxels, and optionally physical quantities relating to the voxel's geometry, as a single bit. Additional parameters related to a group of 64 voxels may be associated with the voxels, such as corresponding red-green-blue (RGB) or other coloration encodings, transparency, truncated signed distance function (TSDF), etc. and stored in an associated and optional 64-bit data-structure (e.g., such that two or more bits are used to represent each voxel). Such a representation scheme may realize a minimum memory requirement. Moreover, representing voxels by a single bit allows for the performance of many simplified calculations to logically or mathematically combine elements from a volumetric representation. Combining elements from a volumetric representation can include, for example, OR-ing planes in a volume to create 2D projections of 3D volumetric data, and calculating surface areas by counting the number of occupied voxels in a 2.5D manifold, among others. For comparisons XOR logic may be used to compare 64-bit sub-volumes (e.g., 4^3 sub-volumes), and volumes can be inverted, where objects can be merged to create hybrid objects by ORing them together, among other examples.

FIG. 1 illustrates a conventional augmented or mixed reality system consisting of parallel graphics rendering and computer-vision subsystems with a post-rendering connection apparatus to account for changes due to rapid head movement and changes in the environment which can produce occlusions and shadows in the rendered graphics. In one example implementation, a system may include a host processor 100 supported by host memory 124 to control the execution of a graphics pipeline, computer vision pipeline, and post-rendering correction apparatus by interconnection via bus 101, on-chip network on-chip, or other interconnection. The interconnection allows the host processor 100 running appropriate software to control the execution of the graphics processing unit (GPU) 106, associated graphics memory 111, computer vision pipeline 116, and associated computer vision memory 124. In one example, rendering of graphics using the GPU 106 via an OpenGL graphics shader 107 (e.g., operating on a triangle list 105) may take place at a slower rate than the computer vision pipeline. As a result, post rendering correction via a warp engine 108 and display/occlusion processor 109 may be performed to account for changes in head pose and occluding scene geometry that may have occurred since the graphics was rendered by the GPU 106. The output of the GPU 106 is time-stamped so that it can be used in conjunction with the correct control signals 121 and 123 from the head pose pipeline 120 and occlusion pipeline 123 respectively to produce the correct graphics output to take account of any changes in head pose 119 and occluding geometry 113, among other examples.

In parallel with the GPU 106, a plurality of sensors and cameras (e.g., including active and passive stereo cameras for depth and vision processing 117) may be connected to the computer vision pipeline 116. The computer vision pipeline 116 may include one or more of at least three stages, each of which may contain multiple stages of lower level processing. In one example, the stages in the computer vision pipeline 116 may be the image signal processing (ISP) pipeline 118, head-pose pipeline 120, and occlusion pipeline 122. The ISP pipeline 118 may take the outputs of the input camera sensors 117 and condition them so they can be used for subsequent head-pose and occlusion processing. The head-pose pipeline 120 may take the output of the ISP pipeline 118 and use it together with the output 119 of the inertial measurement unit (IMU) in the headset 110 to compute a change in head-pose since the corresponding output graphics frame was rendered by the GPU 106. The output 121 of the head-pose pipeline (HPP) 120 may be applied to the warp engine 108 along with a user specified mesh to distort the GPU output 102 so that it matches the updated head-pose position 119. The occlusion pipeline 122 may take the output of head-pose pipeline 121 and look for new objects in the visual field such as a hand 113 (or other example object) entering the visual field which should produce a corresponding shadow 114 on the scene geometry. The output 123 of the occlusion pipeline 122 may be used by the display and occlusion processor 109 to correctly overlay the visual field on top of the output 103 of the warp engine 108. The display and occlusion processor 109 produces a shadow mask for synthetic shadows 114 using the computed head-pose 119, and the display and occlusion processor 109 may composite the occluding geometry of the hand 113 on top of the shadow mask to produce a graphical shadow 114 on top of the output 103 of the warp engine 108 and produce the final output frame(s) 104 for display on the augmented/mixed reality headset 110, among other example use cases and features.

Figure 2:
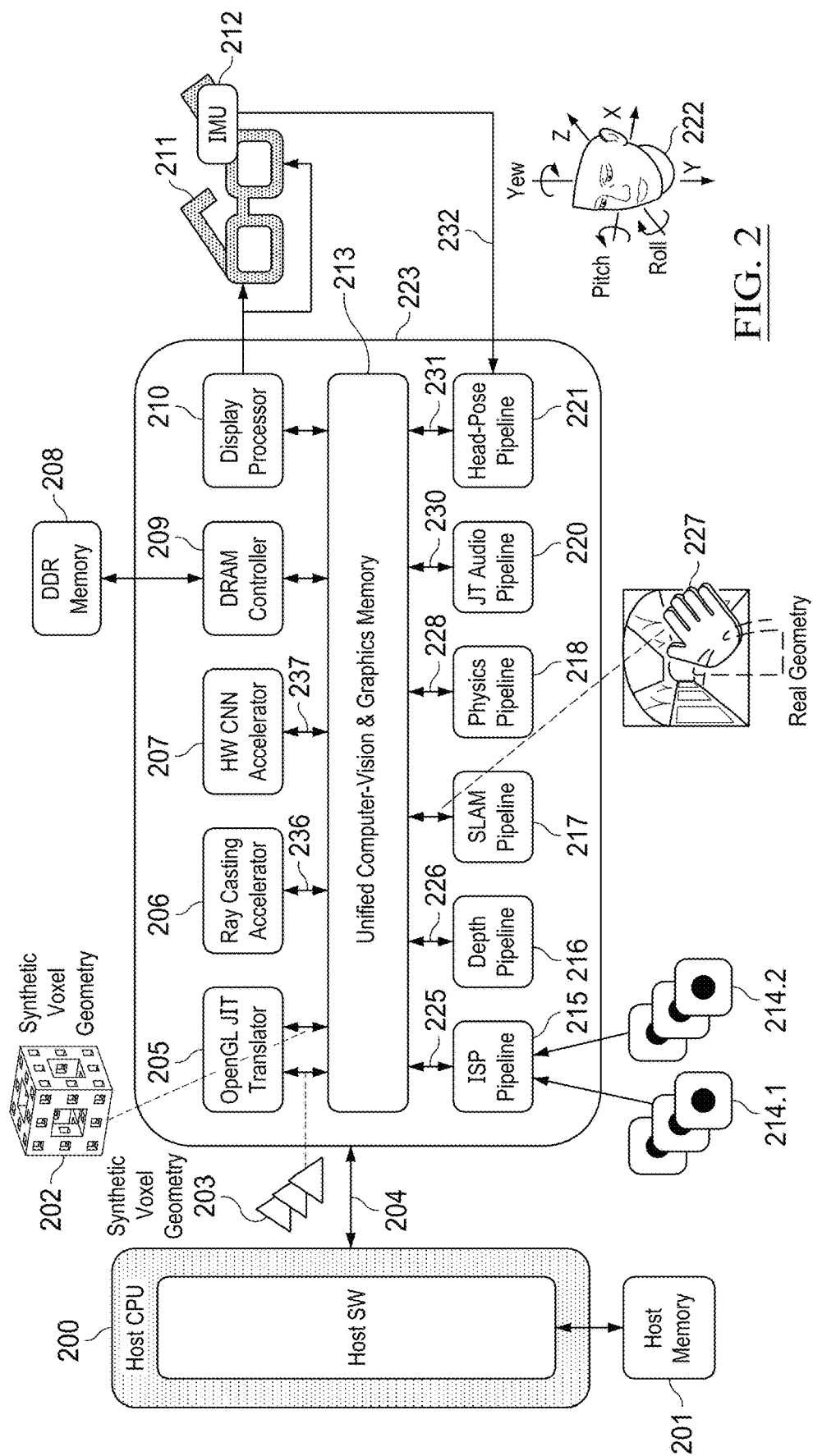
FIG. 2 illustrates a voxel-based augmented or mixed reality rendering system in accordance with some embodiments.

FIG. 2 illustrates a voxel-based augmented or mixed reality rendering system in accordance with some embodiments of the present disclosure. The apparatus depicted in FIG. 2 may include a host system composed on host CPU 200 and associated host memory 201. Such a system may communicate via a bus 204, on-chip network or other communications mechanism, with the unified computer vision and graphics pipeline 223 and associated unified computer vision and graphics memory 213 containing the real and synthetic voxels to be rendered in the final scene for display on a head-mounted augmented or mixed reality display 211. The AR/MR display 211 may also contain a plurality of active and passive image sensors 214 and an inertial measurement unit (IMU) 212, which is used to measure changes to head pose 222 orientation.

In the combined rendering pipeline, synthetic geometry may be generated starting from a triangle list 204 which is processed by an OpenGL JiT (Just-in-Time) translator 205 to produce synthetic voxel geometry 202. The synthetic voxel geometry may be generated, for instance, by selecting a main plane of a triangle from a triangle list. 2D rasterization of each triangle in the selected plane may then be performed (e.g., in the X and Z direction). The third coordinate (e.g., Y) may be created as an attribute to be interpolated across the triangle. Each pixel of the rasterized triangle may result in the definition of a corresponding voxel. This processing can be performed by either a CPU or GPU. When performed by a GPU, each rasterized triangle may be read back from the GPU to create a voxel where the GPU drew a pixel, among other example implementations. For instance, a synthetic voxel may be generated using a 2D buffer of lists, where each entry of the list stores the depth information of a polygon rendered at that pixel. For instance, a model can be rendered using an orthographic viewpoint (e.g., top-down). For example, every (x, y) provided in an example buffer may represent the column at (x, y) in a corresponding voxel volume (e.g., from (x,y,0) to (x,y,4095)). Each column may then be rendered from the information as 3D scanlines using the information in each list.

Continuing with the example of FIG. 2, in some implementations the synthetic voxel geometry 202 may be combined with measured geometry voxels 227 constructed using a simultaneous localization and mapping (SLAM) pipeline 217. The SLAM pipeline may use active sensors and/or passive image sensors 214 (e.g., 214.1 and 214.2) which are first processed using an image signal processing (ISP) pipeline 215 to produce an output 225, which may be converted into depth images 226 by a depth pipeline 216. Active or passive image sensors 214 (214.1 and 214.2) may include active or passive stereo sensors, structured light sensors, time-of-flight sensors, among other examples. For instance, the depth pipeline 216 can process either depth data from a structured light or time-of-flight sensor 214.1 or alternately a passive stereo sensors 214.2. In one example implementation, stereo sensors 214.2 may include a passive pair of stereo sensors, among other example implementations.

Depth images generated by the depth pipeline 215 may be processed by a dense SLAM pipeline 217 using a SLAM algorithm (e.g., Kinect Fusion) to produce a voxelized model of the measured geometry voxels 227. A ray-tracing accelerator 206 may be provided that may combine the measured geometry voxels 227 (e.g., real voxel geometry) with the synthetic voxel geometry 202 to produce a 2D rendering of the scene for output to a display device (e.g., a head mounted display 211 in a VR or AR application) via a display processor 210. In such an implementation, a complete scene model may be constructed from real voxels of measured geometry voxels 227 and synthetic geometry 202. As a result, there is no requirement for warping of 2D rendered geometry (e.g., as in FIG. 1). Such an implementation may be combined with head-pose tracking sensors and corresponding logic to correctly align the real and measured geometry. For instance, an example head-pose pipeline 221 may process head-pose measurements 232 from an IMU 212 mounted in the head mounted display 212 and the output 231 of the head-pose measurement pipeline may be taken into account during rendering via the display processor 210.

In some examples, a unified rendering pipeline may also use the measured geometry voxels 227 (e.g., a real voxel model) and synthetic geometry 202 (e.g., a synthetic voxel model) in order to render audio reverberation models and model the physics of a real-world, virtual, or mixed reality scene. As an example, a physics pipeline 218 may take the measured geometry voxels 227 and synthetic geometry 202 voxel geometry and compute the output audio samples for left and right earphones in a head mounted display (HMD) 211 using the ray casting accelerator 206 to compute the output samples 230 using acoustic reflection coefficients built into the voxel data-structure. Similarly, the unified voxel model consisting of 202 and 227 may also be used to determine physics updates for synthetic objects in the composite AR/MR scene. The physics pipeline 218 takes the composite scene geometric as inputs and computes collisions using the ray-casting accelerator 206 before computing updates 228 to the synthetic geometry 202 for rendering and as a basis for future iterations of the physics models.

In some implementations, a system, such as the system shown in FIG. 2, may be additionally provided with one or more hardware accelerators to implement and/or utilize convolutional neural networks (CNNs) that can process either RGB video/image inputs from the output of the ISP pipeline 215, volumetric scene data from the output of the SLAM pipeline 217, among other examples. Neural network classifiers can run either exclusively using the hardware (HW) convolutional neural network (CNN) accelerator 207 or in a combination of processors and HW CNN accelerator 207 to produce an output classification 237. The availability of a HW CNN accelerator 207 to do inference on volumetric representations may allow groups of voxels in the measured geometry voxels 227 to be labelled as belonging to a particular object class, among other example uses.

Labeling voxels (e.g., using a CNN and supporting hardware acceleration) may allow those objects to which those voxels belong to be recognized by the system as corresponding to the known object and the source voxels can be removed from the measured geometry voxels 227 and replaced by a bounding box corresponding to the object and/or information about the object's origin, object's pose, an object descriptor, among other example information. This may result in a much more semantically meaningful description of the scene that can be used, for example, as an input by a robot, drone, or other computing system to interact with objects in the scene, or an audio system to look up the sound absorption coefficient of objects in the scene and reflect them in the acoustic model of the scene, among other example uses.

One or more processor devices and hardware accelerators may be provided to implement the pipelines of the example system shown and described in FIG. 2. In some implementations, all of the hardware and software elements of the combined rendering pipeline may share access to a DRAM controller 209 which in turn allows data to be stored in a shared DDR memory device 208, among other example implementations.

Figure 3:
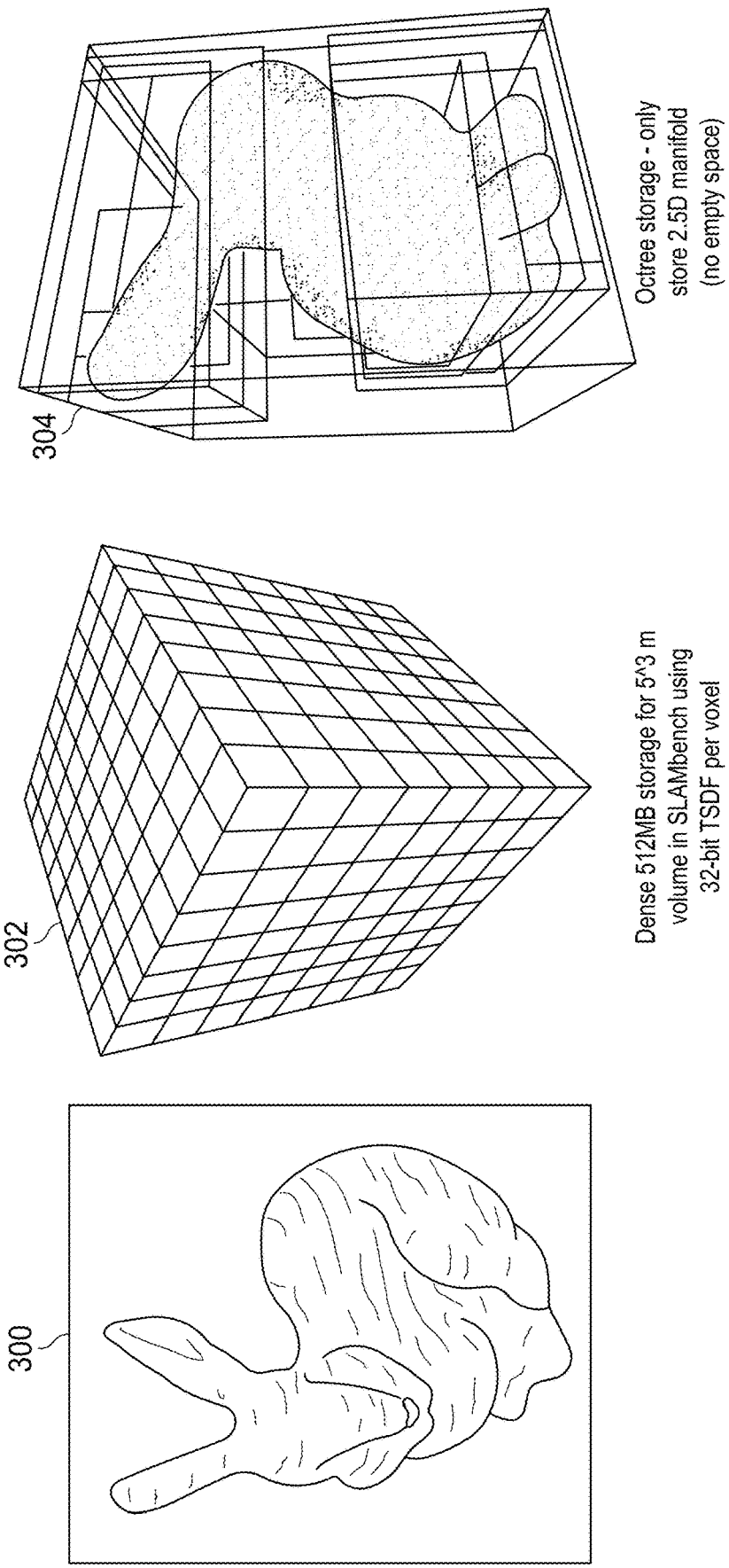
FIG. 3 illustrates the difference between dense and sparse volumetric representations in accordance with some embodiments.

FIG. 3 is presented to illustrate a difference between dense and sparse volumetric representations in accordance with some embodiments. As shown in the example of FIG. 3, a real world or synthetic object 300 (e.g., a statue of a rabbit) can be described in terms of voxels either in a dense manner as shown in 302 or in a sparse manner as shown in 304. The advantage of the dense representation such as 302 is uniform speed of access to all voxels in the volume, but the downside is the amount of storage that may be required. For example, for a dense representation, such as a $512^3$ element volume (e.g., corresponding to a 5 m in 1 cm resolution for a volume scanned using a Kinect sensor), 512 Mbytes to store a relatively small volume with a 4 Byte truncated signed distance function (TSDF) for each voxel. An octree representation 304 embodying a sparse representation, on the other hand, may store only those voxels for which there is actual geometry in the real world scene, thereby reducing the amount of data needed to store the same volume.

Figure 5:
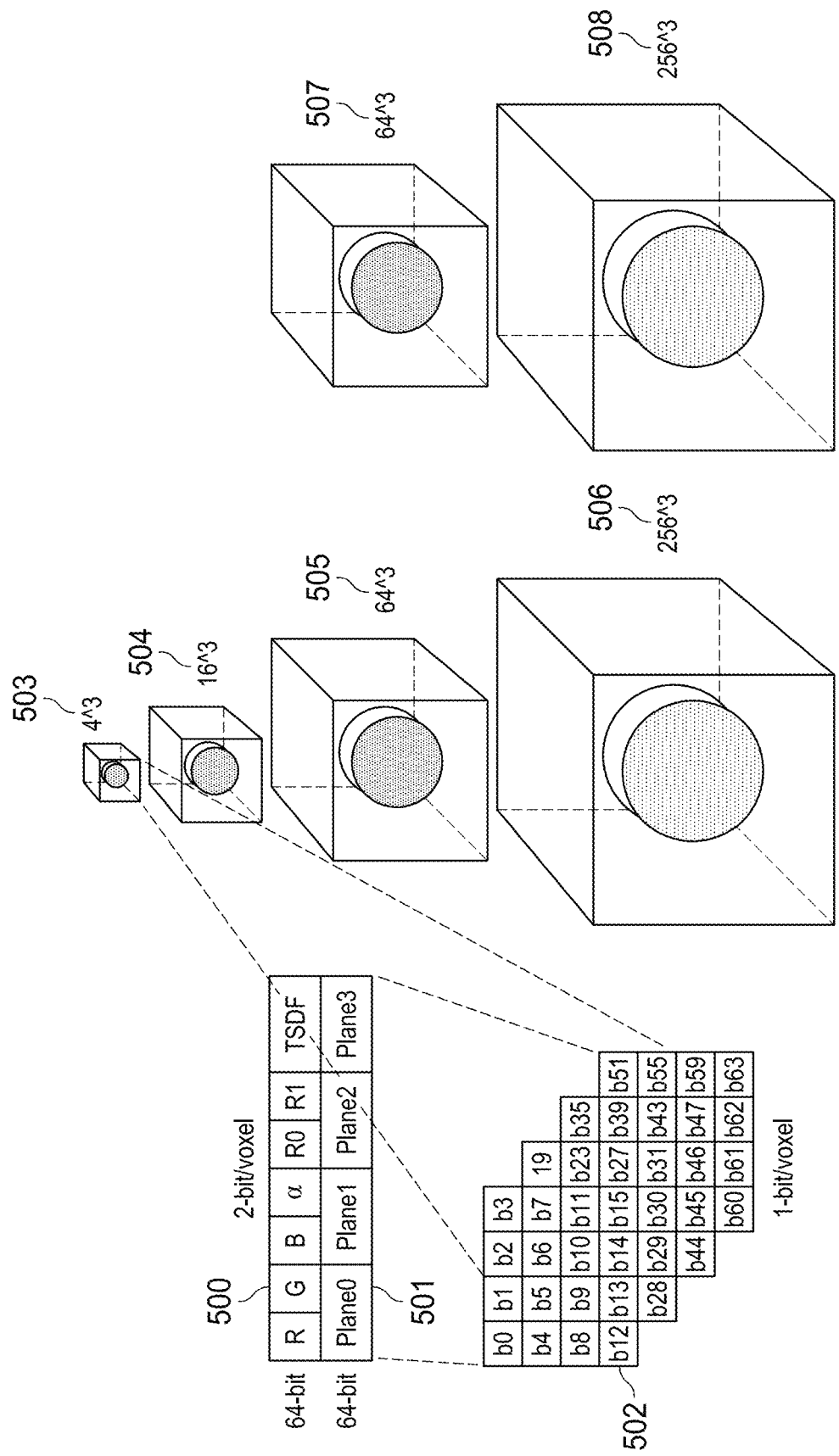
FIG. 5 illustrates the level of detail in an example element tree structure in accordance with some embodiments.

Turning to FIG. 4, a composite view of an example scene is illustrated in accordance with some embodiments. In particular, FIG. 4 shows how a composite view of a scene 404 can be maintained, displayed or subject to further processing using parallel data structures to represent synthetic voxels 401 and real world measured voxels 403 within equivalent bounding boxes 400 and 402 respectively for the synthetic and real-world voxel data. FIG. 5 illustrates the level of detail in a uniform $4^3$ element tree structure in accordance with some embodiments. In some implementations, as little as 1 bit may be utilized to describe each voxel in the volume using an octree representation, such as represented in the example of FIG. 5. However, a disadvantage of octree based techniques may be the number of indirect memory accesses utilized to access a particular voxel in the octree. In the case of a sparse voxel octree, the same geometry may be implicitly represented at multiple levels of detail advantageously allowing operations such as ray-casting, game-physics, CNNs, and other techniques to allow empty parts of a scene to be culled from further calculations leading to an overall reduction in not only storage required, but also in terms of power dissipation and computational load, among other example advantages.

In one implementation, an improved voxel descriptor (also referred to herein as "volumetric data structure") may be provided to organize volumetric information as a $4^3$ (or 64-bit) unsigned integer, such as shown in 501 with a memory requirement of 1 bit per voxel. In this example, 1-bit per voxel is insufficient to store a truncated signed distance function value (compared with TSDFs in SLAMbench/KFusion which utilize 64-bits). In the present example, an additional (e.g., 64-bit) field 500 may be included in the voxel descriptor. This example may be further enhanced such that while the TSDF in 64-bit field 500 is 16-bits, an additional 2-bits of fractional resolution in x, y and z may be provided implicitly in the voxel descriptor 501 to make the combination of the voxel TSDF in 64-bit field 500 and voxel location 501 equivalent to a much higher resolution TSDF, such as used in SLAMbench/KFusion or other examples. For instance, the additional data in the 64-bit field 500 (voxel descriptor) may be used to store subsampled RGB color information (e.g., from the scene via passive RGB sensors) with one byte each, and an 8-bit transparency value alpha, as well as two 1-byte reserved fields R1 and R2 that may be application specific and can be used to store, for example, acoustic reflectivity for audio applications, rigidity for physics applications, object material type, among other examples.

As shown in FIG. 5, the voxel descriptor 501 can be logically grouped into four 2D planes, each of which contain 16 voxels 502. These 2D planes (or voxel planes) may describe each level of an octree style structure based on successive decompositions in ascending powers of 4, as represented in FIG. 5. In this example implementation, the 64-bit voxel descriptor is chosen because it is a good match for a 64-bit bus infrastructure used in a corresponding system implementation (although other voxel descriptor sizes and formats may be provided in other system implementations and sized according to the bus or other infrastructure of the system). In some implementations, a voxel descriptor may be sized to reduce the number of memory accesses used to obtain the voxel. For instance, a 64-bit voxel descriptor may be used to reduce the number of memory accesses necessary to access a voxel at an arbitrary level in the octree by a factor of 2 compared to a traditional octree which operates on $2^3$ elements, among other example considerations and implementations.

In one example, an octree can be described starting from a $4^3$ root volume 503, and each non-zero entry in which codes for the presence of geometry in the underlying layers 504, 505 and 506 are depicted in the example $256^3$ volume. In this particular example, four memory accesses may be used in order to access the lowest level in the octree. In cases where such overhead is too high, an alternate approach may be adopted to encode the highest level of the octree as a larger volume, such as $64^3$, as shown in 507. In this case, each non-zero entry in 507 may indicate the presence of an underlying $4^3$ octree in the underlying $256^3$ volume 508. The result of this alternate organization is that only two memory accesses are required to access any voxel in the $256^3$ volume 508 compared to the alternate formulation shown in 503, 504 and 505. This latter approach is advantageous in the case that the device hosting the octree structure has a larger amount of embedded memory, allowing only the lower and less frequently accessed parts of the voxel octree 508 in external memory. This approach may cost more in terms of storage, for instance, where the full, larger (e.g., $64^3$) volume is to be stored in on-chip memory, but the tradeoff may allow faster memory access (e.g., 2×) and much lower power dissipation, among other example advantages.

Figure 6:
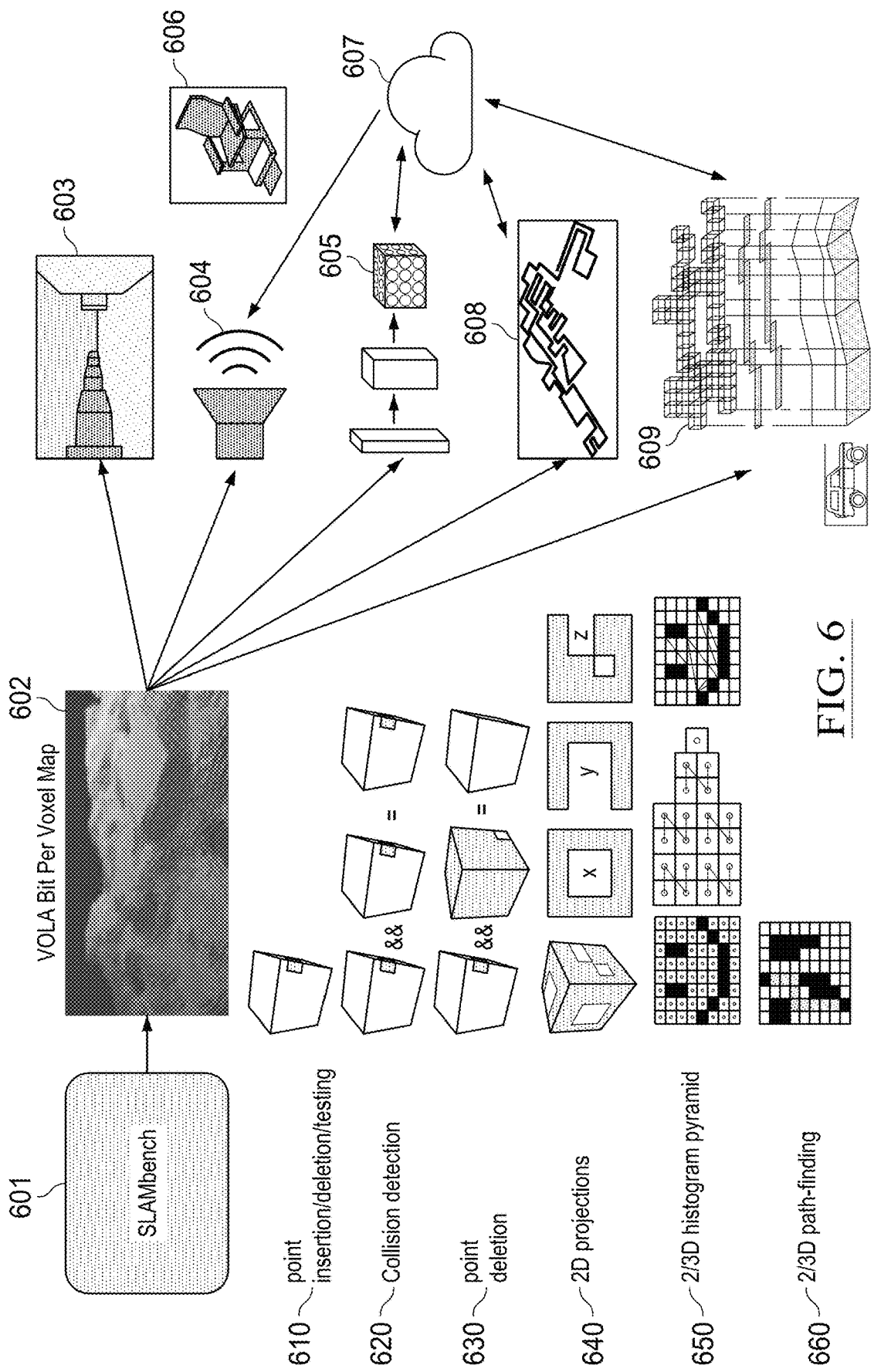
FIG. 6 illustrates applications which can utilize the data-structure and voxel data of the present application in accordance with some embodiments.

Turning to FIG. 6, a block diagram is shown illustrating example applications which may utilize the data-structure and voxel data of the present application in accordance with some embodiments. In one example, such as that shown in FIG. 5, additional information may be provided through an example voxel descriptor 500. While the voxel descriptor may increase the overall memory utilized to 2 bits per voxel, the voxel descriptor may enable a wide range of applications, which can make use of the voxel data, such as represented in FIG. 6. For instance, a shared volumetric representation 602, such as generated using a dense SLAM system 601 (e.g., SLAMbench), can be used in rendering the scene using graphic ray-casting or ray-tracing 603, used in audio ray-casting 604, among other implementations. In still other examples, the volumetric representation 602 can also be used in convolutional neural network (CNN) inference 605, and can be backed up by cloud infrastructure 607. In some instances, cloud infrastructure 607 can contain detailed volumetric descriptors of objects such as a tree, piece of furniture, or other object (e.g., 606) that can be accessed via inference. Based on inferring or otherwise identifying the object, corresponding detailed descriptors may be returned to the device, allowing voxels of volumetric representation 602 to be replaced by bounding box representations with pose information and descriptors containing the properties of the objects, among other example features.

In still other embodiments, the voxel models discussed above may be additionally or alternatively utilized in some systems to construct 2D maps of example environments 608 using 3D-to-2D projections from the volumetric representation 602. These 2D maps can again be shared via communicating machines via cloud infrastructure and/or other network-based resources 607 and aggregated (e.g., using the same cloud infrastructure) to build higher quality maps using crowd-sourcing techniques. These maps can be shared by the cloud infrastructure 607 to connected machines and devices. In still further examples, 2D maps may be refined for ultra-low bandwidth applications using projection followed by piecewise simplification 609 (e.g., assuming fixed width and height for a vehicle or robot). The simplified path may then only have a single X,Y coordinate pair per piecewise linear segment of the path, reducing the amount of bandwidth required to communicate the path of the vehicle 609 to cloud infrastructure 607 and aggregated in that same cloud infrastructure 607 to build higher quality maps using crowd-sourcing techniques. These maps can be shared by cloud infrastructure 607 to connected machines and devices.

In order to enable these different applications, in some implementations, common functionality may be provided, such as through a shared software library, which in some embodiments may be accelerated using hardware accelerators or processor instruction set architecture (ISA) extensions, among other examples. For instance, such functions may include the insertion of voxels into the descriptor, the deletion of voxels, or the lookup of voxels 610. In some implementations, a collision detection function 620 may also be supported, as well as point/voxel deletion from a volume 630, among other examples. As introduced above, a system may be provided with functionality to quickly generate 2D projections 640 in X-, Y- and Z-directions from a corresponding volumetric representation 602 (3D volume) (e.g., which may serve as the basis for a path or collision determination). In some cases, it can also be advantageous to be able to generate triangle lists from volumetric representation 602 using histogram pyramids 650. Further, a system may be provided with functionality for fast determination of free paths 660 in 2D and 3D representations of a volumetric space 602. Such functionality may be useful in a range of applications. Further functions may be provided, such as elaborating the number of voxels in a volume, determining the surface of an object using a population counter to count the number of 1 bits in the masked region of the volumetric representation 602, among other examples.

Figure 7:
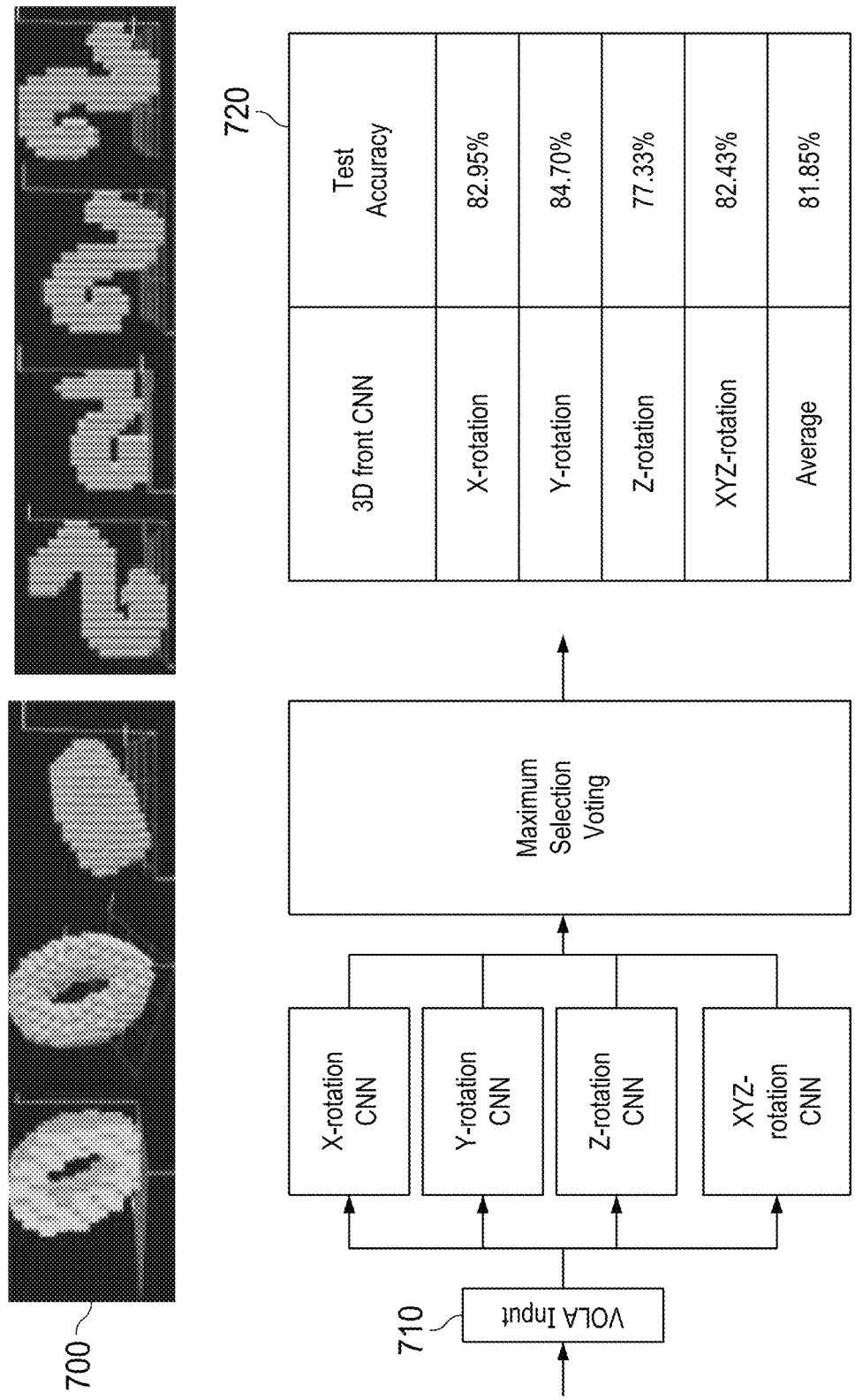
FIG. 7 illustrates an example network used to recognize 3D digits in accordance with some embodiments.

Turning to the simplified block diagram of FIG. 7, an example network is illustrated including systems equipped with functionality to recognize 3D digits in accordance with at least some embodiments. For instance, one of the applications shown in FIG. 6 is the volumetric CNN application 605, which is described in more detail in FIG. 7 where an example network is used to recognize 3D digits 700 generated from a data set, such as the Mixed National Institute of Standards and Technology (MNIST) dataset. Digits within such a data set may be used to train a CNN based convolutional network classifier 710 by applying appropriate rotations and translations in X, Y and Z to the digits before training. When used for inference in an embedded device, the trained network 710 can be used to classify 3D digits in the scene with high accuracy even where the digits are subject to rotations and translations in X, Y and Z 720, among other examples. In some implementations, the operation of the CNN classifier can be accelerated by the HW CNN accelerator 207 shown in FIG. 2. As the first layer of the neural network performs multiplications using the voxels in the volumetric representation 602, these arithmetic operations can be skipped as multiplication by zero is always zero and multiplication by a data value A by one (voxel) is equal to A.

Figure 8:
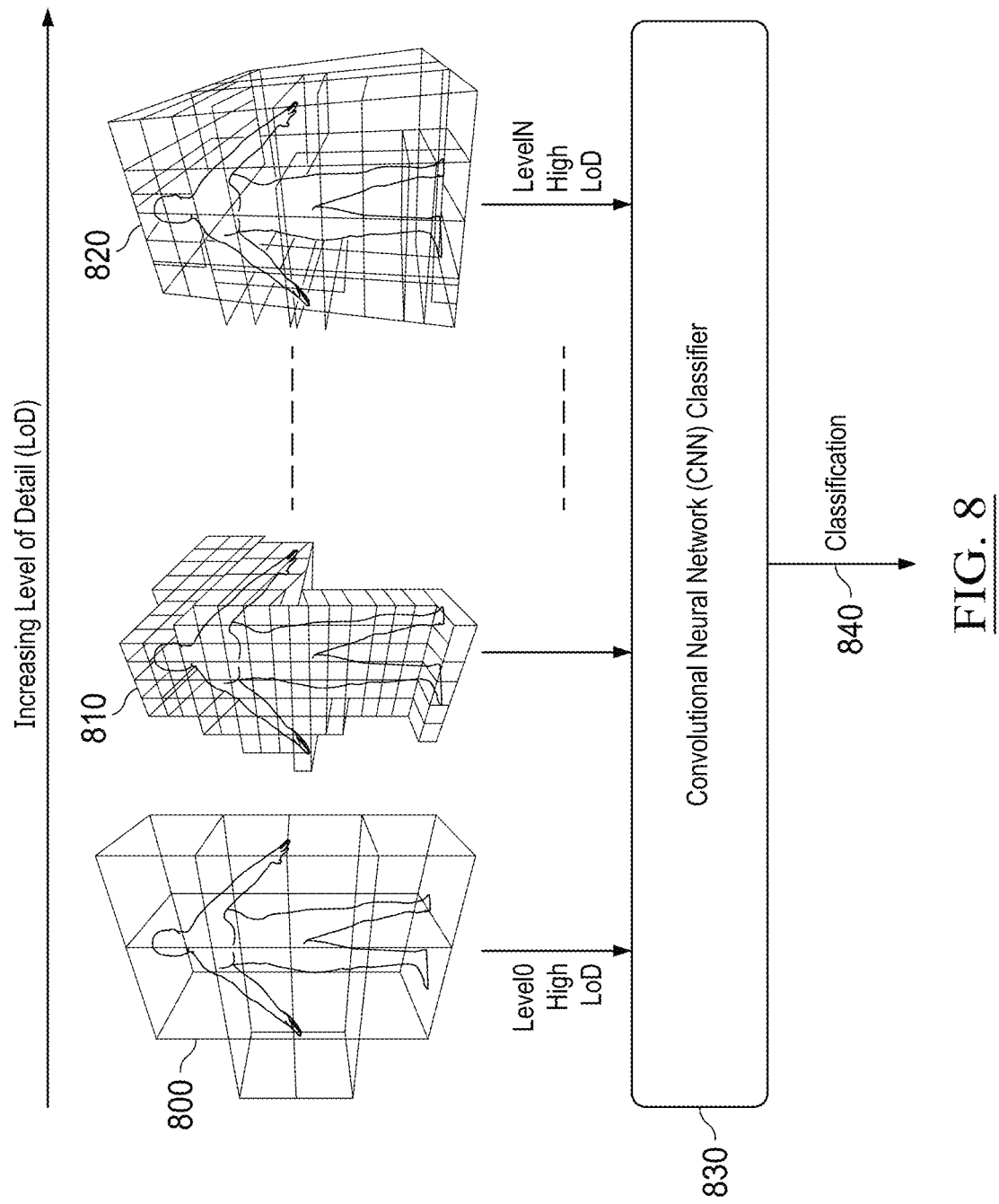
FIG. 8 illustrates multiple classifications performed on the same data structure using implicit levels of detail in accordance with some embodiments.

FIG. 8 illustrates multiple classifications performed on the same data structure using implicit levels of detail. A further refinement of the CNN classification using volumetric representation 602 may be that, as the octree representation contains multiple levels of detail implicitly in the octree structure as shown in FIG. 5, multiple classifications can be performed on the same data structure using the implicit levels of detail 800, 810 and 820 in parallel using a single classifier 830 or multiple classifiers in parallel, such as shown in FIG. 8. In traditional systems, comparable parallel classification may be slow due to the required image resizing between classification passes. Such resizing may be foregone in implementations applying the voxel structures discussed herein, as the same octree may contain the same information at multiple levels of detail. Indeed, a single training dataset based on volumetric models can cover all of the levels of detail rather than resized training datasets, such as would be required in conventional CNN networks.

Turning to the example of FIG. 9, an example operation elimination is illustrated by 2D CNNs in accordance with some embodiments. Operation elimination can be used on 3D volumetric CNNs, as well as on 2D CNNs, such as shown in FIG. 9. For instance, in FIG. 9, in a first layer, a bitmap mask 900 can be used to describe the expected "shape" of the input 910 and may be applied to an incoming video stream 920. In one example, operation elimination can be used not only on 3D volumetric CNNs, but also on 2D volumetric CNNs. For instance, in a 2D CNN of the example of FIG. 9, a bitmap mask 900 may be applied to a first layer of the CNN to describe the expected "shape" of the input 910 and may be applied to input data of the CNN, such as an incoming video stream 820. As an example, the effect of applying bitmap masks to images of pedestrians for training or inference in CNN networks is shown in FIG. 9 where 901 represents an original image of a pedestrian 901, with 903 representing the corresponding version with bitmap mask applied. Similarly, an image containing no pedestrian is shown in 902 and the corresponding bitmap masked version in 904. The same method can be applied to any kind of 2D or 3D object in order to reduce the number of operations required for CNN training or inference through knowledge of the expected 2D or 3D geometry expected by the detector. An example of a 3D volumetric bitmap is shown in 911. The use of 2D bitmaps for inference in a real scene is shown in 920.

In the example implementation of FIG. 9, a conceptual bitmap is shown (at 900) while the real bitmap is generated by averaging a series of training images for a particular class of object 910. The example shown is two dimensional, however similar bitmap masks can also be generated for 3D objects in the proposed volumetric data format with one bit per voxel. Indeed the method could also potentially be extended to specify expected color range or other characteristics of the 2D or 3D object using additional bits per voxel/pixel, among other example implementations.

FIG. 10 is a table illustrating results of an example experiment involving the analysis of 10,000 CIFAR-10 test images in accordance with some embodiments. In some implementations, operation elimination can be used to eliminate intermediate calculations in 1D, 2D, and 3D CNNs due to Rectified Linear Unit (ReLU) operations which are frequent in CNN networks such as LeNet 1000, shown in FIG. 10. As shown in FIG. 10, in an experiment using 10,000 CIFAR-10 test images, the percentage of data-dependent zeroes generated by the ReLU units may reach up to 85%, meaning that in the case of zeroes, a system may be provided that recognizes the zeros and, in response, does not fetch corresponding data and perform corresponding multiplication operations. In this example, the 85% represents the percentage of ReLU dynamic zeros generated from the Modified National Institute of Standards and Technology database (MNIST) test dataset. The corresponding operation eliminations corresponding to these zero may serve to reduce power dissipation and memory bandwidth requirements, among other example benefits.

Trivial operations may be culled based on a bitmap. For instance, the use of such a bitmap may be according to the principles and embodiments discussed and illustrated in U.S. Pat. No. 8,713,080, titled "Circuit for compressing data and a processor employing the same," which is incorporated by reference herein in its entirety. Some implementations, may provide hardware capable of using such bitmaps, such as systems, circuitry, and other implementations discussed and illustrated in U.S. Pat. No. 9,104,633, titled "Hardware for performing arithmetic operations," which is also incorporated by reference herein in its entirety.

In one example implementation, a computing system may be equipped with logic implemented in hardware circuitry and/or executable firmware and/or software logic to obtain a bitmap corresponding to data that is to be the subject of one or more operations. The operations may include arithmetic operations (e.g., multiplication, adding, etc.) to be performed on the data, with the data serving as an operand (or multiple operands). Alternatively (or additionally), the operations may include fetching the data. For instance, the data may embody a three-dimensional (3D) matrix composed of multiple matrix elements. Matrix arithmetic may be performed on the 3D matrix. Further, individual elements of the matrix may be fetched from memory (e.g., to perform a corresponding arithmetic operation). In some implementations, the bitmap may be based on the trivial nature of zeros-multiplication (i.e., that multiplying an operand "0" always results in a product "0"). The bitmap may identify or correspond to 3D matrix elements with the value of "0". Processing the bitmap (e.g., by enabled hardware) may allow the actual multiplication operations (and even the fetch of the operands to be multiplied), which involve a zero operand, to be skipped. Specifically, 3D matrix multiplication may involve the element-wise multiplication of elements in the 3D matrix-non-zero elements may be multiplied as would customary, while multiplication steps involving zero elements are skipped. In some cases, the expected result of a multiplication step (i.e., a "0" where one of the operand is also a "0") may simply be provided by logic of the system (e.g., using a multiplexer configured to return a zero when such operations are identified from a corresponding bitmap), rather than deriving the result through a performed multiplication operation. In some cases, bitmaps may be pre-derived and provided to a system controller to utilize the bitmap to cull, skip, or eliminate some operations to be performed. In other instances, the bitmap may be generated dynamically during operation of a system and based on prior operation results. For instance, bitmaps may be applied in convolutional neural network (CNN) applications, with the results of one CNN layer serving as the basis of a bitmap to be employed in operations of a subsequent CNN layer, among other examples.

Figure 11:
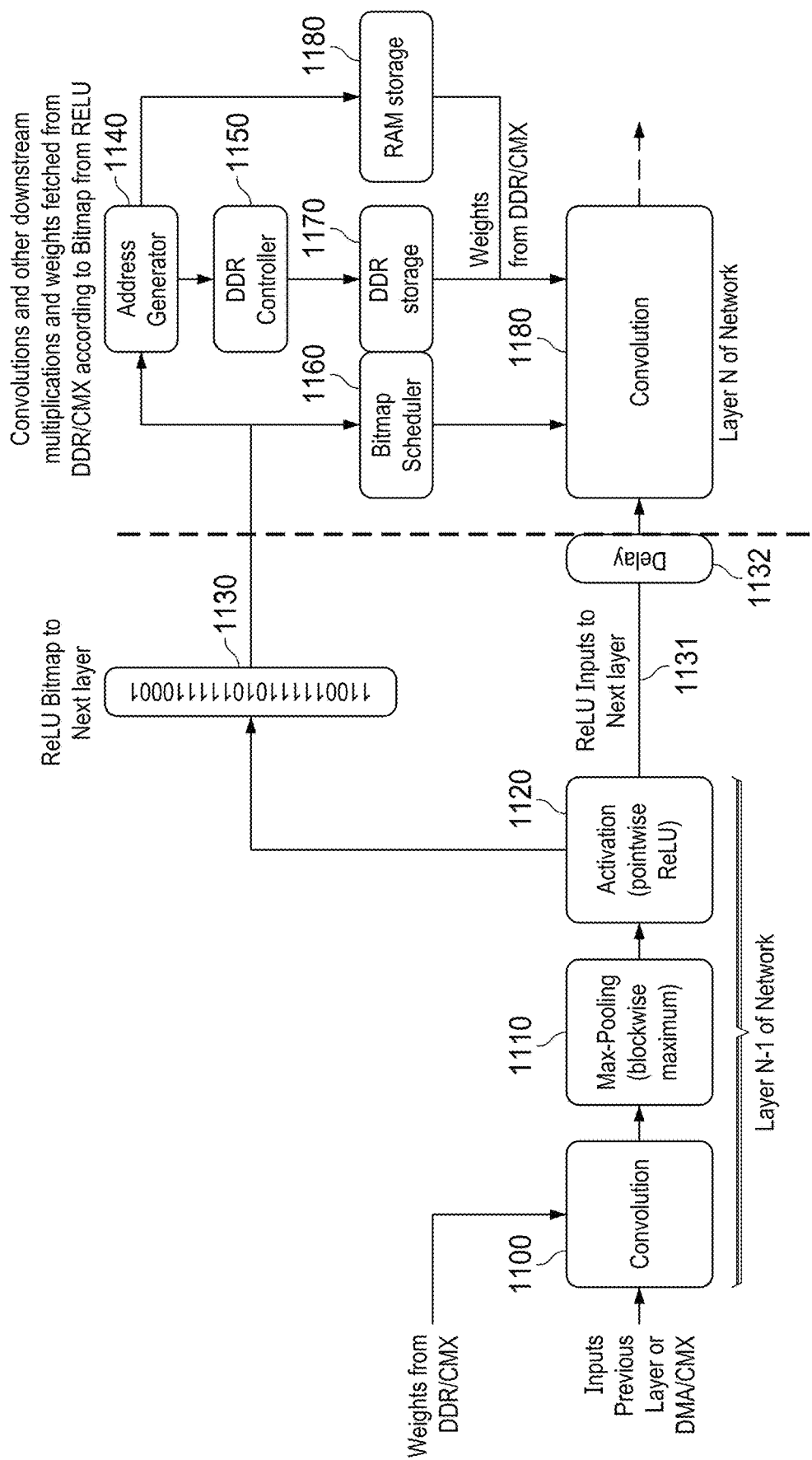
FIG. 11 illustrates hardware for culling operations in accordance with some embodiments.

FIG. 11 illustrates hardware that may be incorporated into a system to provide functionality for culling trivial operations based on a dynamically generated bitmap in accordance with some embodiments. In this example, a multi-layer neural network is provided, which includes repeated convolutional layers. The hardware may include one or more processors, one or more microprocessors, one or more circuits, one or more computers, and the like. In this particular example, a neural network includes an initial convolutional processing layer 1100, followed by pooling processing 1110, and finally activation function processing, such as a rectified linear unit (ReLU) function 1120. The output of the ReLU unit 1120, which provides ReLU output vector 1131, may be connected to a subsequent convolutional processing layer 1180 (e.g., possibly via delay 1132), which receives ReLU output vector 1131. In one example implementation, a ReLU bitmap 1130 may also be generated in parallel with the connection of the ReLU unit 1120 to the following convolution unit 1180, the ReLU bitmap 1130 denoting which elements in the ReLU output vector 1131 are zeroes and which are non-zeroes.

In one implementation, a bitmap (e.g., 1130) may be generated or otherwise provided to inform enabled hardware of opportunities to eliminate operations involved in calculations of the neural network. For instance, the bits in the ReLU bitmap 1130 may be interpreted by a bitmap scheduler 1160, which instructs the multipliers in the following convolutional unit 1180 to skip zero entries of the ReLU output vector 1131 where there are corresponding binary zeroes in the ReLU bitmap 1130, given that multiplication by zero will always produce zero as an output. In parallel, memory fetches from the address generator 1140 for data/weights corresponding to zeroes in the ReLU bitmap 1130 may also be skipped as there is little value in fetching weights that are going to be skipped by the following convolution unit 1180. If weights are to be fetched from an attached DDR DRAM storage device 1170 via a DDR controller 1150, the latency may be so high that it is only possible to save some on-chip bandwidth and related power dissipation. On the other hand, if weights are fetched from on-chip RAM 1180 storage, it may be possible to bypass/skip the entire weight fetch operation, particularly if a delay corresponding to the RAM/DDR fetch delay 1132 is added at the input to the following convolution unit 1180.

Figure 12:
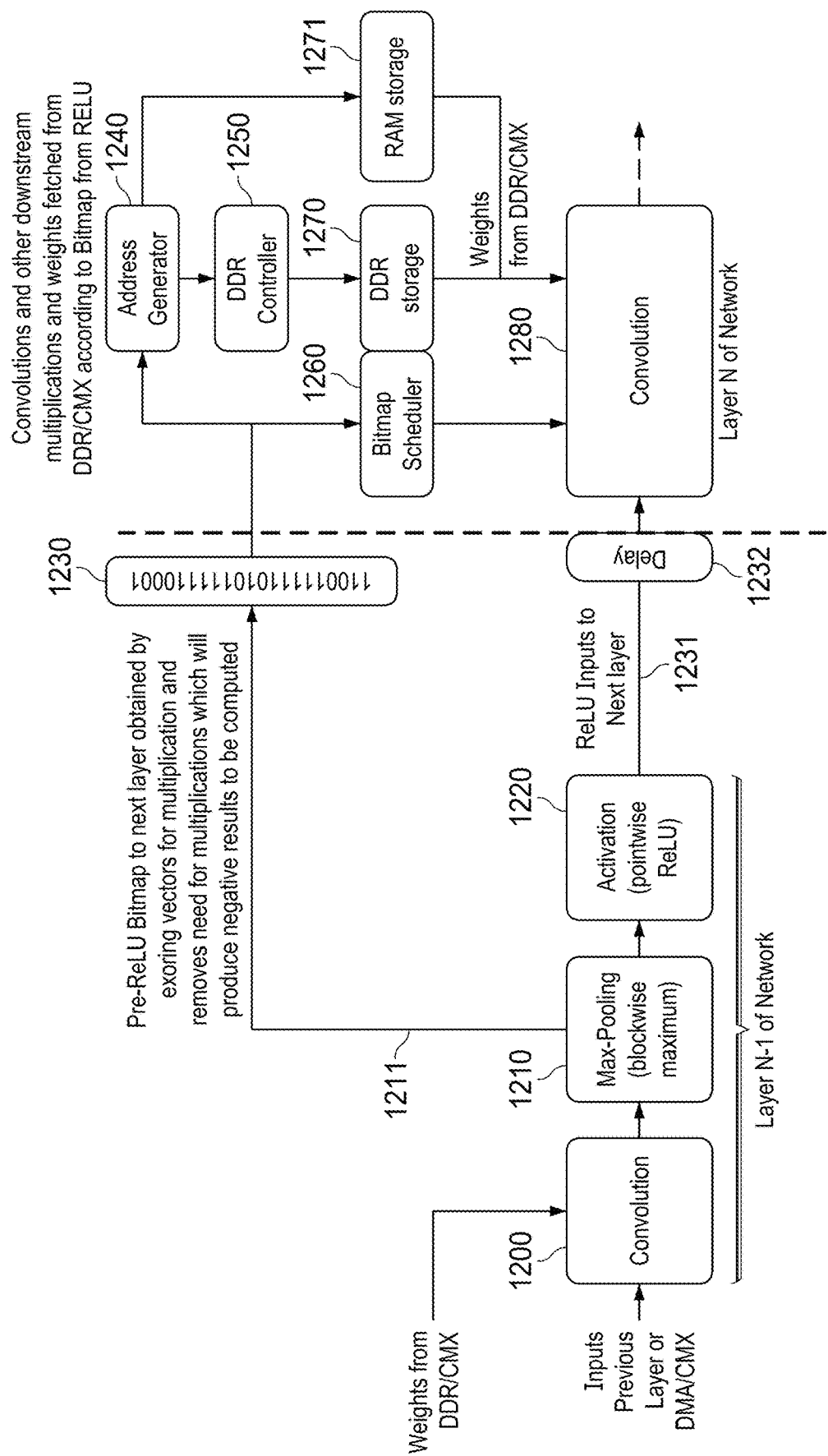
FIG. 12 illustrates a refinement to the hardware for culling operations in accordance with some embodiments.

Turning to FIG. 12, a simplified block diagram is presented to illustrate a refinement to example hardware equipped with circuitry and other logic for culling trivial operations (or performing operation elimination) in accordance with some embodiments. As shown in the example of FIG. 12, additional hardware logic may be provided to predict the sign of the ReLU unit 1220 input in advance from the preceding Max-Pooling unit 1210 (corresponding to a maxpooling layer in a CNN) or convolution unit 1200 (corresponding to a convolution layer in the CNN), etc. Adding sign-prediction and ReLU bitmap generation to the Max-pooling unit 1210 may allow the ReLU bitmap information to be predicted earlier from a timing point of view to cover delays that may occur through the address generator 1240, through external DDR controller 1250 and DDR storage 1270 or internal RAM storage 1271. If the delay is sufficiently low, the ReLU bitmap can be interpreted in the address generator 1240 and memory fetches associated with ReLU bitmap zeroes can be skipped completely, because the results of the fetch from memory can be determined never to be used. This modification to the scheme of FIG. 11 can save additional power and may also allow the removal of the delay stage (e.g., 1132, 1232) at the input to the following convolution unit 1280 if the delays through the DDR access path (e.g., 1240 to 1250 to 1270) or RAM access path (e.g., 1240 to 1271) are sufficiently low so as not to warrant a delay stage 1232, among other example features and functionality.

Figure 13:
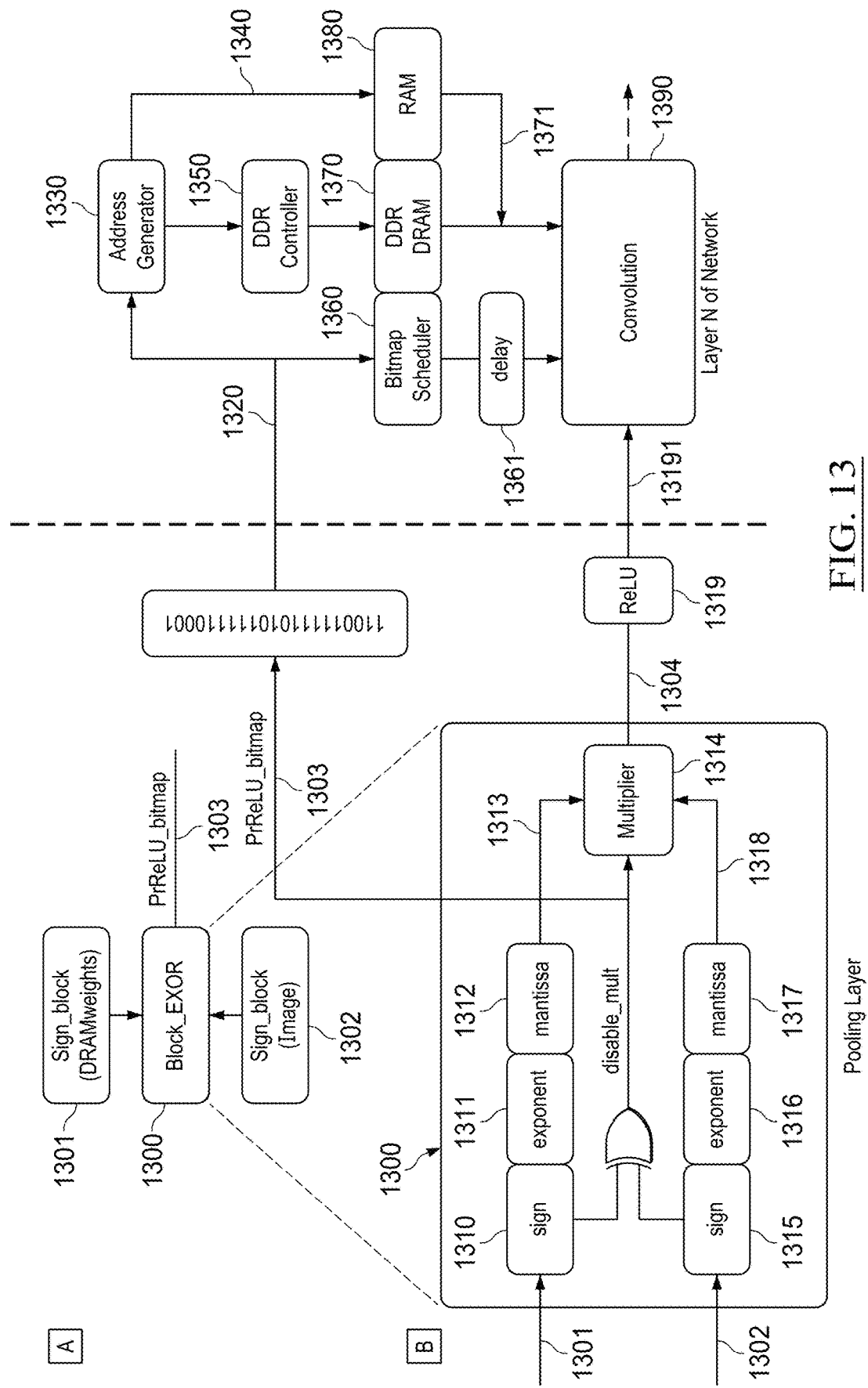
FIG. 13 illustrates hardware in accordance with some embodiments.

FIG. 13 is another simplified block diagram illustrating example hardware in accordance with some embodiments. For instance, CNN ReLU layers can produce high numbers of output zeroes corresponding to negative inputs. Indeed, negative ReLU inputs can be predictively determined by looking at the sign input(s) to the previous layers (e.g., the pooling layer in the example of FIG. 13). Floating-point and integer arithmetic can be explicitly signed in terms of the most significant bit (MSB) so a simple bit-wise exclusive OR (XOR) operation across vectors of inputs to be multiplied in a convolution layer can predict which multiplications will produce output zeroes, such as in the example of FIG. 13. The resulting sign-predicted ReLU bitmap vector can be used as a basis for determining a subset of multiplications and associated coefficient reads from memory to eliminate, such as in the manner described in other examples above.

Providing for the generation of ReLU bitmaps back into the previous pooling or convolutional stages (i.e., stages before the corresponding ReLU stage) may result in additional power and time savings. For instance, sign-prediction logic may be provided to disable multipliers when they will produce a negative output that will be ultimately set to zero by the ReLU activation logic. For instance, this is shown where the two sign bits 1310 and 1315 of the multiplier 1314 inputs 1301 and 1302 are logically combined by an XOR gate to form a PreReLU bitmap bit 1303. This same signal can be used to disable the operation of the multiplier 1314, which would otherwise needlessly expend energy generating a negative output which would be set to zero by the ReLU logic before being input for multiplication in the next convolution stage 1390, among other examples.

Note that the representation of 1300, 1301, 1302, and 1303 (notation A) shows a higher level view of that shown in the representation donated B in FIG. 13. In this example, the input to block 1302 may include two floating-point operand. Input 1301 may include an explicit sign-bit 1310, a Mantissa 1311 including a plurality of bits, and an exponent again including a plurality of bits 1312. Similarly, input 1302 may likewise include a sign 1315, mantissa 1317, and exponent 1316. In some implementations, the mantissas, and exponents may have different precisions, as the sign of the result 1303 depends solely upon the signs of 1301 and 1302, or 1310 and 1315 respectively. In fact, neither 1301 nor 1302 need be floating point numbers, but can be in any integer or fixed point format as long as they are signed numbers and the most significant bit (MSB) is effectively the sign bit either explicitly or implicitly (e.g., if the numbers are one- or twos-complement, etc.).

Continuing with the example of FIG. 13, the two sign inputs 1310 and 1315 may be combined using an XOR (sometimes denoted alternatively herein as ExOR or EXOR) gate to generate a bitmap bit 1303, which may then be processed using hardware to identify down-stream multiplications that may be omitted in the next convolution block (e.g., 1390). The same XOR output 1303 can also be used to disable the multiplier 1314 in the event that the two input numbers 1313 (e.g., corresponding to 1301) and 1318 (e.g., corresponding to 1302) have opposite signs and will produce a negative output 1304 which would be set to zero by the ReLU block 1319 resulting in a zero value in the RELU output vector 13191 which is to be input to the following convolution stage 1390. Accordingly, in some implementations, the PreReLU bitmap 1320 may, in parallel, be transmitted to the bitmap scheduler 1360, which may schedules the multiplications to run (and/or omit) on the convolution unit 1390. For instance, for every zero in the bitmap 1320, a corresponding convolution operation may be skipped in the convolution unit 1390. In parallel, the bitmap 1320 may be consumed by an example address generator 1330, which controls the fetching of weights for use in the convolution unit 1390. A list of addresses corresponding to 1s in the bitmap 1320 may be compiled in the address generator 1330 and controls either the path to DDR storage 1370 via the DDR controller 1350, or else controls the path to on chip RAM 1380. In either case, the weights corresponding to ones in the PreReLU bitmap 1320 may be fetched and presented (e.g., after some latency in terms of clock cycles to the weight input 1371) to the convolution block 1390, while fetches of weights corresponding to zeros may be omitted, among other examples.

As noted above, in some implementations, a delay (e.g., 1361) may be interposed between the bitmap scheduler 1360 and the convolution unit 1390 to balance the delay through the address generator 1330, DDR controller 1350, and DDR 1350, or the path through address generator 1330 and internal RAM 1380. The delay may enable convolutions driven by the bitmap scheduler to line up correctly in time with the corresponding weights for the convolution calculations in the convolution unit 1390. Indeed, from a timing point of view, generating a ReLU bitmap earlier than at the output of the ReLU block 1319 can allow additional time to be gained, which may be used to intercept reads to memory (e.g., RAM 1380 or DDR 1370) before they are generated by the address generator 1330, such that some of the reads (e.g., corresponding to zeros) may be foregone. As memory reads may be much higher than logical operations on chip, excluding such memory fetches may result in very significant energy savings, among other example advantages.

In some implementations, if there is still insufficient saving in terms of clock cycles to cover the DRAM access times, a block oriented technique may be used to read groups of sign-bits (e.g., 1301) from DDR ahead of time. These groups of sign bits may be used along with signs from the input images or intermediate convolutional layers 1302 in order to generate portions of PreReLU bitmaps using a block of XOR gates 1300. In such an implementation, an additional 1-bit of storage in DDR or on-chip RAM may be provided to store the signs of each weight, but this may allow many cycles of latency to be covered in such a way as to avoid ever reading weights from DDR or RAM that are going to be multiplied by zero from a ReLU stage. In some implementations, the additional 1-bit of storage per weight in DDR or on-chip RAM can be avoided as signs are stored in such a way that they are independently addressable from exponents and mantissas, among other example considerations and implementations.

In one example, a system may be further enhanced to utilize DDR accesses, which may have a natural burst access for maximal data-transfer rate. Saving energy by skipping individual DDR weight accesses may not be feasible in this content as they may be shorter than a burst. Accordingly, in some instances, bursts may be skipped in cases where all bitmap bits corresponding to a particular burst transaction are zero. However, this may not occur frequently and hence, the resulting power and bandwidth savings may be limited. In still other implementations, a register programmable threshold may be set for the number of bitmap bits in a burst so that the burst will be skipped completely if more than N bits in the bitmap burst are zero. This may have the effect of slightly degrading overall CNN classification accuracy, but may be acceptable in the interests of saving energy.

Figure 14:
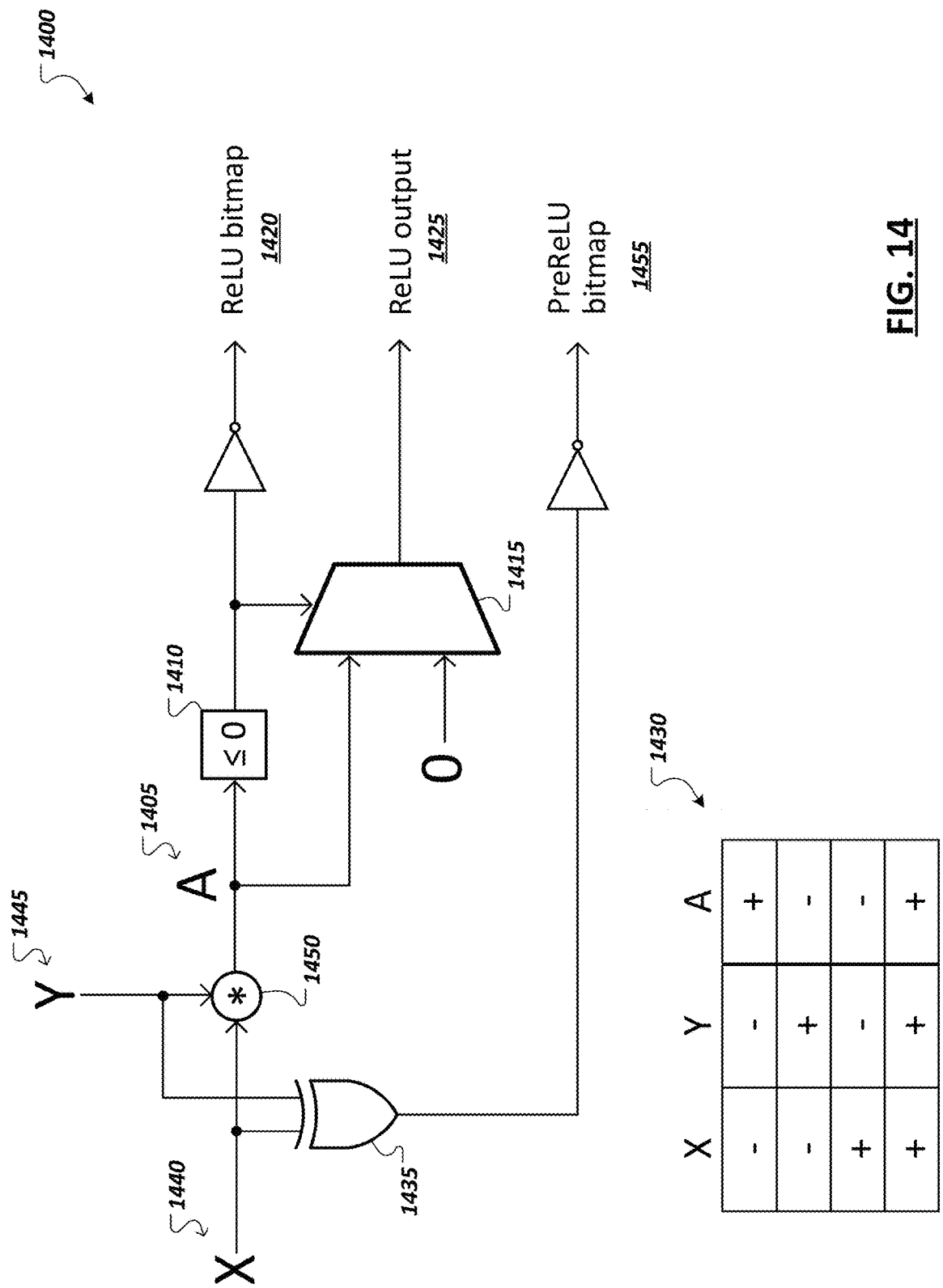
FIG. 14 illustrates example circuitry to generate a bitmap in accordance with some embodiments.

Turning to FIG. 14, a simplified block diagram 1400 is provided to illustrate an example implementation of logic to be used in the generation of an example bitmap based on an output of a ReLU layer in an example neural network (such as in the examples of FIGS. 11-13). In this representation 1400, an operand A 1405 is to be provided as an input to a ReLU layer. A comparator 1410 may identify when the sign of A is equal to or less than zero. In a ReLU operation, if A is less than or equal to zero, the output of the ReLU operation is to be zero. On the other hand, if A is greater than zero, than the value of A is returned as the result (e.g., using multiplexer 1415). In one example, additional circuitry may be provided to tap the output of the comparator 1410 (which is to generate a true binary "1" or false binary "0" based on whether or not A is greater than "0"), such that the output of the comparator 1410 provides (e.g., for each element A in a 2D or 3D matrix) a corresponding binary value 1420 to be incorporated into a bitmap for use in excluding operations involving "0" elements in the resulting ReLU output matrix 1425.

Additionally, or alternatively (to the circuitry providing bitmap values 1420 from comparator 1410), some implementations may support pre-ReLU bitmap generation (such as discussed above in the examples of FIG. 13). For instance, as outlined in table 1430, the sign of A may be predicted based on the signs of the operands used to generate A (e.g., in a preceding multiplication operation). Accordingly, an XOR gate 1435 may be provided, which may accept as inputs, at least a portion of the inputs X 1440 and Y 1445 to a multiplication operation 1450. For instance, the sign bits of each of the inputs 1440, 1445 (e.g., the MSB) may be provided to XOR gate 1435 to generate a "0" when there is a mismatch in the signs (meaning that the resulting product, A, will be negative) and a "1" when the signs match (and a positive value of A will result from multiplication operation 1450). The output 1455 of the XOR gate 1435 may thereby be provided to generate bitmap bits identical to what would be generated from output 1420, among other example implementations.

Figure 15:
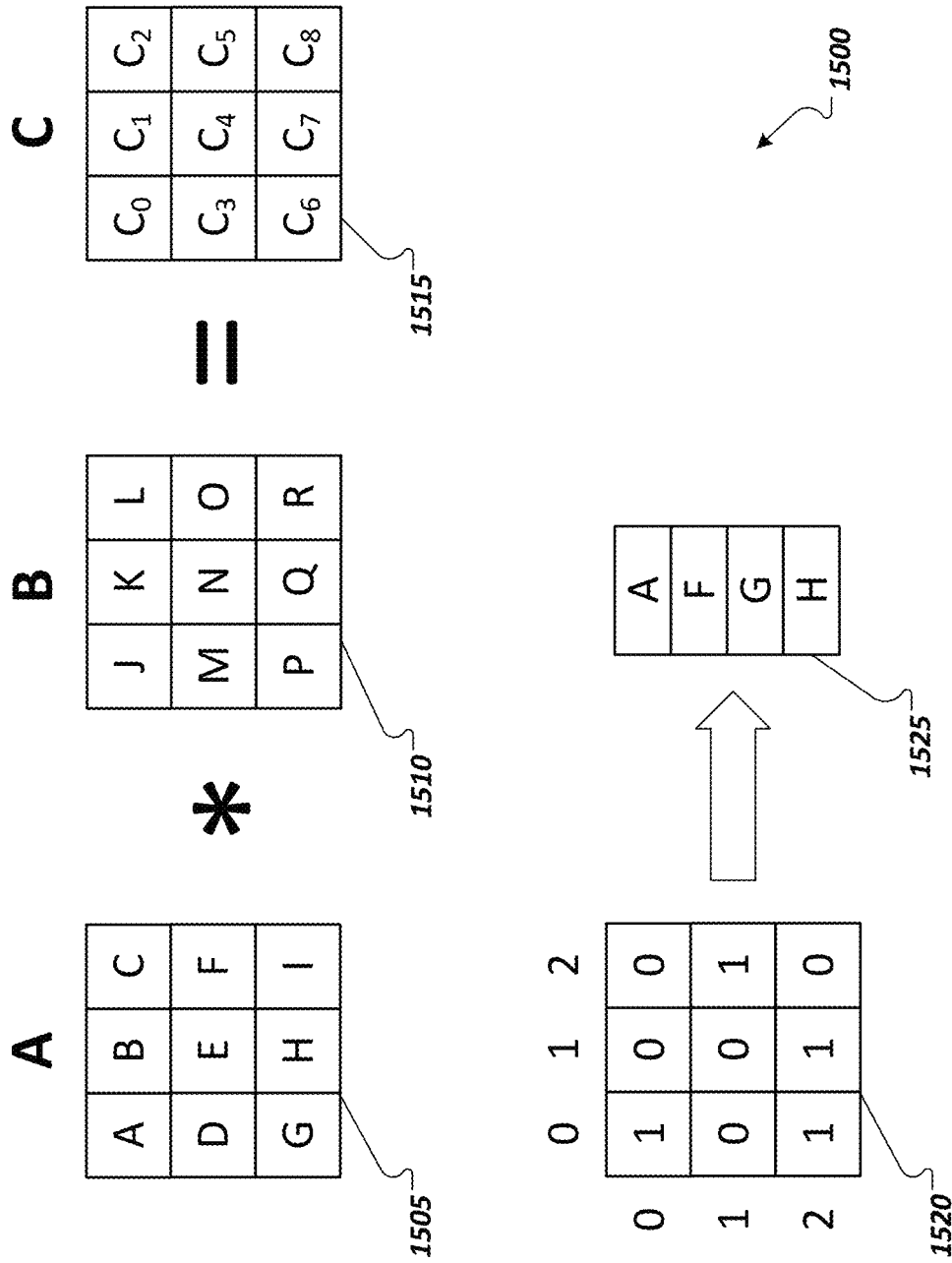
FIG. 15 illustrates example use of a bitmap in association with example matrix multiplication operations in accordance with some embodiments.

FIG. 15 is a simplified block diagram 1500 illustrating principles of the use of an example bitmap in accordance with at least some of the embodiments described herein. For instance, matrix multiplication (e.g., between matrices A (1505) and B (1510)) may involve the element-wise multiplication of the elements of the two matrices 1505, 1510 to generate a resulting matrix C (1515). In this example, a bitmap matrix 1520 may be provided, which corresponds to matrix A and indicates, for each element (e.g., A-I) in matrix A, whether the element is "0" or not. The bitmap 1520 may be processed by a scheduler or other controller logic to determine that only the multiplication operations of the non-zero matrix A elements (e.g., elements A, F, G, and H) are to be performed, allowing for multiplication operations involving the remaining "zero" elements (e.g., B, C, D, E, I) to be skipped. In addition to skipping the multiplication operation itself, the fetch, from memory, of the zero elements may be skipped (as the element would be fetched for effectively no reason, given the skip of its corresponding multiplication operation(s)). The fetching of the only the non-zero elements may result in a compressed register (e.g., 1525), from which multiplication circuitry will pull elements for the remaining (not skipped) multiplication operations, as represented in FIG. 15.

Figure 16:
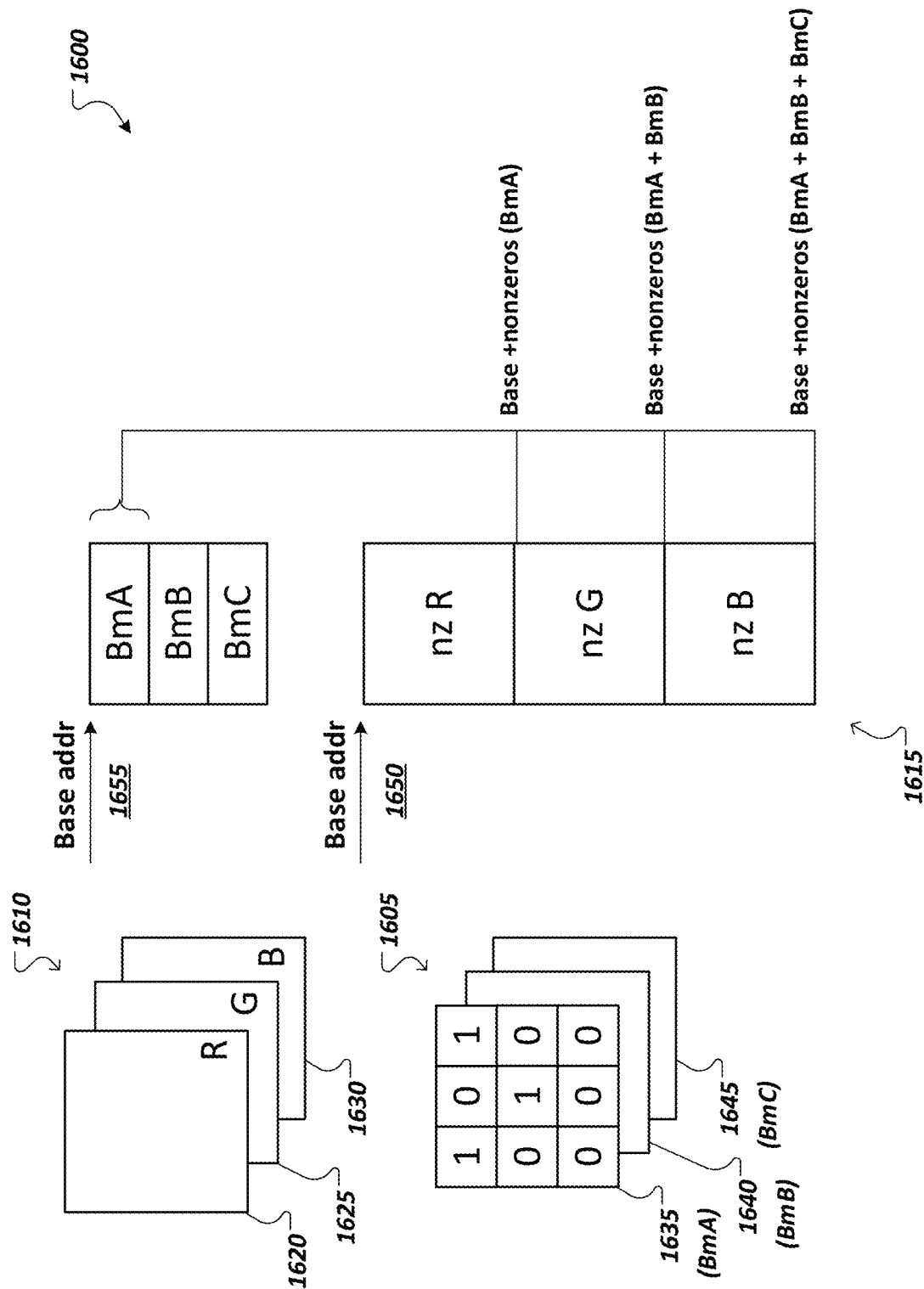
FIG. 16 illustrates use of an example three-dimensional bitmap in accordance with some embodiments.

Turning to FIG. 16, a simplified block diagram 1600 is shown illustrating an example implementation of a bitmap 1605 for a 3D matrix 1610 (or other matrix with dimensions greater than two). For instance, in this example, the 3D matrix 1610 may correspond to the red, green, and blue layers of a 2D image. To implement a corresponding bitmap, such as discussed above, a 3D bitmap 1605 may be generated to correspond to the 3D matrix 1610 and identify the elements within the 3D matrix 1610 that are "0". For instance, "1" values in the 3D bitmap 1605 may indicate a non-zero value in a corresponding element of the 3D matrix 1610, and a "0" in the bitmap 1605 may correspond to a zero element in the matrix 1610 (although the reverse convention could be applied in other implementations). As with other bitmap implementations, a mapping may be defined to indicate which bit of the bitmap 1605 corresponds to which element in the corresponding matrix 1610. In this example, only the non-zero elements of matrix 1610 may be fetched from memory, based on the mapping. In one example, each plane (e.g., 1635, 1640, 1645) within the bitmap matrix 1605 may be mapped to corresponding plane (e.g., 1620, 1625, 1630) in the corresponding 3D matrix.

A compressed register 1615 may be built using the 3D bitmap in connection with the scheduling of multiplication operations involving the non-zero elements of the 3D matrix 1610. In one example, non-zero elements of each plane (e.g., 1620, 1625, 1630) may be contiguously added to the register 1615. The number of "1" 's in each plane (e.g., 1635, 1640, 1645) may be counted to identify the number of entries to be provided to the compressed register, and an offset address (e.g., 1650) may be determined to identify the start of a bitmap of a particular one of the planes of the 3D matrix. For instance, the offset address 1650 may be determined based on a base address 1655 and the size (of non-zero values) in the corresponding bitmap plane. For instance, offset_base_address (1650)=base_addr (1655)+size of (BmA)+ sizeof(BmB)+sizeof (BmC). In this manner, the sequence of "1" 's contributed from each bitmap plane (e.g., 1635, 1640, 1645) can be used to identify an offset to access a corresponding matrix element to be provided to multiplication circuitry, using principles such as discussed in U.S. Pat. No. 8,713,080, titled "Circuit for compressing data and a processor employing the same," and/or U.S. Pat. No. 9,104,633 titled "Hardware for performing arithmetic operations," among other example implementations.

Figure 17:
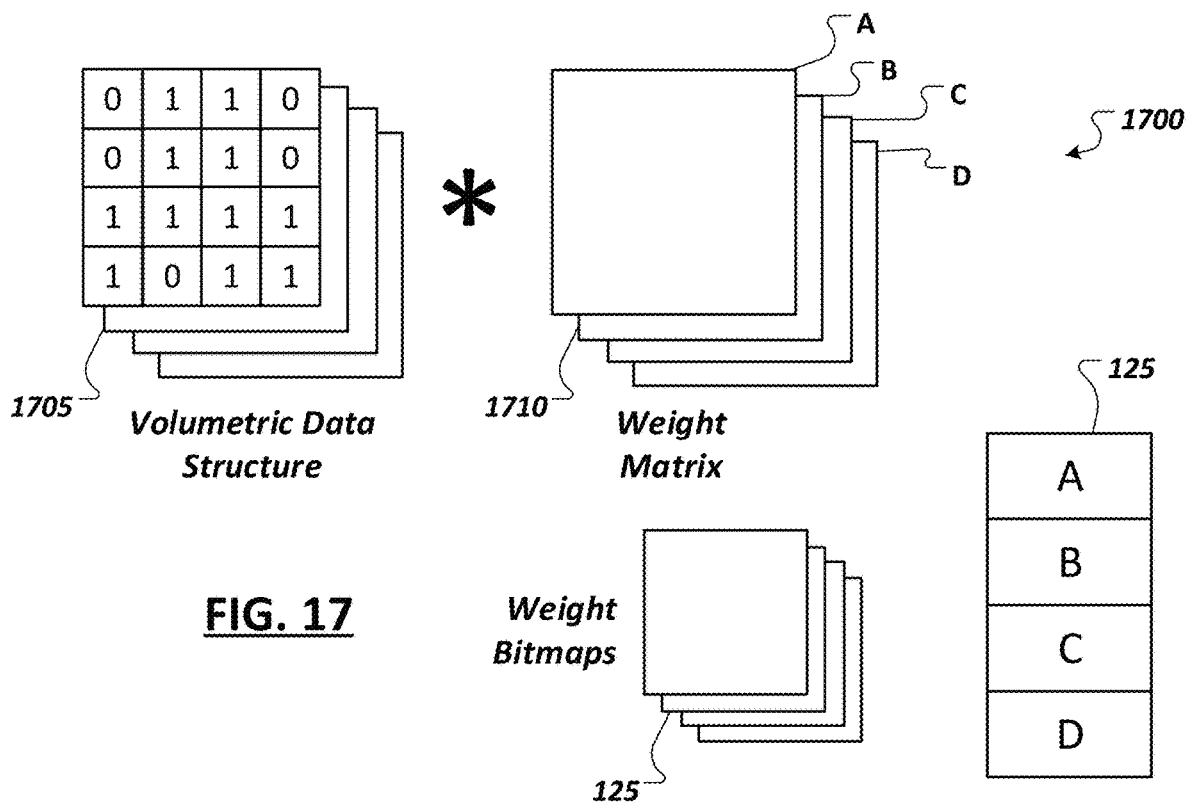
FIG. 17 illustrates use of an example volumetric data structure as a bitmap in accordance with some embodiments.

Turning to FIG. 17, a simplified block diagram 1700 is shown illustrating the use of a volumetric data structure as a bitmap for eliminating trivial operations within a set of operations involving the volumetric data structure. For instance, a volumetric data structure may represent 3D space, and may thereby embody a multidimensional matrix. A volumetric data structure may be considered a dynamically generated bitmap, as logic may be provided in a device (e.g., a controller, an autonomous vehicle, a robot, etc.) to generate and update volumetric data structures to reflect image data captured by one or more sensors or scanners (e.g., using LIDAR, stereo cameras, radar, ultrasound, etc.). The image data may be provided to a SLAM pipeline logic. As new images are provided, the output of the SLAM logic may be likewise continuously updated and new geometry may be identified and dynamically added or inserted to a (new or existing) volumetric data structure as the new geometry is acquired. Indeed, a depth map may be generated dynamically in response to acquired imaged data and represented in an SST-based volumetric data structure format. The binary nature of bits included in the integer values of volumetric data structure entries may be utilized as bitmaps (e.g., to identify which downstream weights to fetch from DDR memory and which convolutions or other arithmetic operations to perform subject to the "1" bits in the volumetric data structure bitmap, with operations corresponding to "0"s in the bitmap result being eliminated).

For example, in FIG. 17, a volumetric data structure may represent a volume subdivided by four in X-, Y-, and Z-coordinates. In other implementations, the volumetric data structure may represent the volume using Cartesian coordinates. In this example, the volumetric data structure may correspond to the division of a particular volume into 64 cubic subvolumes, or voxels. A binary value may be used to identify whether a respective one of the subvolumes is occupied (e.g., "1") by geometry or not (e.g., "0"), resulting in (at least) 64 bits of 1's and 0's to represent 3D coordinates within the particular volume. In this example, the 4×4×4 division of the volume, represented by the volumetric data structure effectively results in a four-dimensional bitmap, corresponding to the 64 binary values of the volumetric data structure 1705 (or "VOLA").

A volumetric data structure 1705 may be operated upon in connection with a variety of applications. For instance, matrix arithmetic operations may be performed on the volumetric data structure (e.g., including a 64-bit integer value corresponding to the 64 bits of binary values used to represent the presence of geometry or empty space within each voxel). The binary nature of these values may allow the same volumetric data structure 1705 to be utilized as a 4D bitmap, which may be processed by scheduler circuitry to identify operations (e.g., multiplication operations involving the "0" elements within the volumetric data structure 1705), which may be skipped. As an example, where the volumetric data structure 1705 is to be multiplied against another matrix (e.g., weights matrix 1710, which may be used in convolution operations of a CNN), the VOLA-based bitmap may also be used to identify which elements from the other matrix to fetch from memory, omitting the fetching of elements, which are to be multiplied against the "0" elements of the volumetric data structure 1705.

Figure 18:
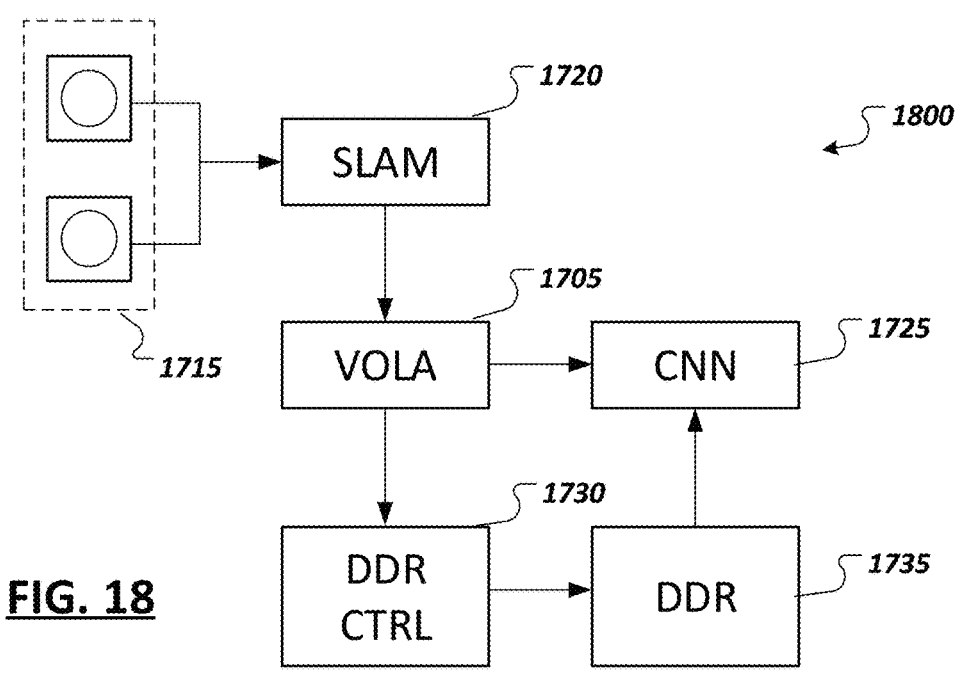
FIG. 18 illustrates a flow diagram illustrating the generation and use of an example volumetric data structure in accordance with some embodiments.

Turning briefly to the simplified block diagram 1800 of FIG. 18, in some implementations, a VOLA-based bitmap may be generated dynamically, as the volumetric data structure 1705 is generated from "raw" data captured from a scan or definition of a particular volume. As an illustrative example, an optical sensor 1715, such as a stereoscopic camera or depth camera, may generate data, which may be provided to a SLAM pipeline 1720 to generate a volumetric data structure 1705. In this example, the volumetric data structure 1705 may be both provided as an input to a CNN 1725, as well as a memory controller 1730 (e.g., a memory controller for double data rate (DDR) memory 1735). Matrix multiplication operations may be set to be performed on the volumetric data structure 1705 in connection with a layer of the CNN 1725. To enhance the performance of these operations, the volumetric data structure 1705 may also be utilized by the memory controller 1730 as a multi-dimensional (i.e., greater than 2D) bitmap to select and fetch only those elements of a corresponding weight (or other) matrix (e.g., 1710) that are to be multiplied against the non-zero elements of the volumetric data structure.

Further, as shown in the example of FIG. 17, in some implementations, bitmaps may be provided or generated for each of two (or more) multidimensional matrices to be multiplied together in an application. For instance, in the case of a first input matrix (e.g., volumetric data structure 1705) being multiplied against a weight matrix (e.g., 1710), both matrices may have a corresponding bitmap to be provided to a scheduler, memory controller, or other control logic to selectively omit, or skip, some of the operations that would otherwise be performed to complete the multiplication of the two or more matrices. In this example, as the volumetric data structure 1705 may serve as its own bitmap, an additional multidimensional (e.g., 3D) bitmap matrix 1750 may be provided to indicate "0" values in the weight matrix 1710. Both the VOLA-based bitmap and bitmap 1750 may be provided to a scheduler to select only those multiplication operations where both of the operands are non-zero, and skip all multiplication operations (and corresponding memory fetches from either matrix 1705, 1710) involving one or more zero elements. For instance, a compressed register 1755 may be populated with weight values (from matrix 1710) for use in scheduling multiplication operations against elements of volumetric data structure 1705, among other example implementations.

Figure 19:
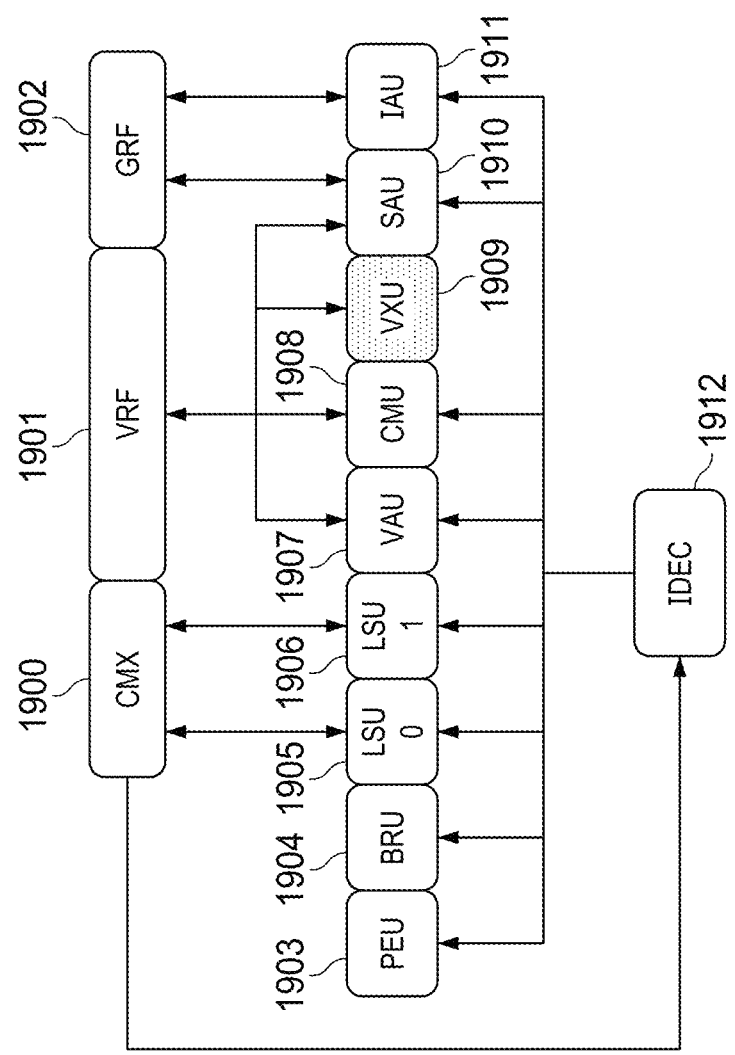
FIG. 19 depicts an example multi-slot vector processor in accordance with some embodiments.

FIG. 19 is a simplified block diagram m representing an example multislot vector processor (e.g., a very long instruction word (VLIW) vector processor) in accordance with some embodiments. In this example the vector processor may include multiple (e.g., 9) functional units (e.g., 1903-1911), which may be fed by a multi-ported memory system 1900, backed up by a vector register file (VRF) 1901 and general register file (GRF) 1902. The processor contains an instruction decoder (IDEC) 1912, which decodes instructions and generates control signals which control the functional units 1903-1911. The functional units 1903-1911 are the predicated execution unit (PEU) 1903, branch and repeat unit (BRU) 1904, load store port units (e.g., LSU0 1905 and LSU1 1906), a vector arithmetic unit (VAU) 1907, scalar arithmetic unit (SAU) 1910, compare and move unit (CMU) 1908, integer arithmetic unit (IAU) 1911, and a volumetric acceleration unit (VXU) 1909. In this particular implementation, the VXU 1909 may accelerate operations on volumetric data, including both storage/retrieval operations, logical operations, and arithmetic operations. While the VXU circuitry 1909 is shown in the example of FIG. 19 as a unitary component, it should be appreciated that the functionality of the VXU (as well as an of the other functional units 1903-1911) may be distributed among multiple circuitry. Further, in some implementations, the functionality of the VXU 1909 may be distributed, in some implementations, within one or more of the other functional units (e.g., 1903-1908, 1910, 1911) of the processor, among other example implementations.

Figure 20:
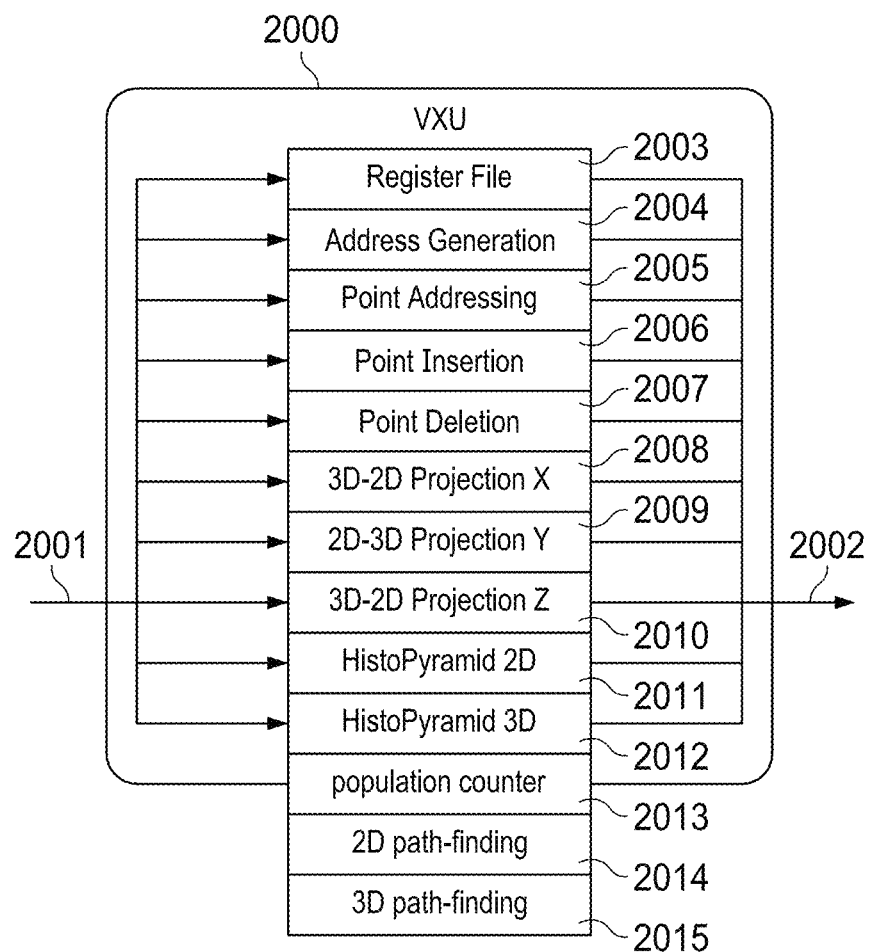
FIG. 20 illustrates an example volumetric acceleration hardware in accordance with some embodiments.

FIG. 20 is a simplified block diagram illustrating an example implementation of a VXU 2000 in accordance with some embodiments. For instance, VXU 2000 may provide at least one 64-bit input port 2001 to accept inputs from either the vector register file 1901 or general register file 1902. This input may be connected to a plurality of functional units including a register file 2003, address generator 2004, point addressing logic 2005, point insertion logic 2006, point deletion logic 2007, 3D to 2D projection logic in X dimension 2008, 3D to 2D projection logic in Y dimension 2009, 3D to 2D projection logic in X dimension 2010, 2D histogram pyramid generator 2011, 3D histopyramid generator 2012, population counter 2013, 2D path-finding logic 2014, 3D path-finding logic 2015 and possibly additional functional units to operate on 64-bit unsigned integer volumetric bitmaps. The output from the block 2002 can be written back to either the vector register file VRF 1901 or general register file GRF 1902 register files.

Figure 22:
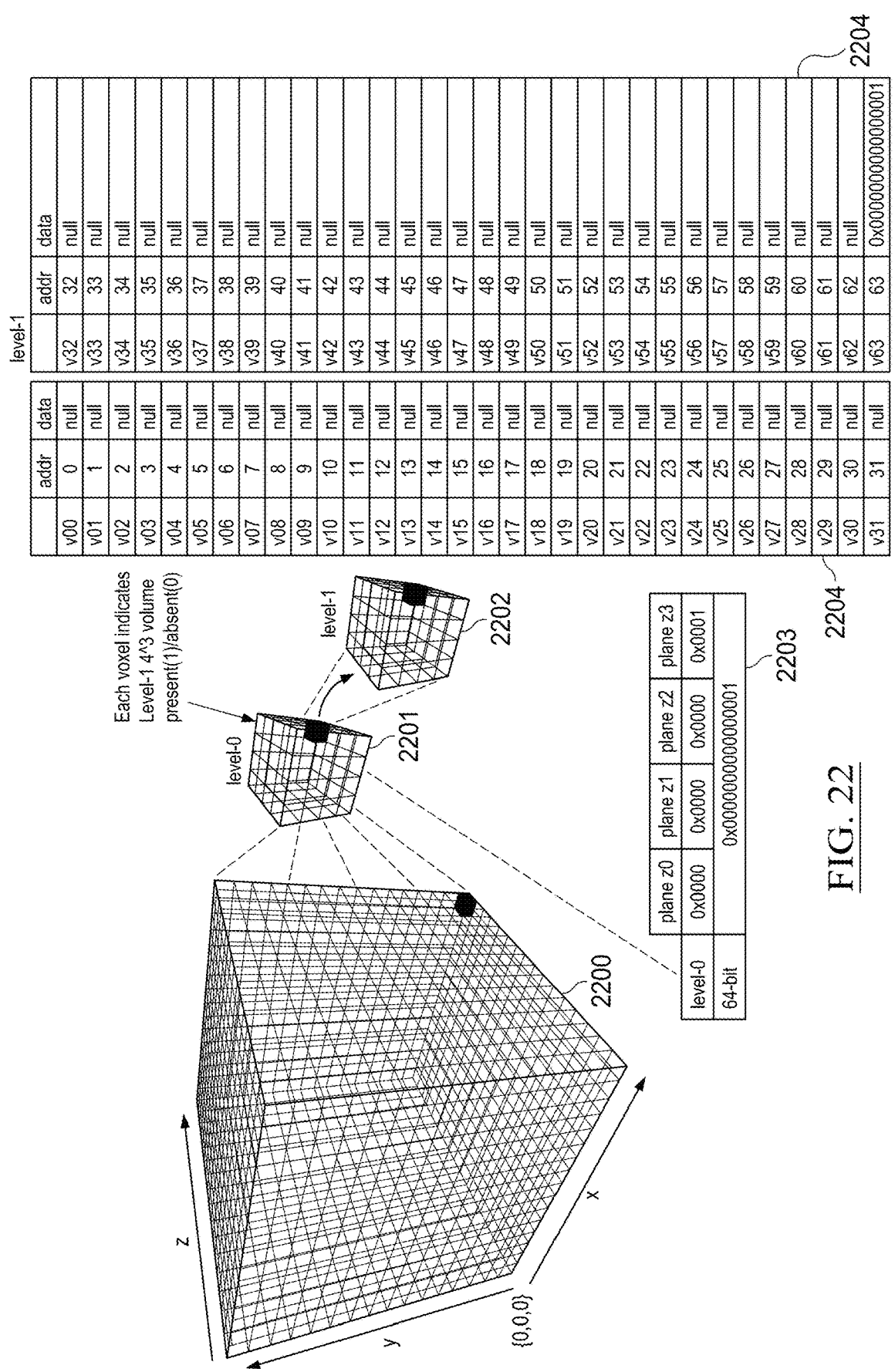
FIG. 22 illustrates a two-level sparse voxel tree in accordance with some embodiments.

Turning to the example of FIG. 21, a representation of the organization of a 4^3 voxel cube 2100 is represented. A second voxel cube 2101 is also represented. In this example, a voxel cube may be defined in data as a 64-bit integer 2102, in which each single voxel within the cube is represented by a single corresponding bit in the 64-bit integer. For instance, the voxel 2012 at address {x,y,z}={3,0,3} may be set to "1" to indicate the presence of geometry at that coordinate within the volumetric space represented by the voxel cube 2101. Further, in this example, all other voxels (beside voxel 2102) may correspond to "empty" space, and may be set to "0" to indicate the absence of physical geometry at those coordinates, among other examples. Turning to FIG. 22, an example two-level sparse voxel tree 2200 is illustrated in accordance with some embodiments. In this example, only a single "occupied" voxel is included within a volume (e.g., in location {15,0,15}). The upper level-0 of the tree 2201 in this case contains a single voxel entry {3,0,3}. That voxel in turn points to the next level of the tree 2202 which contains a single voxel in element {3,0,3}. The entry in the data-structure corresponding to level 0 of the sparse voxel tree is a 64-bit integer 2203 with one voxel set as occupied. The set voxel means that an array of 64-bit integers is then allocated in level 1 of the tree corresponding to the voxel volume set in 2203. In the level 1 sub-array 2204 only one of the voxels is set as occupied with all other voxels set as unoccupied. As the tree, in this example, is a two level tree, level 1 represents the bottom of the tree, such that the hierarchy terminates here.

Figure 23:
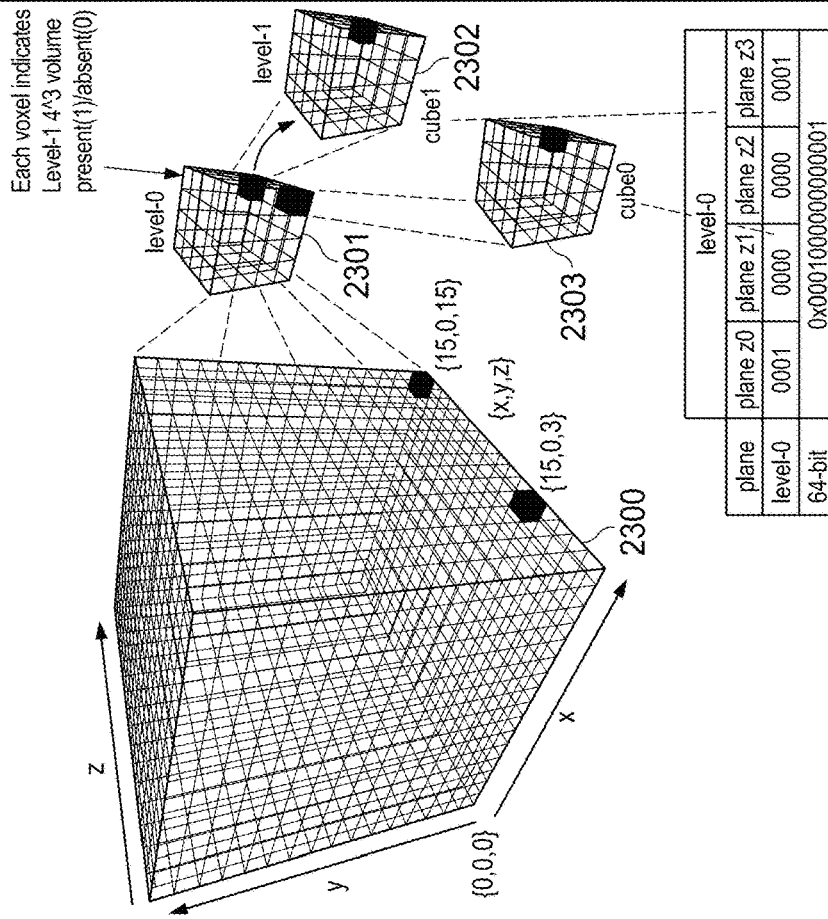
FIG. 23 illustrates a two-level sparse voxel tree in accordance with some embodiments.

FIG. 23 illustrates a two-level sparse voxel tree 2300 in accordance with some embodiments which contains occupied voxels in locations {15,0,3} and {15,0,15} of a particular volume. The upper level-0 of the tree 2301 in this case (which subdivides the particular volume into 64 upper level-0 voxels) contains two voxel entries {3,0,0} and {3,0,3} with corresponding data 2304 that shows two voxels are set (or occupied). The next level of the sparse voxel tree (SVT) is provided as an array of 64-bit integers that contains two sub-cubes 2302 and 2303, one for each voxel set in level 0. In the level 1 sub-array 2305, two voxels are set as occupied, v15 and v63, and all other voxels set as unoccupied and the tree. This format is flexible as 64-entries in the next level of the tree are always allocated in correspondence to each set voxel in the upper layer of the tree. This flexibility can allow dynamically changing scene geometry to be inserted in potentially any manner (e.g., randomly rather than according to a fixed or defined order), as long as the corresponding voxel in the upper layers have been set. If not, either a table of pointers would be maintained, leading to higher memory requirements, or else the tree would be required to be at least partially rebuilt in order to insert unforeseen geometry.

Figure 24:
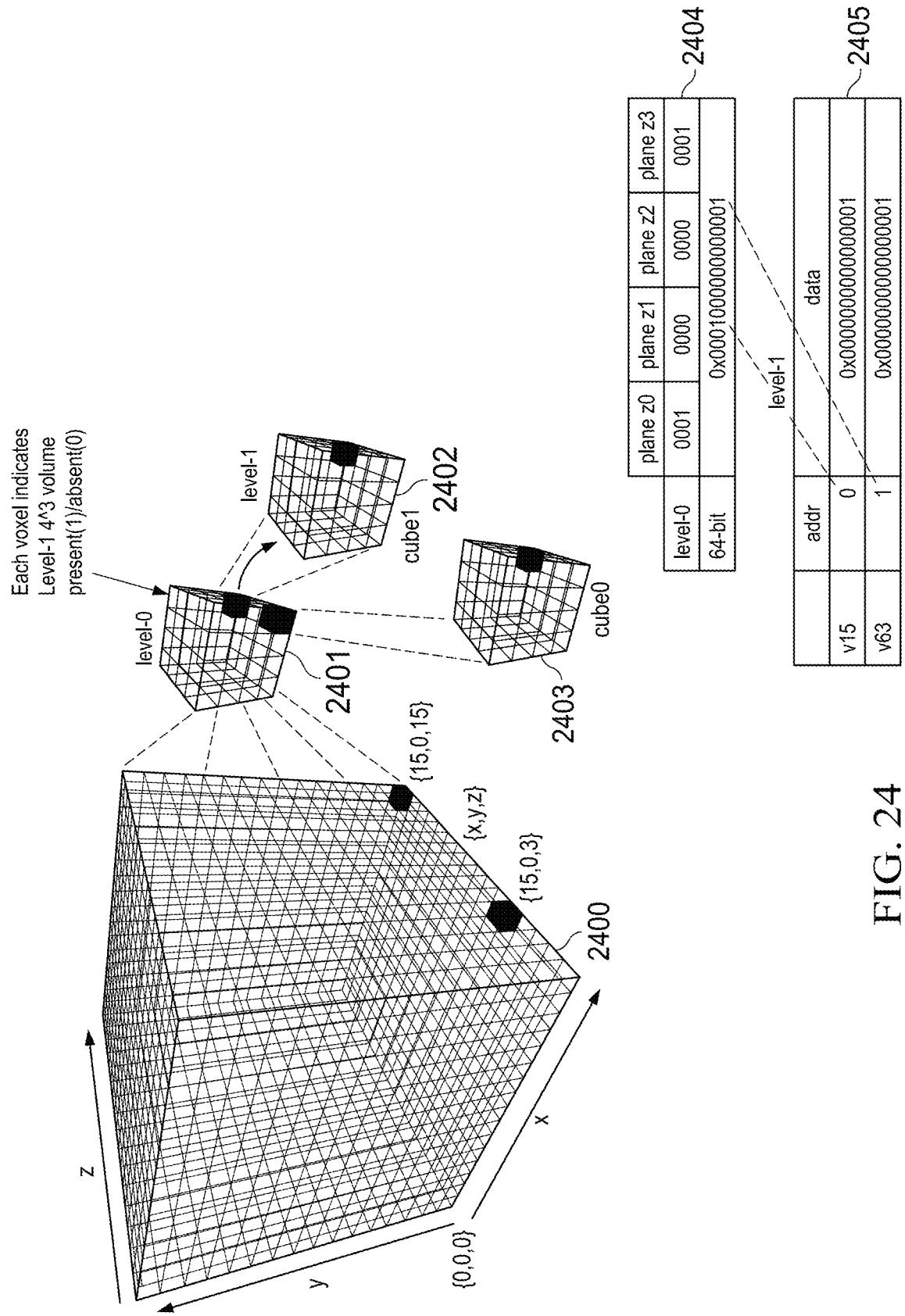
FIG. 24 illustrates storage of example voxel data in accordance with some embodiments.

FIG. 24 illustrates an alternate technique for storing the voxels from FIG. 23 in accordance with some embodiments. In this example, the overall volume 2400 contains two voxels stored at global coordinates {15,0,3} and {15,0,15} as in FIG. 23. In this approach, rather than allocating a 64-entry array to represent all of the sub-cubes in level 1 below level 0, only those elements in level 1, which actually contain geometry (e.g., as indicated by whether or not the corresponding level 0 voxels are occupier or not) are allocated as corresponding 64-bit level 1 records, such that the level 1, in this example, has only two 64-bit entries rather than sixty-four (i.e., for each of the 64 level-1 voxels, whether occupied or empty). Accordingly, in this example, the first level 0 2404 is equivalent to 2304 in FIG. 23, while the next level 2405 is 62 times smaller in terms of memory requirement than the corresponding 2305 in FIG. 23. In some implementations, if new geometry is to be inserted into level 0 for which space has not been allocated in level 1, the tree has to be copied and rearranged.

In the example of FIG. 24, the sub-volumes can be derived by counting the occupied voxels in the layer above the current layer. In this way, the system may determine where, in the voxel data, one higher layer ends and the next lower layer begins. For instance, if three layer-0 voxels are occupied, the system may expect that three corresponding layer-1 entries will following in the voxel data, and that the next entry (after these three) corresponds to the first entry in layer-2, and so on. Such optimal compaction can be very useful where certain parts of the scene do not vary over time or where remote transmission of volumetric data is required in the application, say from a space probe scanning the surface of Pluto where every bit is costly and time-consuming to transmit.

Figure 25:
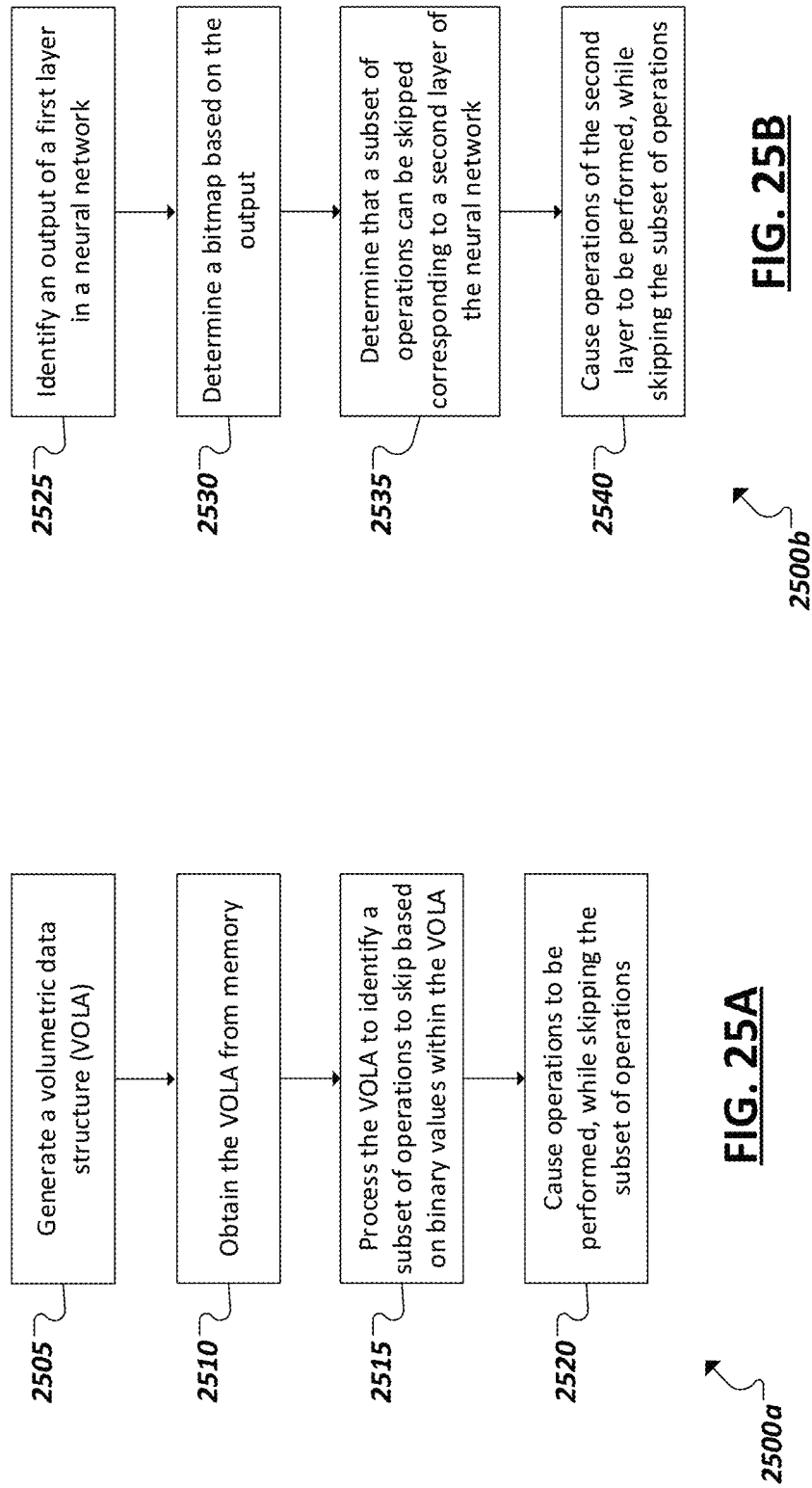
FIGS. 25A-25B are simplified flowcharts illustrating example techniques involving the selective elimination of operations in a set of example operations.

FIGS. 25A-25B are simplified flowcharts 2500a-b illustrating example techniques involving the selective elimination of operations in a set of example operations. For instance, in the example of FIG. 25A, a volumetric data structure (or VOLA) may be generated 2505 and stored in memory for use in a variety of different applications. The volumetric data structure may model geometry within a particular volume, with the volume subdivided into a number of voxels. The volumetric data structure may represent the particular volume and geometry within the volume at multiple levels of detail. For instance, each voxel at the lowest level of detail may be subdivided into voxels at a second level of detail immediately higher than the lower level of detail. The subvolumes represented by the voxels at this second level of detail may be likewise subdivided into voxels at a next level of detail and so on until the desired number of levels of detail are provided and modeled within the volumetric data structure. As discussed herein, entries may be provided within the volumetric data structure representing each of the modeled levels of detail. A first entry may represent the first, lowest level of detail, with each voxel at the first level of detail represented by a respective binary value in the first entry to indicate whether geometry is present within the corresponding voxel or not. For voxels found not to possess geometry at the lowest level of detail, the volumetric data structure may omit entries corresponding to the higher levels of detail of these voxels to sparsely represent the multiple layers of detail of the particular volume within the volumetric data structure.

In some implementations, given the binary nature of the values of the volumetric data structure, the volumetric data structure may possess a considerable number of zero values and may also be considered a bitmap (e.g., a 3D bitmap), which may be used to reduce the number of operations to be performed in connection with an application using the volumetric data structure as an input. For instance, the volumetric data structure may be obtained 2510 from memory and processed 2515 to identify a subset of operations (e.g., element-wise multiplication operations or fetches of multiplicand elements to be multiplied against the matrix elements of the volumetric data structure), which may be skipped based on zero values present within the volumetric data structure. For instance, a scheduler, controller, or other logic and circuitry may cause 2520 a set of operations to be performed, while skipping those operations in the subset. This may lead to efficiency gains in power, time, and computing resource usage (e.g., processor and memory usage), among other example advantages.

Turning to FIG. 25B, an output of a first layer in a neural network (e.g., a CNN) may be identified 2525. It should be understood that this "first" layer need not necessarily be the first layer sequentially within the neural network, but is the "first" for purposes of labeling the multiple layers to be named within the present discussion. A bitmap may be determined 2520 from the output values of this first layer and subset of operations in a different, second layer within the neural network may be identified 2535 from the bitmap and may be skipped based on information within the bitmap (e.g., based on corresponding zero values in elements of either or both operands to be multiplied in the subset of operations). In some cases, the output of the first layer may be identified predictively from inputs provided to another layer (e.g., a third layer), where zero values in the output of the first layer may be predicted based on inputs to or outputs from a preceding layer, among other example implementations. As in the example of FIG. 25A, upon identifying 2535 a subset of operations, which may be skipped based on a generated bitmap, the operations of the second layer may be performed, with a subset of these operations skipped according to the information with the bitmap, among other example implementations.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

FIGS. 26-31 are block diagrams of exemplary computer architectures that may be used in accordance with embodiments disclosed herein. Indeed, computing devices, processors, and other logic and circuitry of the systems described herein may incorporate all or a portion of the functionality and supporting software and/or hardware circuitry to implement such functionality. Further, other computer architecture designs known in the art for processors and computing systems may also be used beyond the examples shown here. Generally, suitable computer architectures for embodiments disclosed herein can include, but are not limited to, configurations illustrated in FIGS. 26-31.

Figure 26:
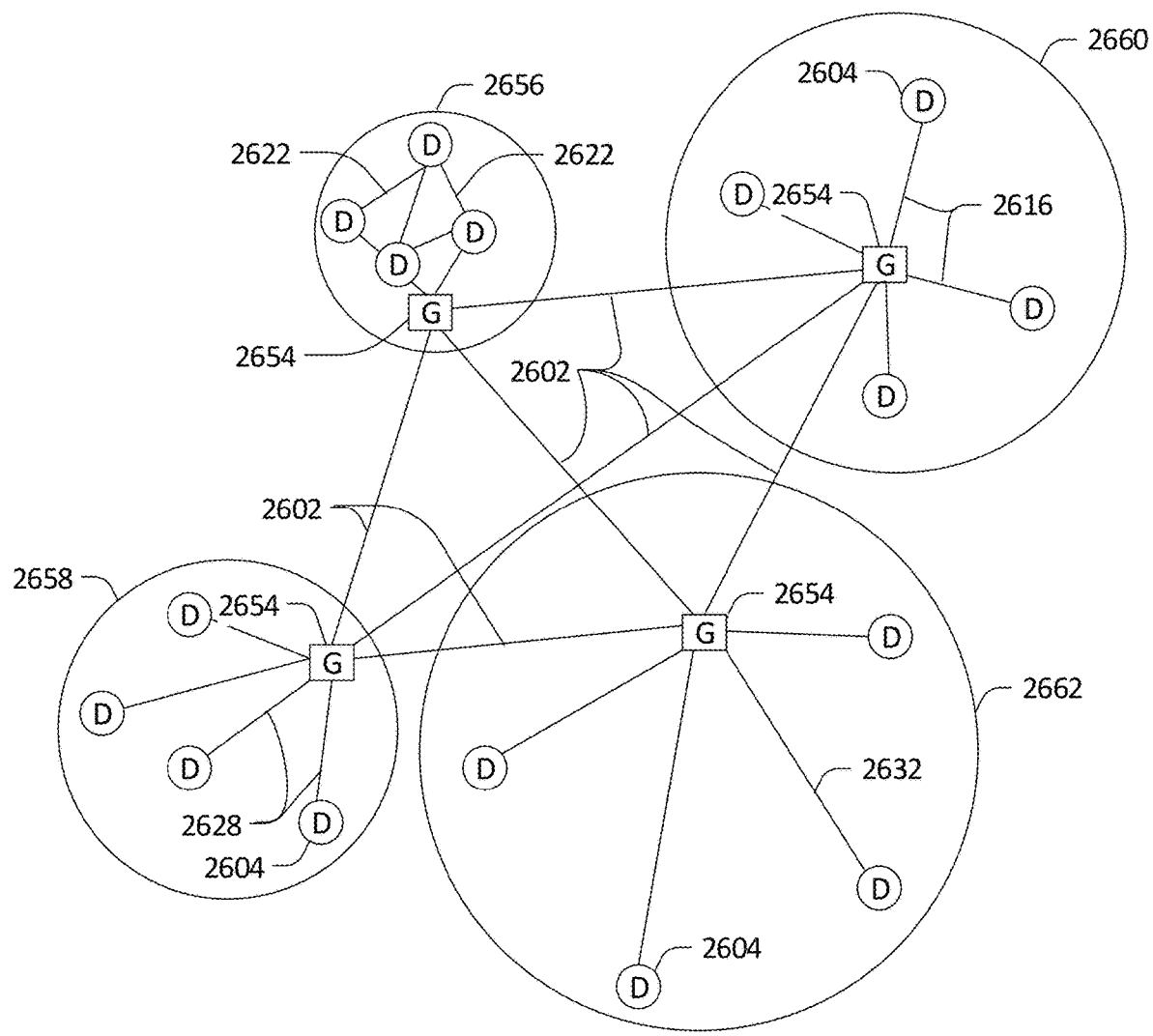
FIG. 26 is a simplified block diagram of an exemplary network with devices in accordance with at least some embodiments.

FIG. 26 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 27:
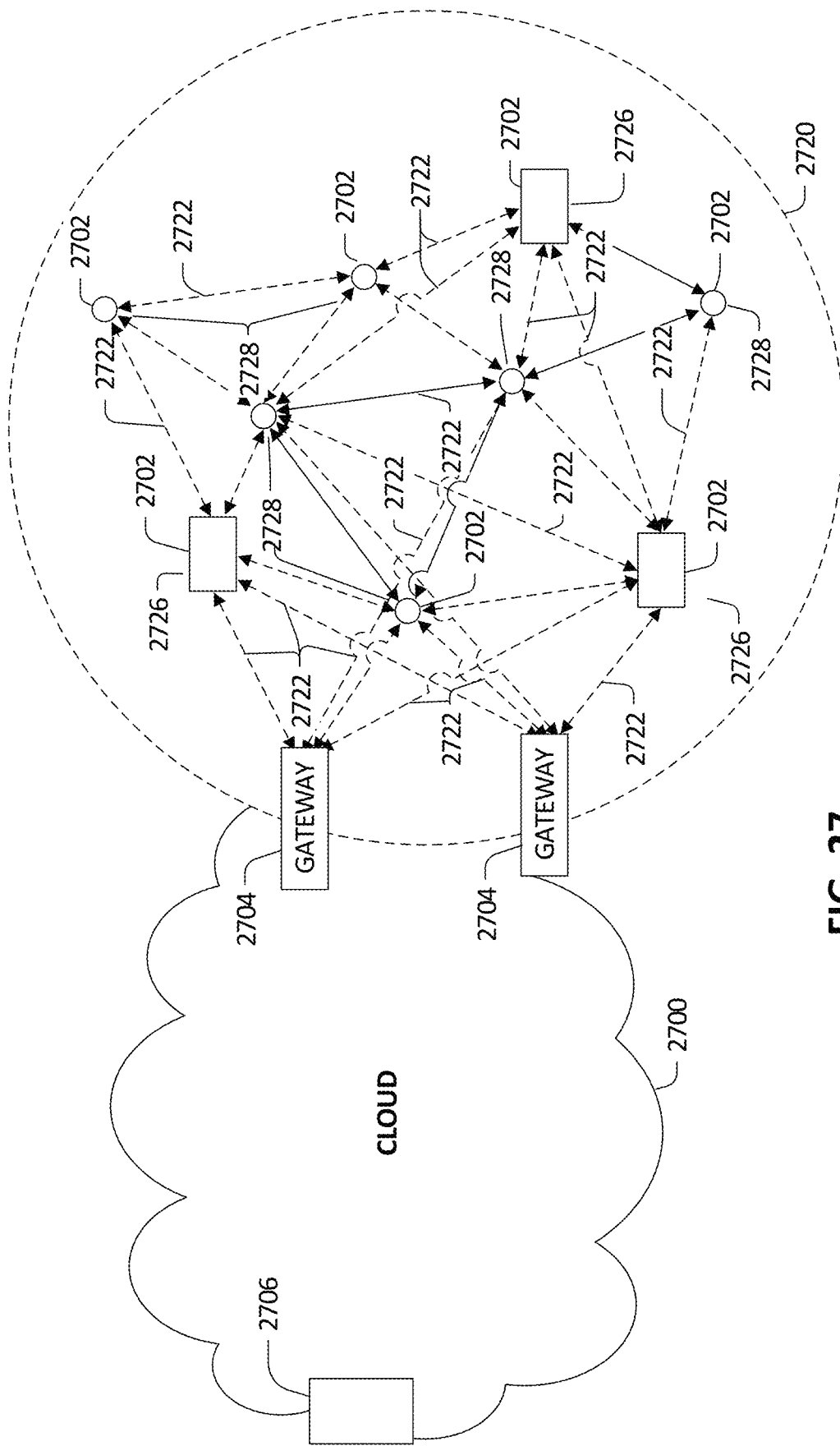
FIG. 27 is a simplified block diagram of an exemplary fog or cloud computing network in accordance with at least some embodiments.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 26 and 27, present a number of new challenges in a heterogeneous network of connectivity comprising a combination of wired and wireless technologies.

FIG. 26 specifically provides a simplified drawing of a domain topology that may be used for a number of internet-of-things (IoT) networks comprising IoT devices 2604, with the IoT networks 2656, 2658, 2660, 2662, coupled through backbone links 2602 to respective gateways 2654. For example, a number of IoT devices 2604 may communicate with a gateway 2654, and with each other through the gateway 2654. To simplify the drawing, not every IoT device 2604, or communications link (e.g., link 2616, 2622, 2628, or 2632) is labeled. The backbone links 2602 may include any number of wired or wireless technologies, including optical networks, and may be part of a local area network (LAN), a wide area network (WAN), or the Internet. Additionally, such communication links facilitate optical signal paths among both IoT devices 2604 and gateways 2654, including the use of MUXing/deMUXing components that facilitate interconnection of the various devices.

The network topology may include any number of types of IoT networks, such as a mesh network provided with the network 2656 using Bluetooth low energy (BLE) links 2622. Other types of IoT networks that may be present include a wireless local area network (WLAN) network 2658 used to communicate with IoT devices 2604 through IEEE 802.11 (Wi-Fi®) links 2628, a cellular network 2660 used to communicate with IoT devices 2604 through an LTE/LTE-A (4G) or 5G cellular network, and a low-power wide area (LPWA) network 2662, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 2604, such as over the backbone links 2602, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 2656, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 2658, for instance, may use systems that perform standards conversion to provide multi-standard connectivity, enabling IoT devices 2604 using different protocols to communicate. Further systems may provide seamless interconnectivity across a multi-standard infrastructure comprising visible Internet resources and hidden Internet resources.

Communications in the cellular network 2660, for instance, may be enhanced by systems that offload data, extend communications to more remote devices, or both. The LPWA network 2662 may include systems that perform non-Internet protocol (IP) to IP interconnections, addressing, and routing. Further, each of the IoT devices 2604 may include the appropriate transceiver for wide area communications with that device. Further, each IoT device 2604 may include other transceivers for communications using additional protocols and frequencies. This is discussed further with respect to the communication environment and hardware of an IoT processing device depicted in FIGS. 28 and 29.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 27 below.

FIG. 27 illustrates a cloud computing network in communication with a mesh network of IoT devices (devices 2702) operating as a fog device at the edge of the cloud computing network. The mesh network of IoT devices may be termed a fog 2720, operating at the edge of the cloud 2700. To simplify the diagram, not every IoT device 2702 is labeled.

The fog 2720 may be considered to be a massively interconnected network wherein a number of IoT devices 2702 are in communications with each other, for example, by radio links 2722. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T-.M.A.N.) routing protocol, or the OMA Lightweight M2M (LWM2M) protocol, among others.

Three types of IoT devices 2702 are shown in this example, gateways 2704, data aggregators 2726, and sensors 2728, although any combinations of IoT devices 2702 and functionality may be used. The gateways 2704 may be edge devices that provide communications between the cloud 2700 and the fog 2720, and may also provide the backend process function for data obtained from sensors 2728, such as motion data, flow data, temperature data, and the like. The data aggregators 2726 may collect data from any number of the sensors 2728, and perform the back end processing function for the analysis. The results, raw data, or both may be passed along to the cloud 2700 through the gateways 2704. The sensors 2728 may be full IoT devices 2702, for example, capable of both collecting data and processing the data. In some cases, the sensors 2728 may be more limited in functionality, for example, collecting the data and allowing the data aggregators 2726 or gateways 2704 to process the data.

Communications from any IoT device 2702 may be passed along a convenient path (e.g., a most convenient path) between any of the IoT devices 2702 to reach the gateways 2704. In these networks, the number of interconnections provide substantial redundancy, allowing communications to be maintained, even with the loss of a number of IoT devices 2702. Further, the use of a mesh network may allow IoT devices 2702 that are very low power or located at a distance from infrastructure to be used, as the range to connect to another IoT device 2702 may be much less than the range to connect to the gateways 2704.

The fog 2720 provided from these IoT devices 2702 may be presented to devices in the cloud 2700, such as a server 2706, as a single device located at the edge of the cloud 2700, e.g., a fog device. In this example, the alerts coming from the fog device may be sent without being identified as coming from a specific IoT device 2702 within the fog 2720. In this fashion, the fog 2720 may be considered a distributed platform that provides computing and storage resources to perform processing or data-intensive tasks such as data analytics, data aggregation, and machine-learning, among others.

In some examples, the IoT devices 2702 may be configured using an imperative programming style, e.g., with each IoT device 2702 having a specific function and communication partners. However, the IoT devices 2702 forming the fog device may be configured in a declarative programming style, allowing the IoT devices 2702 to reconfigure their operations and communications, such as to determine needed resources in response to conditions, queries, and device failures. As an example, a query from a user located at a server 2706 about the operations of a subset of equipment monitored by the IoT devices 2702 may result in the fog 2720 device selecting the IoT devices 2702, such as particular sensors 2728, needed to answer the query. The data from these sensors 2728 may then be aggregated and analyzed by any combination of the sensors 2728, data aggregators 2726, or gateways 2704, before being sent on by the fog 2720 device to the server 2706 to answer the query. In this example, IoT devices 2702 in the fog 2720 may select the sensors 2728 used based on the query, such as adding data from flow sensors or temperature sensors. Further, if some of the IoT devices 2702 are not operational, other IoT devices 2702 in the fog 2720 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein. In some implementations, one or more multiple devices may operate cooperatively to implement functionality and perform tasks described herein. In some cases, one or more host devices may supply data, provide instructions, aggregate results, or otherwise facilitate joint operations and functionality provided by multiple devices. While functionality, when implemented by a single device, may be considered functionality local to the device, in implementations of multiple devices operating as a single machine, the functionality may be considered local to the devices collectively, and this collection of devices may provide or consume results provided by other, remote machines (implemented as a single device or collection devices), among other example implementations.

Figure 28:
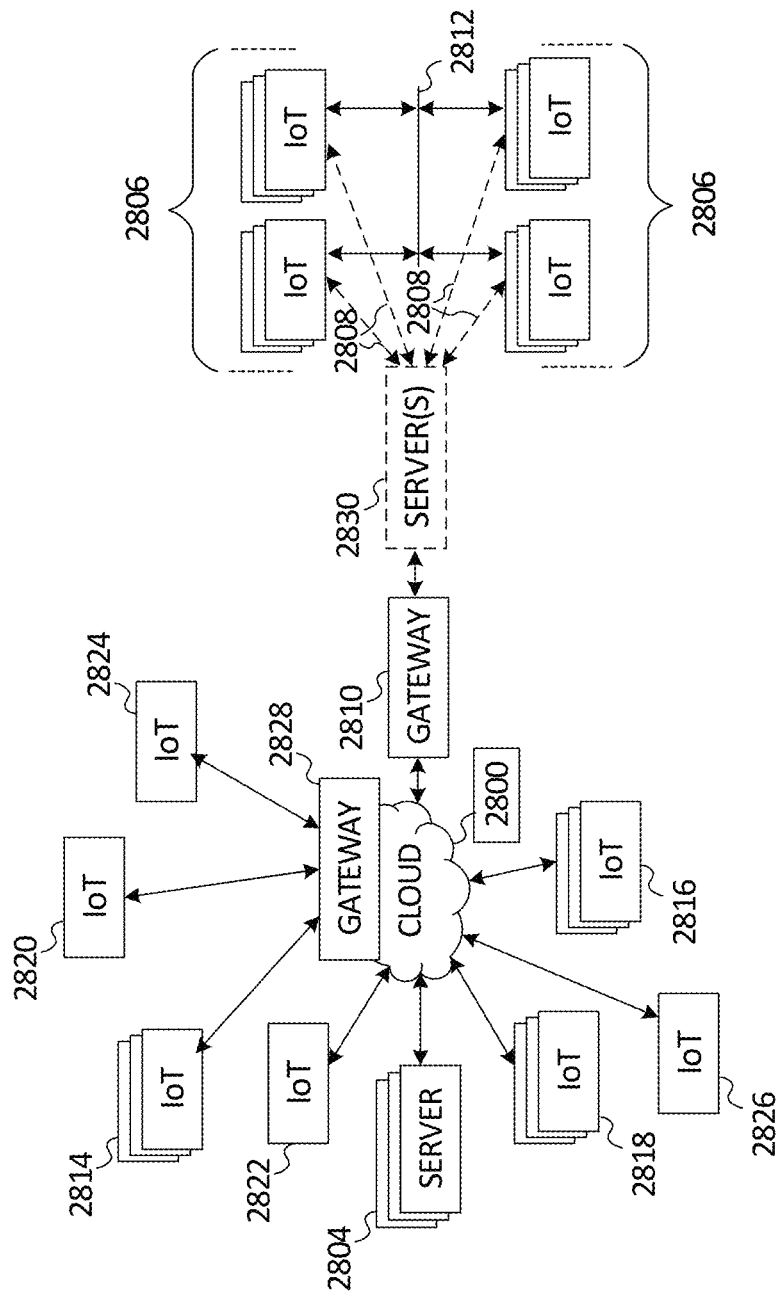
FIG. 28 is a simplified block diagram of a system including example devices in accordance with at least some embodiments.

For instance, FIG. 28 illustrates a drawing of a cloud computing network, or cloud 2800, in communication with a number of Internet of Things (IoT) devices. The cloud 2800 may represent the Internet, or may be a local area network (LAN), or a wide area network (WAN), such as a proprietary network for a company. The IoT devices may include any number of different types of devices, grouped in various combinations. For example, a traffic control group 2806 may include IoT devices along streets in a city. These IoT devices may include stoplights, traffic flow monitors, cameras, weather sensors, and the like. The traffic control group 2806, or other subgroups, may be in communication with the cloud 2800 through wired or wireless links 2808, such as LPWA links, optical links, and the like. Further, a wired or wireless sub-network 2812 may allow the IoT devices to communicate with each other, such as through a local area network, a wireless local area network, and the like. The IoT devices may use another device, such as a gateway 2810 or 2828 to communicate with remote locations such as the cloud 2800; the IoT devices may also use one or more servers 2830 to facilitate communication with the cloud 2800 or with the gateway 2810. For example, the one or more servers 2830 may operate as an intermediate network node to support a local edge cloud or fog implementation among a local area network. Further, the gateway 2828 that is depicted may operate in a cloud-to-gateway-to-many edge devices configuration, such as with the various IoT devices 2814, 2820, 2824 being constrained or dynamic to an assignment and use of resources in the cloud 2800.

Other example groups of IoT devices may include remote weather stations 2814, local information terminals 2816, alarm systems 2818, automated teller machines 2820, alarm panels 2822, or moving vehicles, such as emergency vehicles 2824 or other vehicles 2826, among many others. Each of these IoT devices may be in communication with other IoT devices, with servers 2804, with another IoT fog device or system (not shown, but depicted in FIG. 27), or a combination therein. The groups of IoT devices may be deployed in various residential, commercial, and industrial settings (including in both private or public environments).

As can be seen from FIG. 28, a large number of IoT devices may be communicating through the cloud 2800. This may allow different IoT devices to request or provide information to other devices autonomously. For example, a group of IoT devices (e.g., the traffic control group 2806) may request a current weather forecast from a group of remote weather stations 2814, which may provide the forecast without human intervention. Further, an emergency vehicle 2824 may be alerted by an automated teller machine 2820 that a burglary is in progress. As the emergency vehicle 2824 proceeds towards the automated teller machine 2820, it may access the traffic control group 2806 to request clearance to the location, for example, by lights turning red to block cross traffic at an intersection in sufficient time for the emergency vehicle 2824 to have unimpeded access to the intersection.

Clusters of IoT devices, such as the remote weather stations 2814 or the traffic control group 2806, may be equipped to communicate with other IoT devices as well as with the cloud 2800. This may allow the IoT devices to form an ad-hoc network between the devices, allowing them to function as a single device, which may be termed a fog device or system (e.g., as described above with reference to FIG. 27).

Figure 29:
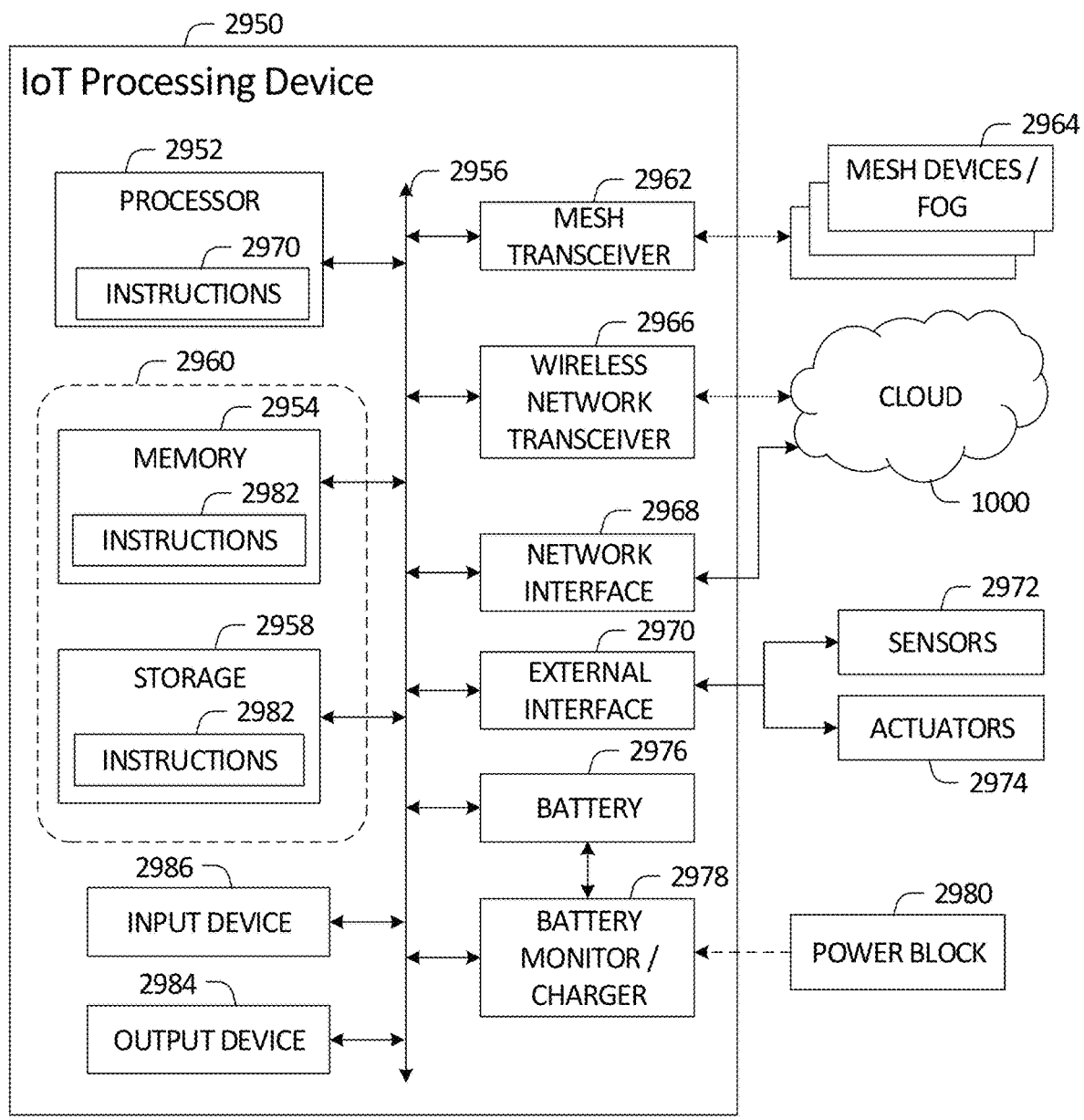
FIG. 29 is a simplified block diagram of an example processing device in accordance with at least some embodiments.

FIG. 29 is a block diagram of an example of components that may be present in an IoT device 2950 for implementing the techniques described herein. The IoT device 2950 may include any combinations of the components shown in the example or referenced in the disclosure above. The components may be implemented as ICs, portions thereof, discrete electronic devices, or other modules, logic, hardware, software, firmware, or a combination thereof adapted in the IoT device 2950, or as components otherwise incorporated within a chassis of a larger system. Additionally, the block diagram of FIG. 29 is intended to depict a high-level view of components of the IoT device 2950. However, some of the components shown may be omitted, additional components may be present, and different arrangement of the components shown may occur in other implementations.

The IoT device 2950 may include a processor 2952, which may be a microprocessor, a multi-core processor, a multithreaded processor, an ultra-low voltage processor, an embedded processor, or other known processing element. The processor 2952 may be a part of a system on a chip (SoC) in which the processor 2952 and other components are formed into a single integrated circuit, or a single package, such as the Edison™ or Galileo™ SoC boards from Intel. As an example, the processor 2952 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 2952 may communicate with a system memory 2954 over an interconnect 2956 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2958 may also couple to the processor 2952 via the interconnect 2956. In an example the storage 2958 may be implemented via a solid state disk drive (SSDD). Other devices that may be used for the storage 2958 include flash memory cards, such as SD cards, microSD cards, xD picture cards, and the like, and USB flash drives. In low power implementations, the storage 2958 may be on-die memory or registers associated with the processor 2952. However, in some examples, the storage 2958 may be implemented using a micro hard disk drive (HDD). Further, any number of new technologies may be used for the storage 2958 in addition to, or instead of, the technologies described, such resistance change memories, phase change memories, holographic memories, or chemical memories, among others.

The components may communicate over the interconnect 2956. The interconnect 2956 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2956 may be a proprietary bus, for example, used in a SoC based system. Other bus systems may be included, such as an 12C interface, an SPI interface, point to point interfaces, and a power bus, among others.

The interconnect 2956 may couple the processor 2952 to a mesh transceiver 2962, for communications with other mesh devices 2964. The mesh transceiver 2962 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 2964. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 2962 may communicate using multiple standards or radios for communications at different range. For example, the IoT device 2950 may communicate with close devices, e.g., within about 10 meters, using a local transceiver based on BLE, or another low power radio, to save power. More distant mesh devices 2964, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 2966 may be included to communicate with devices or services in the cloud 2900 via local or wide area network protocols. The wireless network transceiver 2966 may be a LPWA transceiver that follows the IEEE 802.15.4, or IEEE 802.15.4g standards, among others. The IoT device 2950 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 2962 and wireless network transceiver 2966, as described herein. For example, the radio transceivers 2962 and 2966 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 2962 and 2966 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 2966, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 2968 may be included to provide a wired communication to the cloud 2900 or to other devices, such as the mesh devices 2964. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 2968 may be included to allow connect to a second network, for example, a NIC 2968 providing communications to the cloud over Ethernet, and a second NIC 2968 providing communications to other devices over another type of network.

The interconnect 2956 may couple the processor 2952 to an external interface 2970 that is used to connect external devices or subsystems. The external devices may include sensors 2972, such as accelerometers, level sensors, flow sensors, optical light sensors, camera sensors, temperature sensors, a global positioning system (GPS) sensors, pressure sensors, barometric pressure sensors, and the like. The external interface 2970 further may be used to connect the IoT device 2950 to actuators 2974, such as power switches, valve actuators, an audible sound generator, a visual warning device, and the like.

In some optional examples, various input/output (I/O) devices may be present within, or connected to, the IoT device 2950. For example, a display or other output device 2984 may be included to show information, such as sensor readings or actuator position. An input device 2986, such as a touch screen or keypad may be included to accept input. An output device 2984 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 2950.

A battery 2976 may power the IoT device 2950, although in examples in which the IoT device 2950 is mounted in a fixed location, it may have a power supply coupled to an electrical grid. The battery 2976 may be a lithium ion battery, or a metal-air battery, such as a zinc-air battery, an aluminum-air battery, a lithium-air battery, and the like.

A battery monitor/charger 2978 may be included in the IoT device 2950 to track the state of charge (SoCh) of the battery 2976. The battery monitor/charger 2978 may be used to monitor other parameters of the battery 2976 to provide failure predictions, such as the state of health (SoH) and the state of function (SoF) of the battery 2976. The battery monitor/charger 2978 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 2978 may communicate the information on the battery 2976 to the processor 2952 over the interconnect 2956. The battery monitor/charger 2978 may also include an analog-to-digital (ADC) convertor that allows the processor 2952 to directly monitor the voltage of the battery 2976 or the current flow from the battery 2976. The battery parameters may be used to determine actions that the IoT device 2950 may perform, such as transmission frequency, mesh network operation, sensing frequency, and the like.

A power block 2980, or other power supply coupled to a grid, may be coupled with the battery monitor/charger 2978 to charge the battery 2976. In some examples, the power block 2980 may be replaced with a wireless power receiver to obtain the power wirelessly, for example, through a loop antenna in the IoT device 2950. A wireless battery charging circuit, such as an LTC4020 chip from Linear Technologies of Milpitas, California, among others, may be included in the battery monitor/charger 2978. The specific charging circuits chosen depend on the size of the battery 2976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2958 may include instructions 2982 in the form of software, firmware, or hardware commands to implement the techniques described herein. Although such instructions 2982 are shown as code blocks included in the memory 2954 and the storage 2958, it may be understood that any of the code blocks may be replaced with hardwired circuits, for example, built into an application specific integrated circuit (ASIC).

In an example, the instructions 2982 provided via the memory 2954, the storage 2958, or the processor 2952 may be embodied as a non-transitory, machine readable medium 2960 including code to direct the processor 2952 to perform electronic operations in the IoT device 2950. The processor 2952 may access the non-transitory, machine readable medium 2960 over the interconnect 2956. For instance, the non-transitory, machine readable medium 2960 may be embodied by devices described for the storage 2958 of FIG. 29 or may include specific storage units such as optical disks, flash drives, or any number of other hardware devices. The non-transitory, machine readable medium 2960 may include instructions to direct the processor 2952 to perform a specific sequence or flow of actions, for example, as described with respect to the flowchart(s) and block diagram(s) of operations and functionality depicted above.

Figure 30:
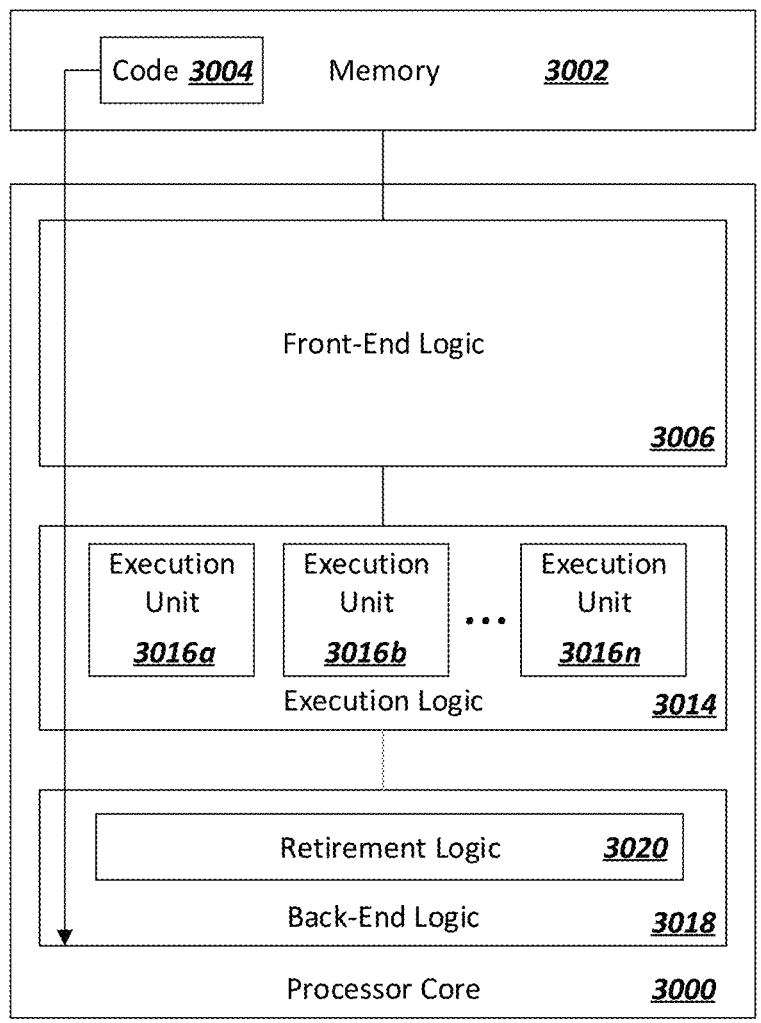
FIG. 30 is a block diagram of an exemplary processor in accordance with at least some embodiments.

FIG. 30 is an example illustration of a processor according to an embodiment. Processor 3000 is an example of a type of hardware device that can be used in connection with the implementations above. Processor 3000 may be any type of processor, such as a microprocessor, an embedded processor, a digital signal processor (DSP), a network processor, a multi-core processor, a single core processor, or other device to execute code. Although only one processor 3000 is illustrated in FIG. 30, a processing element may alternatively include more than one of processor 3000 illustrated in FIG. 30. Processor 3000 may be a single-threaded core or, for at least one embodiment, the processor 3000 may be multi-threaded in that it may include more than one hardware thread context (or "logical processor") per core.

FIG. 30 also illustrates a memory 3002 coupled to processor 3000 in accordance with an embodiment. Memory 3002 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 3000 can execute any type of instructions associated with algorithms, processes, or operations detailed herein. Generally, processor 3000 can transform an element or an article (e.g., data) from one state or thing to another state or thing.

Code 3004, which may be one or more instructions to be executed by processor 3000, may be stored in memory 3002, or may be stored in software, hardware, firmware, or any suitable combination thereof, or in any other internal or external component, device, element, or object where appropriate and based on particular needs. In one example, processor 3000 can follow a program sequence of instructions indicated by code 3004. Each instruction enters a front-end logic 3006 and is processed by one or more decoders 3008. The decoder may generate, as its output, a micro operation such as a fixed width micro operation in a predefined format, or may generate other instructions, microinstructions, or control signals that reflect the original code instruction. Front-end logic 3006 also includes register renaming logic 3010 and scheduling logic 3012, which generally allocate resources and queue the operation corresponding to the instruction for execution.

Processor 3000 can also include execution logic 3014 having a set of execution units 3016a, 3016b, 3016n, etc. Some embodiments may include a number of execution units dedicated to specific functions or sets of functions. Other embodiments may include only one execution unit or one execution unit that can perform a particular function. Execution logic 3014 performs the operations specified by code instructions.

After completion of execution of the operations specified by the code instructions, back-end logic 3018 can retire the instructions of code 3004. In one embodiment, processor 3000 allows out of order execution but requires in order retirement of instructions. Retirement logic 3020 may take a variety of known forms (e.g., re-order buffers or the like). In this manner, processor 3000 is transformed during execution of code 3004, at least in terms of the output generated by the decoder, hardware registers and tables utilized by register renaming logic 3010, and any registers (not shown) modified by execution logic 3014.

Although not shown in FIG. 30, a processing element may include other elements on a chip with processor 3000. For example, a processing element may include memory control logic along with processor 3000. The processing element may include I/O control logic and/or may include I/O control logic integrated with memory control logic. The processing element may also include one or more caches. In some embodiments, non-volatile memory (such as flash memory or fuses) may also be included on the chip with processor 3000.

Figure 31:
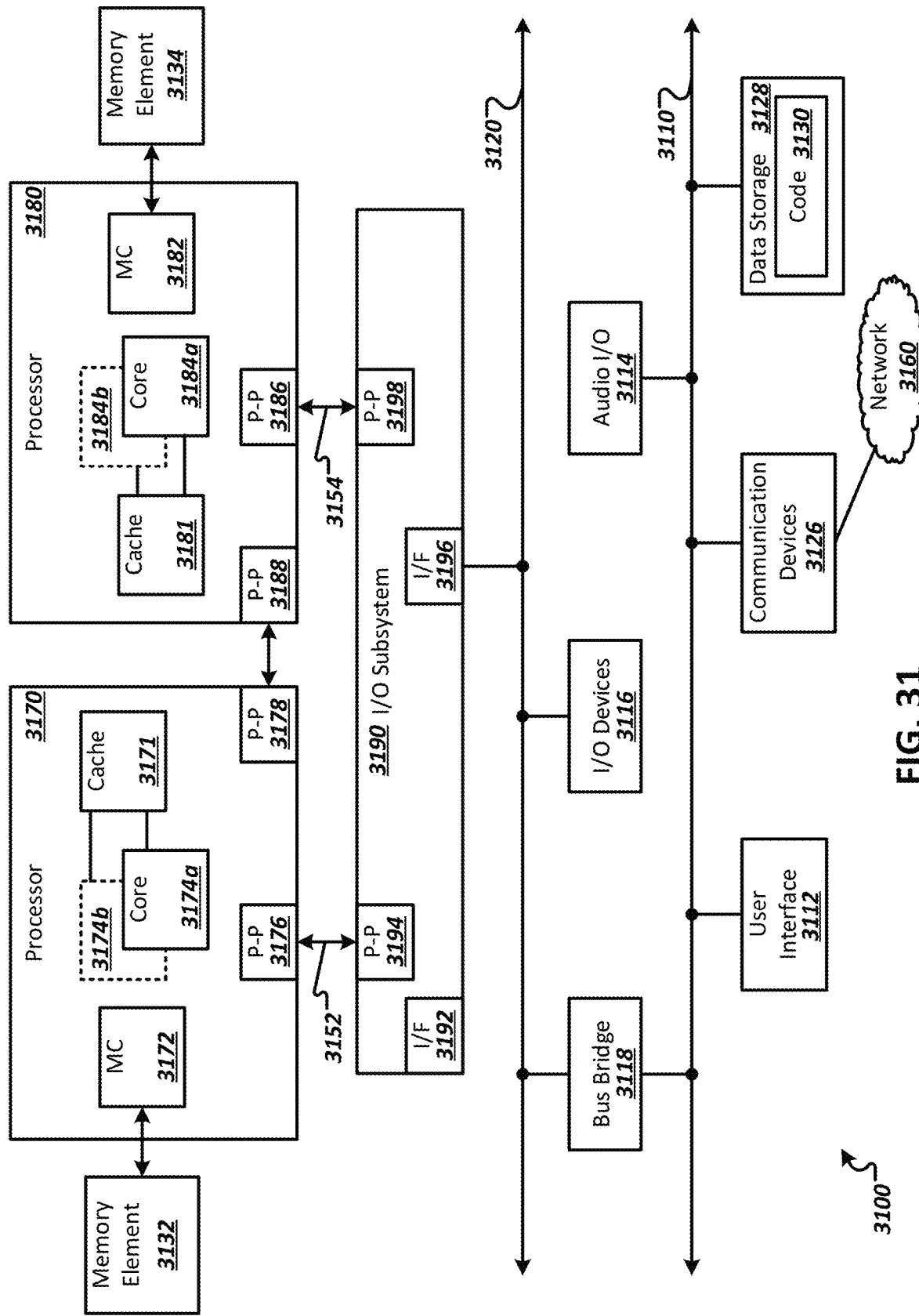
FIG. 31 is a block diagram of an exemplary computing system in accordance with at least some embodiments.

FIG. 31 illustrates a computing system 3100 that is arranged in a point-to-point (PtP) configuration according to an embodiment. In particular, FIG. 31 shows a system where processors, memory, and input/output devices are interconnected by a number of point-to-point interfaces. Generally, one or more of the computing systems described herein may be configured in the same or similar manner as computing system 3100.

Processors 3170 and 3180 may also each include integrated memory controller logic (MC) 3172 and 3182 to communicate with memory elements 3132 and 3134. In alternative embodiments, memory controller logic 3172 and 3182 may be discrete logic separate from processors 3170 and 3180. Memory elements 3132 and/or 3134 may store various data to be used by processors 3170 and 3180 in achieving operations and functionality outlined herein.

Processors 3170 and 3180 may be any type of processor, such as those discussed in connection with other figures. Processors 3170 and 3180 may exchange data via a point-to-point (PtP) interface 3150 using point-to-point interface circuits 3178 and 3188, respectively. Processors 3170 and 3180 may each exchange data with a chipset 3190 via individual point-to-point interfaces 3152 and 3154 using point-to-point interface circuits 3176, 3186, 3194, and 3198. Chipset 3190 may also exchange data with a high-performance graphics circuit 3138 via a high-performance graphics interface 3139, using an interface circuit 3192, which could be a PtP interface circuit. In alternative embodiments, any or all of the PtP links illustrated in FIG. 31 could be implemented as a multi-drop bus rather than a PtP link.

Chipset 3190 may be in communication with a bus 3120 via an interface circuit 3196. Bus 3120 may have one or more devices that communicate over it, such as a bus bridge 3118 and I/O devices 3116. Via a bus 3110, bus bridge 3118 may be in communication with other devices such as a user interface 3112 (such as a keyboard, mouse, touchscreen, or other input devices), communication devices 3126 (such as modems, network interface devices, or other types of communication devices that may communicate through a computer network 3160), audio I/O devices 3114, and/or a data storage device 3128. Data storage device 3128 may store code 3130, which may be executed by processors 3170 and/or 3180. In alternative embodiments, any portions of the bus architectures could be implemented with one or more PtP links.

The computer system depicted in FIG. 31 is a schematic illustration of an embodiment of a computing system that may be utilized to implement various embodiments discussed herein. It will be appreciated that various components of the system depicted in FIG. 31 may be combined in a system-on-a-chip (SoC) architecture or in any other suitable configuration capable of achieving the functionality and features of examples and implementations provided herein.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a machine accessible storage medium having instructions stored thereon, the instructions when executed on a machine, cause the machine to: obtain a volumetric data structure from memory, where the volumetric data structure represents geometry within a particular volume at a plurality of levels of detail, the particular volume includes a plurality of voxels at a first, lowest level of detail in the plurality of levels of detail, a first entry in the volumetric data structure is to represent geometry in each of the plurality of voxels at the first level of detail, the first entry includes a binary value for each of the plurality of voxels at the first level of detail, and the binary value indicates whether geometry is present within a respective subvolume of the particular volume defined by the corresponding voxel; process the volumetric data structure to identify a first portion of a set of operations to skip based at least in part on the binary values of the first entry, where the set of operations includes operations associated with the volumetric data structure; and cause operations in a second portion of the set of operations, other than the first portion, to be performed, where operations in the first portion are to be skipped.

Example 2 may include at least a portion of the subject matter of example 1, where the set of operations include three-dimensional (3D) matrix multiplication operations, and the volumetric data structure includes a 3D matrix.

Example 3 may include at least a portion of the subject matter of example 2, where the 3D matrix multiplication operations are performed in a convolution operation using the volumetric data structure.

Example 4 may include at least a portion of the subject matter of any one of examples 1-3, where the set of operations include memory fetches.

Example 5 may include at least a portion of the subject matter of example 4, where the memory fetches include fetches of weight values in a 3D weight matrix to be multiplied against the volumetric data structure.

Example 6 may include at least a portion of the subject matter of any one of examples 1-5, where the volumetric data structure further includes a set of second entries, each of the second entries represents voxels at a second level of detail in the plurality of levels of detail, each of the second entries corresponds to a respective one of the voxels at the first level of detail identified by a corresponding one of the binary values as containing geometry, each of the voxels at the second level of detail represents a subvolume of a corresponding one of the voxels at the first level of detail, and each of the second entries includes a binary value for each of the plurality of voxels at the second level of detail to indicate whether geometry is present within the corresponding voxel at the second level of detail.

Example 7 may include at least a portion of the subject matter of example 6, where the binary values in the first entry indicate that a first number of voxels at the first level of detail are occupied with geometry and that a second number of voxels at the first level of detail are empty, the set of second entries consists of the first number of second entries, entries are omitted in the set of second entries for voxels at the second level of detail representing subvolumes of the voxels at the first level of detail indicated to be empty.

Example 8 may include at least a portion of the subject matter of any one of examples 6-7, where the voxels at the first level of detail include sixty-four voxels, the binary values in the first entry include sixty-four binary values, and the voxels at the second level of detail represent sixty-four subvolumes of each of the sixty-four voxels at the first level of detail.

Example 9 may include at least a portion of the subject matter of any one of examples 1-8, where skipping the first portion of the operations includes disabling at least a portion of circuitry to perform the first portion of the operations.

Example 10 may include at least a portion of the subject matter of any one of examples 1-9, where each voxel in the volumetric data structure is represented by at least two bits, and one of the at least two bits includes the binary value to indicate whether the corresponding voxel includes geometry.

Example 11 is a machine accessible storage medium having instructions stored thereon, the instructions when executed on a machine, cause the machine to: identify an output of a first one of a plurality of layers within a neural network; determine, from the output, a bitmap including a binary matrix; determine a particular subset of operations for a second one of the plurality of layers to skip based on the bitmap; and perform operations for the second layer other than the particular subset of operations, where the particular subset of operations are skipped.

Example 12 may include at least a portion of the subject matter of example 11, where the neural network includes a convolutional neural network (CNN).

Example 13 may include at least a portion of the subject matter of any one of examples 11-12, where the particular subset of operations include arithmetic operations of the second layer.

Example 14 may include at least a portion of the subject matter of example 13, where the arithmetic operations include three-dimensional (3D) matrix multiplication operations.

Example 15 may include at least a portion of the subject matter of example 14, where the 3D multiplication operations include multiplication of elements in a particular 3D matrix with another operand, and the particular subset of operations include multiplication involving a subset of the elements in the particular 3D matrix, where the subset of elements have values of zero.

Example 16 may include at least a portion of the subject matter of example 15, where the particular subset of operations further include memory fetches of elements in the other operand to be multiplied against the subset of elements.

Example 17 may include at least a portion of the subject matter of any one of examples 15-16, where the instructions, when executed, further cause the machine to determine a mapping between values in the bitmap and corresponding elements in the particular 3D matrix.

Example 18 may include at least a portion of the subject matter of any one of examples 11-17, where the first layer includes a rectified linear unit (ReLU) layer.

Example 19 may include at least a portion of the subject matter of example 18, where the second layer includes one of a convolution layer and a pooling layer.

Example 20 may include at least a portion of the subject matter of any one of examples 18-19, where identifying the output of the ReLU layer includes determining from an input to the ReLU layer that the output of the ReLU layer will include a number of zeros, and the bitmap is generated based on the number of zeros.

Example 21 may include at least a portion of the subject matter of any one of examples 18-19, where identifying the output of the ReLU layer includes predicting that the output of the ReLU layer will include a set of zeros based on signs of operands in a preceding layer of the neural network.

Example 22 may include at least a portion of the subject matter of example 21, where the preceding layer includes one of a convolution layer and a pooling layer.

Example 23 may include at least a portion of the subject matter of any one of examples 11-22, where the bitmap includes a 3D bitmap.

Example 24 may include at least a portion of the subject matter of any one of examples 11-23, where a "1" in the bitmap indicates an operation to be performed and a "0" in the bitmap indicates an operation in the subset to be skipped.

Example 25 may include at least a portion of the subject matter of any one of examples 11-24, where the output includes the bitmap.

Example 26 may include at least a portion of the subject matter of any one of examples 11-25, where the bitmap includes a volumetric data structure, the volumetric data structure represents geometry within a particular volume at a plurality of levels of detail, the particular volume includes a plurality of voxels at a first, lowest level of detail in the plurality of levels of detail, a first entry in the volumetric data structure is to represent geometry in each of the plurality of voxels at the first level of detail, the first entry includes a binary value for each of the plurality of voxels at the first level of detail, and the binary value indicates whether geometry is present within a respective subvolume of the particular volume defined by the corresponding voxel.

Example 27 is an apparatus including: a data processing apparatus; bitmap generation circuitry to obtain values of a matrix to be provided as an input to a first one of a plurality of layers within an artificial neural network; determine, from the values, that an output of a particular layer will include a set of output values including at least some zeros; and generate a bitmap matrix including binary values to indicate whether corresponding values in the output of the particular layer include zero values.

Example 28 may include at least a portion of the subject matter of example 27, further including a scheduler to: obtain the bitmap matrix from memory in association with multiplication to be performed using the output in another one of the plurality of layers in the neural network; and skipping a subset of multiplication operations to be performed in the multiplication involving zero values in the matrix based on the bitmap matrix.

Example 29 may include at least a portion of the subject matter of example 28, where the neural network includes a convolutional neural network and the other layer includes one of a convolution layer or a pooling layer.

Example 30 may include at least a portion of the subject matter of any one of examples 27-29, where the particular layer includes a is the first layer and the particular layer includes a rectified linear unit (ReLU) layer.

Example 31 may include at least a portion of the subject matter of example 30, where the particular layer includes the first layer, and the bitmap generation circuitry includes a comparator to determine whether the input values are negative, where the bitmap matrix is to be populated with binary values generated by the comparator from the input values.

Example 32 may include at least a portion of the subject matter of example 30, where the first layer includes a layer preceding the ReLU layer, output of the first layer is to be provided as an input to the ReLU layer, the bitmap generation circuitry includes an exclusive OR (XOR) gate to operate on at least a portion of each of two operands to be multiplied in the first layer to generate the input to the ReLU layer, and the bitmap matrix is to be populated with binary values generated by the XOR gate.

Example 33 may include at least a portion of the subject matter of any one of examples 27-32, where the matrix includes a matrix of three or more dimensions.

Example 34 is a system including: one or more optical sensors to generate optical data; and a volumetric data generator to generate a volumetric data structure from the optical data, where the volumetric data structure represents geometry captured by the optical sensor within a particular volume at a plurality of levels of detail, the particular volume includes a plurality of voxels at a first, lowest level of detail in the plurality of levels of detail, a first entry in the volumetric data structure is to represent geometry in each of the plurality of voxels at the first level of detail, the first entry includes a binary value for each of the plurality of voxels at the first level of detail, and the binary value indicates whether geometry is present within a respective subvolume of the particular volume defined by the corresponding voxel.

Example 35 may include at least a portion of the subject matter of example 34, further including a scheduler to: obtain the volumetric data structure from memory; and use the volumetric data structure as a bitmap to identify a subset of multiplication operations to skip based on a subset of the binary values in the volumetric data structure including zero values.

Example 36 may include at least a portion of the subject matter of any one of examples 34-35, further including a matrix multiplication processor to perform matrix multiplication using the volumetric data structure.

Example 37 may include at least a portion of the subject matter of example 36, where the matrix multiplication is performed to correspond to one of a convolution or a pooling layer in a convolutional neural network.

Example 38 may include at least a portion of the subject matter of any one of examples 34-37, where the volumetric data generator includes a simultaneous localization and mapping (SLAM) pipeline to generate a depth map, and the volumetric data structure is generated from the depth map.

Example 39 is a method including: obtaining a volumetric data structure from memory, where the volumetric data structure represents geometry within a particular volume at a plurality of levels of detail, the particular volume includes a plurality of voxels at a first, lowest level of detail in the plurality of levels of detail, a first entry in the volumetric data structure is to represent geometry in each of the plurality of voxels at the first level of detail, the first entry includes a binary value for each of the plurality of voxels at the first level of detail, and the binary value indicates whether geometry is present within a respective subvolume of the particular volume defined by the corresponding voxel; processing the volumetric data structure to identify a portion of a set of operations to skip based at least in part on the binary values of the first entry, where the set of operations include operations associated with the volumetric data structure; and causing operations in the set of operations other than the portion to be performed, where operations in the portion are to be skipped.

Example 40 may include at least a portion of the subject matter of example 39, where the set of operations include three-dimensional (3D) matrix multiplication operations, and the volumetric data structure includes a 3D matrix.

Example 41 may include at least a portion of the subject matter of example 40, where the 3D matrix multiplication operations are performed in a convolution operation using the volumetric data structure.

Example 42 may include at least a portion of the subject matter of any one of examples 39-41, where the set of operations include memory fetches.

Example 43 may include at least a portion of the subject matter of example 42, where the memory fetches include fetches of weight values in a 3D weight matrix to be multiplied against the volumetric data structure.

Example 44 may include at least a portion of the subject matter of any one of examples 39-43, where the volumetric data structure further includes a set of second entries, each of the second entries represents voxels at a second level of detail in the plurality of levels of detail, each of the second entries corresponds to a respective one of the voxels at the first level of detail identified by a corresponding one of the binary values as containing geometry, each of the voxels at the second level of detail represents a subvolume of a corresponding one of the voxels at the first level of detail, and each of the second entries includes a binary value for each of the plurality of voxels at the second level of detail to indicate whether geometry is present within the corresponding voxel at the second level of detail.

Example 45 may include at least a portion of the subject matter of example 44, where the binary values in the first entry indicate that a first number of voxels at the first level of detail are occupied with geometry and that a second number of voxels at the first level of detail are empty, the set of second entries consists of the first number of second entries, entries are omitted in the set of second entries for voxels at the second level of detail representing subvolumes of the voxels at the first level of detail indicated to be empty.

Example 46 may include at least a portion of the subject matter of any one of examples 44-45, where the voxels at the first level of detail include sixty-four voxels, the binary values in the first entry include sixty-four binary values, and the voxels at the second level of detail represent sixty-four subvolumes of each of the sixty-four voxels at the first level of detail.

Example 47 may include at least a portion of the subject matter of any one of examples 39-46, where skipping the portion of the operations includes disabling at least a portion of circuitry to perform the portion of the operations.

Example 48 may include at least a portion of the subject matter of any one of examples 39-47, where each voxel in the volumetric data structure is represented by at least two bits, and one of the at least two bits includes the binary value to indicate whether the corresponding voxel includes geometry.

Example 49 is a system including means to perform the method of any one of examples 39-48.

Example 50 is a method including: identifying an output of a first one of a plurality of layers within a neural network; determining, from the output, a bitmap including a binary matrix; determining a particular subset of operations for a second one of the plurality of layers to skip based on the bitmap; and performing operations for the second layer other than the particular subset of operations, where the particular subset of operations are skipped.

Example 51 may include at least a portion of the subject matter of example 50, where the neural network includes a convolutional neural network (CNN).

Example 52 may include at least a portion of the subject matter of any one of examples 50-51, where the particular subset of operations include arithmetic operations of the second layer.

Example 53 may include at least a portion of the subject matter of example 52, where the arithmetic operations include three-dimensional (3D) matrix multiplication operations.

Example 54 may include at least a portion of the subject matter of example 53, where the 3D multiplication operations include multiplication of elements in a particular 3D matrix with another operand, and the particular subset of operations include multiplication involving a subset of the elements in the particular 3D matrix, where the subset of elements have values of zero.

Example 55 may include at least a portion of the subject matter of example 54, where the particular subset of operations further include memory fetches of elements in the other operand to be multiplied against the subset of elements.

Example 56 may include at least a portion of the subject matter of any one of examples 54-55, where the instructions, when executed, further cause the machine to determine a mapping between values in the bitmap and corresponding elements in the particular 3D matrix.

Example 57 may include at least a portion of the subject matter of any one of examples 50-56, where the first layer includes a rectified linear unit (ReLU) layer.

Example 58 may include at least a portion of the subject matter of example 57, where the second layer includes one of a convolution layer and a pooling layer.

Example 59 may include at least a portion of the subject matter of any one of examples 57-58, where identifying the output of the ReLU layer includes determining from an input to the ReLU layer that the output of the ReLU layer will include a number of zeros, and the bitmap is generated based on the number of zeros.

Example 60 may include at least a portion of the subject matter of any one of examples 57-58, where identifying the output of the ReLU layer includes predicting that the output of the ReLU layer will include a set of zeros based on signs of operands in a preceding layer of the neural network.

Example 61 may include at least a portion of the subject matter of example 60, where the preceding layer includes one of a convolution layer and a pooling layer.

Example 62 may include at least a portion of the subject matter of any one of examples 50-61, where the bitmap includes a 3D bitmap.

Example 63 may include at least a portion of the subject matter of any one of examples 50-62, where a "1" in the bitmap indicates an operation to be performed and a "0" in the bitmap indicates an operation in the subset to be skipped.

Example 64 may include at least a portion of the subject matter of any one of examples 50-63, where the output includes the bitmap.

Example 65 may include at least a portion of the subject matter of any one of examples 50-64, where the bitmap includes a volumetric data structure, the volumetric data structure represents geometry within a particular volume at a plurality of levels of detail, the particular volume includes a plurality of voxels at a first, lowest level of detail in the plurality of levels of detail, a first entry in the volumetric data structure is to represent geometry in each of the plurality of voxels at the first level of detail, the first entry includes a binary value for each of the plurality of voxels at the first level of detail, and the binary value indicates whether geometry is present within a respective subvolume of the particular volume defined by the corresponding voxel.

Example 66 is a system including means to perform the method of any one of examples 50-65.

Example 67 is an apparatus including a data processor, memory, and circuitry. The memory is to store a volumetric data structure from memory, where the volumetric data structure represents geometry within a particular volume at a plurality of levels of detail, the particular volume includes a plurality of voxels at a first, lowest level of detail in the plurality of levels of detail, a first entry in the volumetric data structure is to represent geometry in each of the plurality of voxels at the first level of detail, the first entry includes a binary value for each of the plurality of voxels at the first level of detail, and the binary value indicates whether geometry is present within a respective subvolume of the particular volume defined by the corresponding voxel. The circuitry is to: identify, from the volumetric data structure, a portion of a set of operations to skip based at least in part on the binary values of the first entry, where the set of operations include operations associated with the volumetric data structure; and cause operations in the set of operations other than the portion to be performed, where operations in the portion are to be skipped.

Example 68 may include at least a portion of the subject matter of example 67, where the set of operations include three-dimensional (3D) matrix multiplication operations, and the volumetric data structure includes a 3D matrix.

Example 69 may include at least a portion of the subject matter of example 68, where the 3D matrix multiplication operations are performed in a convolution operation using the volumetric data structure.

Example 70 may include at least a portion of the subject matter of any one of examples 67-69, where the set of operations include memory fetches.

Example 71 may include at least a portion of the subject matter of example 70, where the memory fetches include fetches of weight values in a 3D weight matrix to be multiplied against the volumetric data structure.

Example 72 may include at least a portion of the subject matter of any one of examples 67-71, where the volumetric data structure further includes a set of second entries, each of the second entries represents voxels at a second level of detail in the plurality of levels of detail, each of the second entries corresponds to a respective one of the voxels at the first level of detail identified by a corresponding one of the binary values as containing geometry, each of the voxels at the second level of detail represents a subvolume of a corresponding one of the voxels at the first level of detail, and each of the second entries includes a binary value for each of the plurality of voxels at the second level of detail to indicate whether geometry is present within the corresponding voxel at the second level of detail.

Example 73 may include at least a portion of the subject matter of example 72, where the binary values in the first entry indicate that a first number of voxels at the first level of detail are occupied with geometry and that a second number of voxels at the first level of detail are empty, the set of second entries consists of the first number of second entries, entries are omitted in the set of second entries for voxels at the second level of detail representing subvolumes of the voxels at the first level of detail indicated to be empty.

Example 74 may include at least a portion of the subject matter of any one of examples 72-73, where the voxels at the first level of detail include sixty-four voxels, the binary values in the first entry include sixty-four binary values, and the voxels at the second level of detail represent sixty-four subvolumes of each of the sixty-four voxels at the first level of detail.

Example 75 may include at least a portion of the subject matter of any one of examples 67-74, where skipping the portion of the operations includes disabling at least a portion of circuitry to perform the portion of the operations.

Example 76 may include at least a portion of the subject matter of any one of examples 67-75, where each voxel in the volumetric data structure is represented by at least two bits, and one of the at least two bits includes the binary value to indicate whether the corresponding voxel includes geometry.

Example 77 is an apparatus including: a data processor; bitmap generation circuitry to identify an output of a first one of a plurality of layers within a neural network; and determine, from the output, a bitmap including a binary matrix; and a controller to: determine a particular subset of operations for a second one of the plurality of layers to skip based on the bitmap; and cause operations to be performed for the second layer other than the particular subset of operations, where the particular subset of operations are skipped.

Example 78 may include at least a portion of the subject matter of example 77, where the neural network includes a convolutional neural network (CNN).

Example 79 may include at least a portion of the subject matter of any one of examples 77-78, where the particular subset of operations include arithmetic operations of the second layer.

Example 80 may include at least a portion of the subject matter of example 79, where the arithmetic operations include three-dimensional (3D) matrix multiplication operations.

Example 81 may include at least a portion of the subject matter of example 80, where the 3D multiplication operations include multiplication of elements in a particular 3D matrix with another operand, and the particular subset of operations include multiplication involving a subset of the elements in the particular 3D matrix, where the subset of elements have values of zero.

Example 82 may include at least a portion of the subject matter of example 81, where the particular subset of operations further include memory fetches of elements in the other operand to be multiplied against the subset of elements.

Example 83 may include at least a portion of the subject matter of any one of examples 81-82, where the controller is further to determine a mapping between values in the bitmap and corresponding elements in the particular 3D matrix.

Example 84 may include at least a portion of the subject matter of any one of examples 77-83, where the first layer includes a rectified linear unit (ReLU) layer.

Example 85 may include at least a portion of the subject matter of example 84, where the second layer includes one of a convolution layer and a pooling layer.

Example 86 may include at least a portion of the subject matter of any one of examples 84-85, where identifying the output of the ReLU layer includes determining from an input to the ReLU layer that the output of the ReLU layer will include a number of zeros, and the bitmap is generated based on the number of zeros.

Example 87 may include at least a portion of the subject matter of any one of examples 84-85, where identifying the output of the ReLU layer includes predicting that the output of the ReLU layer will include a set of zeros based on signs of operands in a preceding layer of the neural network.

Example 88 may include at least a portion of the subject matter of example 87, where the preceding layer includes one of a convolution layer and a pooling layer.

Example 89 may include at least a portion of the subject matter of any one of examples 77-88, where the bitmap includes a 3D bitmap.

Example 90 may include at least a portion of the subject matter of any one of examples 77-89, where a "1" in the bitmap indicates an operation to be performed and a "0" in the bitmap indicates an operation in the subset to be skipped.

Example 91 may include at least a portion of the subject matter of any one of examples 77-90, where the output includes the bitmap.

Example 92 may include at least a portion of the subject matter of any one of examples 77-91, where the bitmap includes a volumetric data structure, the volumetric data structure represents geometry within a particular volume at a plurality of levels of detail, the particular volume includes a plurality of voxels at a first, lowest level of detail in the plurality of levels of detail, a first entry in the volumetric data structure is to represent geometry in each of the plurality of voxels at the first level of detail, the first entry includes a binary value for each of the plurality of voxels at the first level of detail, and the binary value indicates whether geometry is present within a respective subvolume of the particular volume defined by the corresponding voxel.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. An apparatus comprising:
   first circuitry to operate on a first data structure based on a second data structure to output a third data structure;
   machine readable instructions; and
   second circuitry to operate based on the machine readable instructions to:
      set second elements of the second data structure to one of a first value or a second value based on data values of corresponding first elements of the first data structure; and
      configure the first circuitry based on the first data structure and the second data structure to cause the first circuitry to generate the third data structure, the first circuitry to:
         perform an operation on ones of the first elements of the first data structure associated with corresponding ones of the second elements of the second data structure set to the first value to generate the third data structure; and
         skip performance of the operation on ones of the first elements of the first data structure associated with corresponding ones of the second elements of the second data structure set to the second value when generating the third data structure.

2. The apparatus of claim 1, wherein the operation is at least one of an arithmetic operation or a fetch operation.

3. The apparatus of claim 1, wherein the first value is a logic 1 and the second value is a logic 0.

4. The apparatus of claim 1, wherein the first data structure is a first matrix, the second data structure is a second matrix, and the second circuitry is to:
   populate a register based on ones of the first elements of the first matrix associated with corresponding ones of the second elements of the second matrix set to the first value; and
   provide the register to the first circuitry to configure the first circuitry.

5. The apparatus of claim 1, wherein the second data structure is a volumetric data structure, the second elements correspond to voxels that represent corresponding subvolumes of a volumetric space, and the second circuitry is to:
   set ones of the voxels corresponding to non-empty subvolumes to the first value; and
   set ones of the voxels corresponding to empty subvolumes to the second value.

6. The apparatus of claim 1, wherein the second circuitry is to set the second elements of the second data structure to one of the first value or the second value based on comparison of the data values of the corresponding first elements of the first data structure to zero.

7. The apparatus of claim 6, wherein the second circuitry is to set the second elements of the second data structure to one of the first value or the second value based on whether the data values of the corresponding first elements of the first data structure are greater than zero, or less than or equal to zero.

8. The apparatus of claim 1, wherein the first circuitry is to implement at least one stage of a convolutional neural network.

9. At least one non-transitory machine readable medium comprising machine readable instructions to cause at least one processor circuit to at least:
   set second elements of a second data structure to one of a first value or a second value based on data values of corresponding first elements of a first data structure; and configure a hardware accelerator based on the first data structure and the second data structure to cause the hardware accelerator to generate a third data structure, the hardware accelerator to:
  perform an operation on ones of the first elements of the first data structure associated with corresponding ones of the second elements of the second data structure set to the first value to generate the third data structure; and
  skip performance of the operation on ones of the first elements of the first data structure associated with corresponding ones of the second elements of the second data structure set to the second value when generating the third data structure.

10. The at least one non-transitory machine readable medium of claim 9, wherein the operation is at least one of an arithmetic operation or a fetch operation.

11. The at least one non-transitory machine readable medium of claim 9, wherein the first value is a logic 1 and the second value is a logic 0.

12. The at least one non-transitory machine readable medium of claim 9, wherein the first data structure is a first matrix, the second data structure is a second matrix, and the instructions are to cause one or more of the at least one processor circuit to:
  populate a register based on ones of the first elements of the first matrix associated with corresponding ones of the second elements of the second matrix set to the first value; and
  provide the register to the hardware accelerator to configure the hardware accelerator.

13. The at least one non-transitory machine readable medium of claim 9, wherein the second data structure is a volumetric data structure, the second elements correspond to voxels that represent corresponding subvolumes of a volumetric space, and the instructions are to cause one or more of the at least one processor circuit to:
  set ones of the voxels corresponding to non-empty subvolumes to the first value; and
  set ones of the voxels corresponding to empty subvolumes to the second value.

14. The at least one non-transitory machine readable medium of claim 9, wherein the instructions are to cause one or more of the at least one processor circuit to set the second elements of the second data structure to one of the first value or the second value based on comparison of the data values of the corresponding first elements of the first data structure to zero.

15. A method comprising:
  setting second elements of a second data structure to one of a first value or a second value based on data values of corresponding first elements of a first data structure; and
  generating, with a hardware accelerator, a third data structure based on the first data structure and the second data structure by:
    performing an operation on ones of the first elements of the first data structure associated with corresponding ones of the second elements of the second data structure set to the first value to generate the third data structure; and
    skipping performance of the operation on ones of the first elements of the first data structure associated with corresponding ones of the second elements of the second data structure set to the second value when generating the third data structure.

16. The method of claim 15, wherein the operation is at least one of an arithmetic operation or a fetch operation.

17. The method of claim 15, wherein the first value is a logic 1 and the second value is a logic 0.

18. The method of claim 15, wherein the first data structure is a first matrix, the second data structure is a second matrix, and further including:
  populating a register based on ones of the first elements of the first matrix associated with corresponding ones of the second elements of the second matrix set to the first value; and
  providing the register to the hardware accelerator to configure the hardware accelerator.

19. The method of claim 15, wherein the second data structure is a volumetric data structure, the second elements correspond to voxels that represent corresponding subvolumes of a volumetric space, and the setting includes:
  setting ones of the voxels corresponding to non-empty subvolumes to the first value; and
  setting ones of the voxels corresponding to empty subvolumes to the second value.

20. The method of claim 15, wherein the setting includes setting the second elements of the second data structure to one of the first value or the second value based on comparison of the data values of the corresponding first elements of the first data structure to zero.

* * * * *